US009373104B2

(12) United States Patent
Kothari

(10) Patent No.: US 9,373,104 B2
(45) Date of Patent: *Jun. 21, 2016

(54) ASSIGN PHOTOGRAPHERS ON AN EVENT INVITE AND AUTOMATE REQUESTING, UPLOADING, AND SHARING OF PHOTOS AND VIDEOS FOR AN EVENT

(71) Applicant: Ankit Dilip Kothari, Henrico, VA (US)

(72) Inventor: Ankit Dilip Kothari, Henrico, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/604,248

(22) Filed: Jan. 23, 2015

(65) Prior Publication Data
US 2015/0281293 A1 Oct. 1, 2015

Related U.S. Application Data

(63) Continuation of application No. 14/447,424, filed on Jul. 30, 2014, now Pat. No. 8,943,140.

(60) Provisional application No. 61/970,386, filed on Mar. 26, 2014.

(51) Int. Cl.
| *G06F 15/16* | (2006.01) |
| *G06Q 10/10* | (2012.01) |
| *H04L 29/06* | (2006.01) |
| *H04L 29/08* | (2006.01) |
| *H04N 21/2743* | (2011.01) |
| *H04N 21/414* | (2011.01) |
| *H04N 21/4223* | (2011.01) |

(52) U.S. Cl.
CPC .......... *G06Q 10/1095* (2013.01); *G06Q 10/103* (2013.01); *H04L 65/403* (2013.01); *H04L 67/10* (2013.01); *H04N 21/2743* (2013.01); *H04N 21/41407* (2013.01); *H04N 21/4223* (2013.01)

(58) Field of Classification Search
USPC ......... 709/203, 204, 228, 229, 206, 217, 219, 709/223, 224, 226; 707/708; 706/11; 713/171; 715/738
See application file for complete search history.

(56) References Cited

U.S. PATENT DOCUMENTS

| 6,732,103 | B1 * | 5/2004 | Strick | G06Q 10/109 709/203 |
| 7,996,566 | B1 * | 8/2011 | Sylvain | H04N 7/15 709/229 |
| 8,842,841 | B2 * | 9/2014 | Hook | H04L 9/14 713/171 |
| 2011/0283196 | A1 * | 11/2011 | Berger | G06F 17/30879 715/738 |
| 2012/0324002 | A1 * | 12/2012 | Chen | G06F 17/30274 709/204 |
| 2013/0262686 | A1 * | 10/2013 | Hill | H04L 65/1069 709/228 |
| 2014/0280561 | A1 * | 9/2014 | DuBois | H04L 67/02 709/204 |
| 2015/0019523 | A1 * | 1/2015 | Lior | G06Q 10/109 707/708 |
| 2015/0170045 | A1 * | 6/2015 | Kirkham | G06Q 10/06 706/11 |

\* cited by examiner

*Primary Examiner* — Quang N Nguyen
(74) *Attorney, Agent, or Firm* — James M. Smedley LLC; James Michael Smedley, Esq.

(57) ABSTRACT

Methods, program products and systems to assign photographers on an event invite and automate requesting, uploading and sharing of the event's photos/videos are described here. The solution would allow to assign photographers for an event using the event's invite itself, indirectly triggering the auto-creation of a new photo/video album and allowing the photographer invitees to upload their photos/videos for the event, either real-time or manually at a later time. Thereafter, once an event is complete, the event's photo/video album would be either automatically or manually shared with the event's guests depending upon the preferences set by the event's owner.

29 Claims, 39 Drawing Sheets

1300b

---

Sample e-mail format for sharing an event's photo/video album with guests
From: EventOwner's Email Address
To:
BCC: EventGuests' Email Addresses

Subject: Event album for 'John's Birthday' event

Content:
Event owner for the event – "John's Birthday" would like to share the event's photo/video album with you. Please visit the below link to access the album's public website –

Link to Event Album

Thanks!

ASSIGN PHOTOGRAPHERS ON AN EVENT INVITE AND AUTOMATE REQUESTING, UPLOADING, AND SHARING OF PHOTOS AND VIDEOS FOR AN EVENT

CROSS-REFERENCE TO RELATED APPLICATION

The present application is a continuation of and claims priority from non-provisional patent application Ser. No. 14/447,424 filed on Jul. 30, 2014, which subsequently issued as U.S. Pat. No. 8,943,140 on Jan. 27, 2015, which, in turn, claims priority from provisional application 61/970,386 filed on Mar. 26, 2014 the contents of which are hereby incorporated by reference into this application.

FIELD OF THE INVENTION

The present invention generally relates to requesting, uploading, and sharing photos and videos taken using a mobile device. Specifically, embodiments of the present invention provide for integrating a calendar and photo sharing function of a mobile device to allow requesting, taking, sharing, and managing, photos or videos tied to the event.

BACKGROUND OF THE INVENTION

When an event owner sets up a new event invite and wants to capture the precious moments i.e. photo/videos for that event, then currently they would usually contact some of the invitees individually and request them to take and share (using their own method of sharing) the photos/videos for the event. It can often be time consuming to individually reach out to such invitees and to get their final confirmation for taking and sharing of the event's photos/videos. Nevertheless, it might even require multiple reminders to be sent to such photographers, informing them about the event's start/end time, in order to make sure that all special moments are captured for the event. On a side note, if an event owner also wants to collect photos/videos for before (pre-event activities of an event) and/or after (post event activities of an event), then they also have to remember currently to notify the photographers about those additional requests, which can further add to the existing complexity.

In addition, it can also be a lot of hassles if the photographers who took the photos/videos during the event either don't share those with the event owner in a timely manner, or they do share those photos/videos but using distinct sharing methods (email, photo/video messaging, etc), leading to unnecessary complications as well as delays in aggregation. Under this situation, an event owner often ends up spending a lot of time either reminding those photographer invitees to send their photos/videos for the event or gathering the event's photos/videos at a central location. This indirectly even leads to delays in the sharing of the event's album (photos/videos) with the event's guests. In fact, in some cases an event album might even be shared months and months after an event has already completed, reducing the level of overall enthusiasm and relevance to the actual situation/occasion.

In short, the current process mentioned above is not only time-consuming but also requires a lot of coordination between both an event owner and the photographer invitees. In addition, it's quite a challenging task to gather all the photos/videos taken by different event invitees to a central location, and thereafter, even share those with everyone. Overall, starting from requesting of photos/videos for an event, to the collecting/uploading of those photos/videos at a centralized location, to the sharing of those photos/videos with guests, the current process isn't quite streamlined and has a lot of manual steps in addition to inconvenience as well as associated delays.

SUMMARY OF THE INVENTION

Accordingly, it is an object of the present invention to provide a system and method for integrating a calendar function and a photo and video sharing function of a mobile device to allow invitations and photo/video sharing requests to be sent and managed, and allow photos and videos to be shared in a unified manner, reducing time and effort expended in gathering, sharing, and managing photos and videos related to an event.

According to an embodiment of the present invention, A computer implemented method for sharing photos and videos related to an event comprises: initiating a sharing mode on a mobile device, wherein photos or videos taken while in sharing mode are automatically uploaded to another location; and visually indicating to a user that the mobile device is in sharing mode.

According to an embodiment of the present invention, the computer implemented method further comprising storing the photos or videos to later manually upload.

According to an embodiment of the present invention, the computer implemented method further comprising displaying a border frame on the screen of the device while the photos or videos are being taken while in sharing mode.

According to an embodiment of the present invention, the computer implemented method wherein the sharing mode is set to start and end at predetermined times.

According to an embodiment of the present invention, the computer implemented method further comprising the step of confirming whether or not the photo or video should be uploaded.

According to an embodiment of the present invention, the computer implemented method further comprising the steps of: starting and ending the sharing mode at predetermined times, providing the user an upload option for identifying an upload preference to upload the photos or videos to the central location, wherein the upload option is selected from the group comprising (a) automatically, (b) manually, or (c) by confirmation; displaying the user's upload preference on the screen of the device while photos or videos are being taken; displaying an event identifier for the event on the screen of the device while photos or videos are being taken; visually indicating to a user that the mobile device is in sharing mode by displaying a border frame on the screen of the device while photos or videos are being taken.

According to an embodiment of the present invention, the computer implemented method wherein the event identifier is the name of the event.

According to an embodiment of the present invention, a computer implemented method for sharing photos and videos related to an event through a central location comprising: creating an event owned by an event owner; sending invitations for the event to zero or more invitees; assigning the event owner and zero or more of the invitees as photographers; sending to the photographers a request to share photos or videos taken during the event; receiving from the invitees an invitee response to the invitation; receiving from the photographers a photographer response to the request to share; providing the photographers an upload option for identifying an upload preference to upload the photos or videos to the central location, wherein the upload option is selected from the group comprising (a) automatically, (b) manually, or (c) by confirmation; creating a digital album for collecting the photos and videos corresponding to the event; uploading to the central location the photos or videos taken by the photographers during the event.

According to an embodiment of the present invention, the computer implemented method wherein creating an event is accomplished, at least in part, by integrating with a separately installed calendar program on the device.

According to an embodiment of the present invention, the computer implemented method wherein creating a digital album is accomplished, at least in part by integrating with a separately installed photo or video album program on the device.

According to an embodiment of the present invention, the computer implemented method wherein the photos or videos are taken by integrating with a separately installed camera app on the device.

According to an embodiment of the present invention, the computer implemented method further comprising the step of visually indicating to the photographer that the photos or videos taken during the event will be uploaded.

According to an embodiment of the present invention, the computer implemented method further comprising the step of displaying a border frame on the screen of the device while the photos or videos are being taken.

According to an embodiment of the present invention, the computer implemented method wherein the photographer's photographer response is automatically declined when the photographer declines the invitation through the invitee response.

According to an embodiment of the present invention, the computer implemented method wherein the photographers are automatically thanked for sharing the photos or videos taken during the event.

According to an embodiment of the present invention, the computer implemented method wherein one of the photographers is un-designated as a photographer, and the photographer becomes a regular invitee.

According to an embodiment of the present invention, the computer implemented method further comprising the step of sending an album sharing message when the digital album is shared.

According to an embodiment of the present invention, the computer implemented method wherein the digital album is automatically assigned a name given by the event title, as defined by the event owner, followed by the event's start date and time.

According to an embodiment of the present invention, the computer implemented method wherein the photographer cannot accept an additional request to share photos or videos for an event overlapping in time with the event for which the photographer accepted the request to share.

According to an embodiment of the present invention, the computer implemented method wherein the event and the digital album are closely integrated such that: a user may directly switch between viewing the event and viewing the digital album; and deletion of the digital album before the end of the event causes the request to share to be canceled, and the photographer response to be updated accordingly.

According to an embodiment of the present invention, the computer implemented method wherein the event owner may disable sharing of the photos or videos at any time According to an embodiment of the present invention, the computer implemented method wherein a non-invitee user who nonetheless attends the event is granted access to the digital album without becoming an invitee, and is allowed to share photos or videos from the event through the digital album.

According to an embodiment of the present invention, the computer implemented method wherein the digital album may be shared with anyone via a webpage.

According to an embodiment of the present invention, the computer implemented method further comprising the step of uploading photos or videos from the event after the digital album is shared.

According to an embodiment of the present invention, the computer implemented method further comprising the step of displaying a list of the photographers, and each of the photographer's the upload preference, and each of the photographer's photographer response.

According to an embodiment of the present invention, the computer implemented method wherein the event owner may delete only the event, and may also delete the event and the digital album together.

According to an embodiment of the present invention, the computer implemented method further comprising the step of providing the photographers the option to change the upload preference at a later time.

According to an embodiment of the present invention, the computer implemented method further comprising the step of sending a notification to the photographers prior to the beginning of the event reminding the photographers of the photographer response, and informing the photographer that event is about to start.

According to an embodiment of the present invention, the computer implemented method further comprising the step of providing the photographer the opportunity to change the upload preference upon receiving the notification.

According to an embodiment of the present invention, the computer implemented method wherein, the request to share is forwarded to a non-invitee and the request to share is converted to an invitation to the event.

According to an embodiment of the present invention, the computer implemented method further comprising the step of defining a pre-event duration and/or post-event duration of zero or more hours during which additional photos or videos corresponding to pre-event and/or post-event activities can be uploaded.

According to an embodiment of the present invention, the computer implemented method further comprising the step of providing the invitees or photographers with the opportunity to choose a new invitee response or photographer response respectively upon change of one or more of the event date or time, the pre-event duration, the post-event duration, or manual upload duration.

According to an embodiment of the present invention, the computer implemented method further comprising the step of defining a manual upload duration during which the photographers may continue to manually upload the photos or videos after the event, but before the digital album is shared.

According to an embodiment of the present invention, the computer implemented method further comprising the step of providing the photographers with the opportunity to choose a new photographer response upon change of one or more of the event date or time, pre-event duration, the post-event duration and the manual upload duration.

According to an embodiment of the present invention, the computer implemented method wherein photos or videos transferred from an unsupported device are uploaded to the central location.

According to an embodiment of the present invention, the computer implemented method wherein photos or videos uploaded to the central location are limited to photos or videos which were produced by the camera of the photographer's photo or video device during the event.

According to an embodiment of the present invention, the computer implemented method further comprising the step of providing the event owner with the option to share the digital album with persons selected from the group comprising (a) all event invitees, (b) event attendees only, or (c) nobody.

According to an embodiment of the present invention, the computer implemented method wherein the digital album is automatically shared.

According to an embodiment of the present invention, the computer implemented method further comprising the step of providing the event owner with the option to manually share the digital album at any time.

According to an embodiment of the present invention, the computer implemented method further comprising the step of sharing the digital album when empty to allow access to the digital album before any of the photos or videos taken during the event have been uploaded.

According to an embodiment of the present invention, the computer implemented method further comprising the step of generating recurring event invitations, including requests to share, for recurring events.

According to an embodiment of the present invention, the computer implemented method wherein each the digital album is only automatically created as each recurring event approaches in time.

According to an embodiment of the present invention, the computer implemented method further comprising the steps of:
providing the photographers the option to change the upload preference at a later time; sending a notification to the photographers prior to the beginning of the event reminding the photographers of the photographer response, and informing the photographer that event is about to start; providing the photographer the opportunity to change the upload preference upon receiving the notification; converting the request to share into an invitation to the event when the request to share is forwarded to another person; defining a pre-event duration and/or post-event duration of zero or more hours during which additional the photos or videos corresponding to pre-event and/or post-event activities can be taken; providing the invitees with the opportunity to choose a new invitee response when the event date or time, the pre-event duration, or the post-event duration is changed; defining a manual upload duration during which the photographers may continue to manually upload the photos or videos after the event, but before the digital album is shared; providing the photographers with the opportunity to choose a new photographer response when the event date or time, the pre-event duration, the post-event duration, or the manual upload duration are changed; uploading the photos or videos; displaying a border frame on the screen of the device to visually indicate to the photographer that the photos or videos taken during the event will be uploaded; uploading from a supported device the photos or videos which may have been taken using an unsupported photo or video taking device and caused to be moved to the supported device; limiting the photos or videos which are uploaded to only those produced by the camera of the photographer's photo or video device during the event, pre-event duration, or post-event duration; providing the event owner with the option to share the digital album at time T with a group of persons selected from the group comprising, (a) all event invitees, (b) event attendees only; or (c) nobody; sharing the digital album; providing the event owner with the option to manually share the digital album at any time; sharing the digital album even when empty, allowing access to the digital album even before any of the photos or videos have been uploaded; and generating recurring event invitations, including requests to share, for recurring events.

According to an embodiment of the present invention, A system for sharing photos and videos related to an event through a central location comprising: a computing device; an application comprising computer-executable code stored in non-volatile memory configured to: send invitations for the event from an event owner to zero or more invitees; assign an event owner and zero or more of the invitees as photographers; send to the photographers a request to share photos or videos taken during the event; limit the ability to send the request to share to the event owner; receive from the invitees an invitee response to the invitation; receive from the photographers a photographer response to the request to share; define a pre-event duration and/or post-event duration of zero or more hours during which additional the photos or videos corresponding to pre-event and/or post-event activities can be taken; define a manual upload duration during which the photographers may continue to manually upload the photos or videos after the event, but before the digital album is shared; provide the photographers with the opportunity to choose a new photographer response when the pre-event duration, the post-event duration, or the manual upload duration is changed; provide the invitees the opportunity to change the invitee response when the event date or time, pre-event duration, or post-event duration is changed; provide the photographers an upload option for identifying an upload preference to upload the photos or videos to the central location either, wherein the upload option is selected from the group comprising (a) automatically, (b) manually, or (c) by confirmation; provide the photographers the ability to change the upload preference at any time; send a notification to the photographers prior to the beginning of the event reminding the photographers of the photographer response and informing the photographer that event is about to start; provide the photographer the opportunity to change the upload preference upon receiving the notification; create a digital album for collecting the photos and videos corresponding to the event; upload the photos or videos taken during the event; display a border frame on the screen of the device to visually indicate to the photographer that the photos or videos taken during the event will be uploaded; allow for upload of the photos or videos which were not taken by supported device, but which were taken during the event, pre-event duration, or post-event duration by the photographer using an unsupported device, the photos or videos being later transferred to the supported device; limit the photos or videos which are uploaded to only those produced by the camera of the photographer's photo or video taking device during the event, pre-event duration, or post-event duration; share the digital album at time T with a group of persons selected from the group comprising (a) all event invitees, (b) event attendees only, or (c) nobody; share the digital album; manually share the digital album at any time; provide access to the digital album before any of the photos or videos have been uploaded; generate recurring event invitations, including requests to share, for recurring events.

Figure 1A:
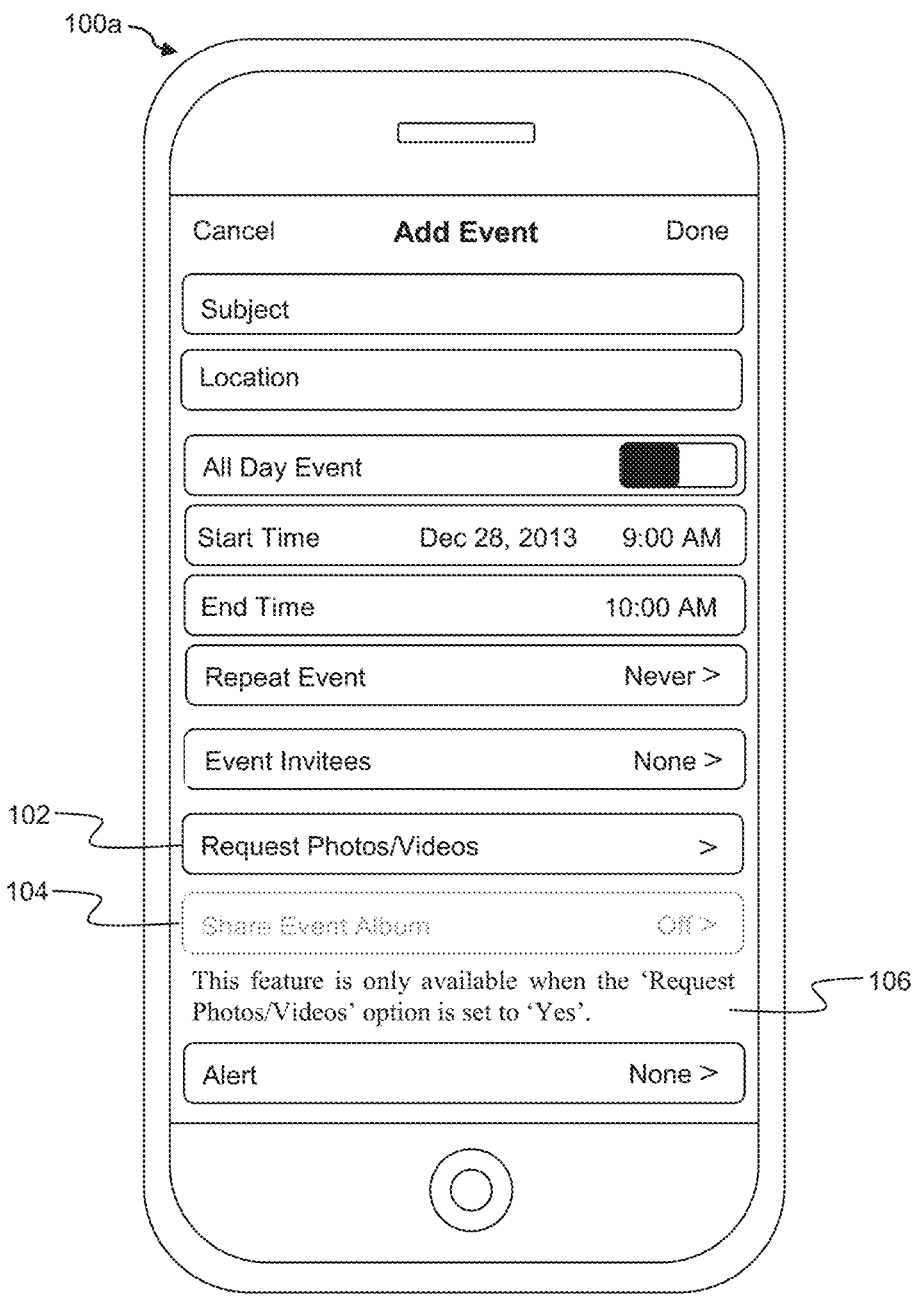
FIG. 1A illustrates an exemplary user interface of the main screen of a calendar event, as seen by an event owner, displaying the following additional photo/video sharing related options/sub-options on the screen—'Request Photos/Videos' and 'Share Event Album'. Using 'Request Photos/Videos' option, an event owner would be able to indicate if they wish to request sharing of photos/videos from certain invitees for the event, and therefore, would also be able to pre-assign photographers for the event. Using 'Share Event Album' option, an event owner would be able to indicate if and how they wish to share the event's photo/video album with the selected set of guests once an event is complete. However, as this figure illustrates the 'Share Event Album' option/sub-options would be initially disabled (grayed out) on the screen until the 'Request Photos/Videos' option is set to 'Yes' by an event owner.
Figure 1B:
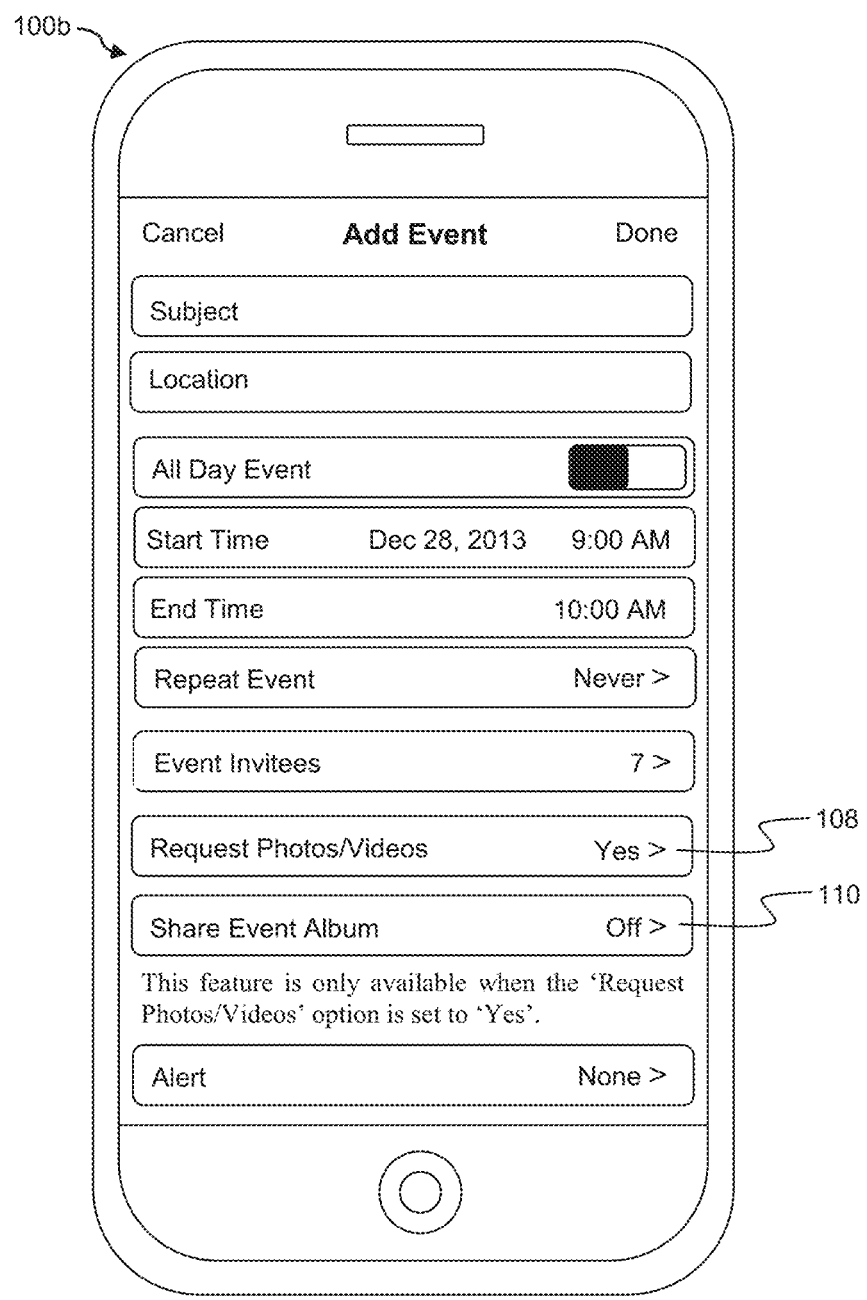

FIG. 1B illustrates an exemplary user interface of the main screen of a calendar event, as seen by an event owner, displaying how the 'Share Event Album' option/sub-options instantly become enabled when 'Request Photos/Videos' option is changed to 'Yes' by an event owner.

Figure 1C:
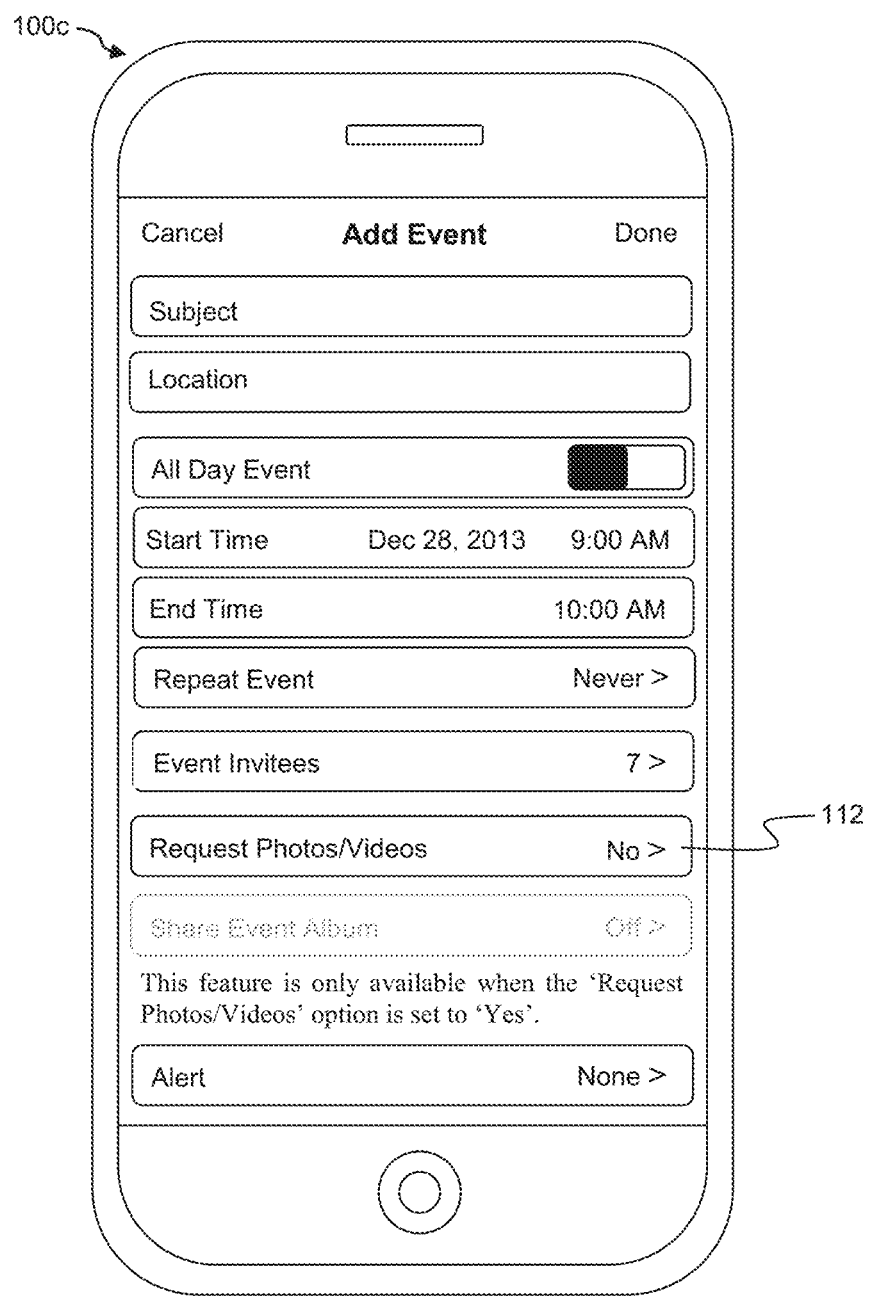

FIG. 1C illustrates an exemplary user interface of the main screen of a calendar event, as seen by an event owner, displaying how the 'Share Event Album' option/sub-options instantly become disabled (grayed out) when 'Request Photos/Videos' option is changed to 'No' by an event owner.

Figure 2A:
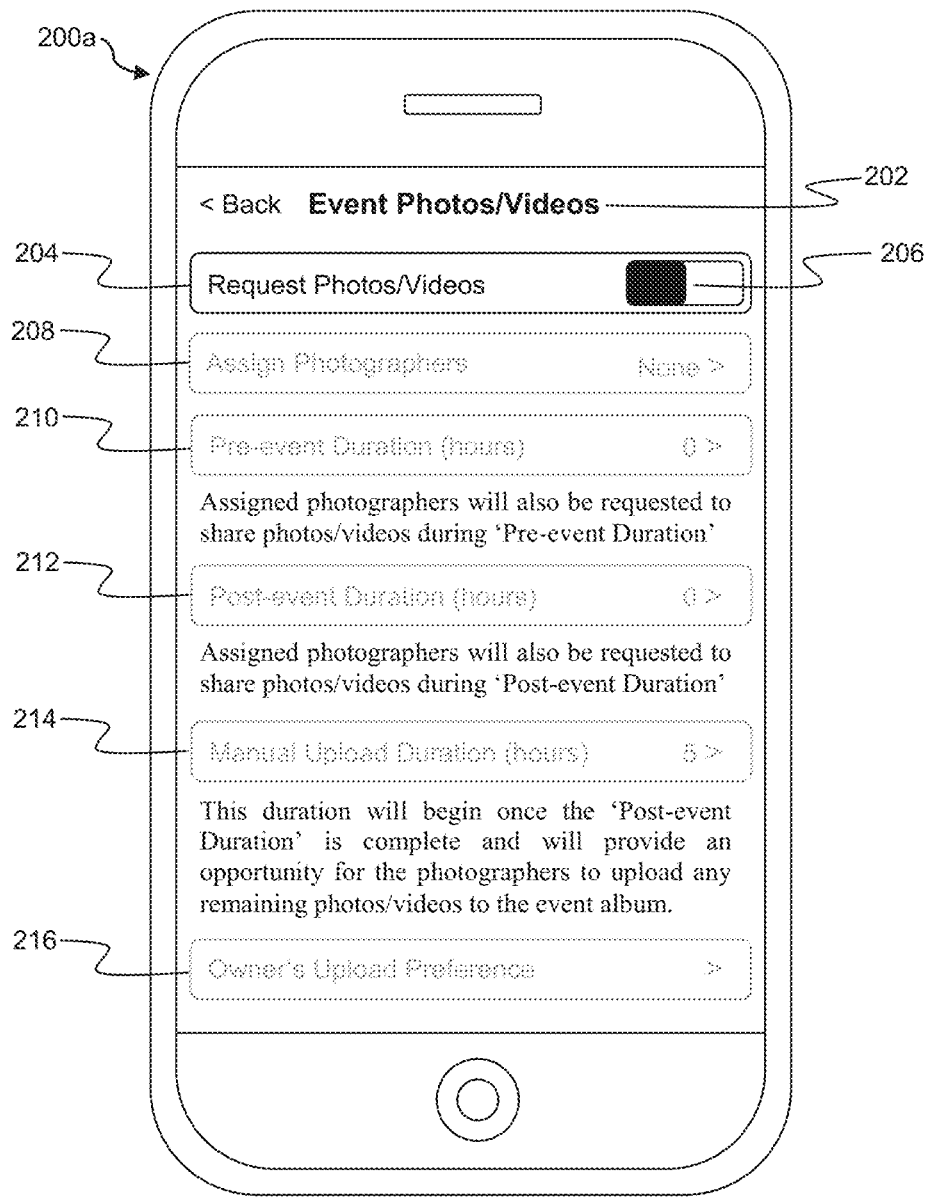

FIG. 2A illustrates an exemplary user interface of the 'Event Photos/Videos' screen of a calendar event, as seen by an event owner. Using this screen, an event owner would be able to indicate if they wish to request sharing of photos/videos from certain invitees for the event. However, as this figure illustrates, all other fields excluding the 'Request Photos/Videos' field would be disabled (grayed out) until the 'Request Photos/Videos' option is set to 'Yes' by an event owner. In addition, as this figure illustrates, 'Go to Event Album' button wouldn't yet display on this screen because the calendar event hasn't yet been saved by the event owner.

Figure 2B:
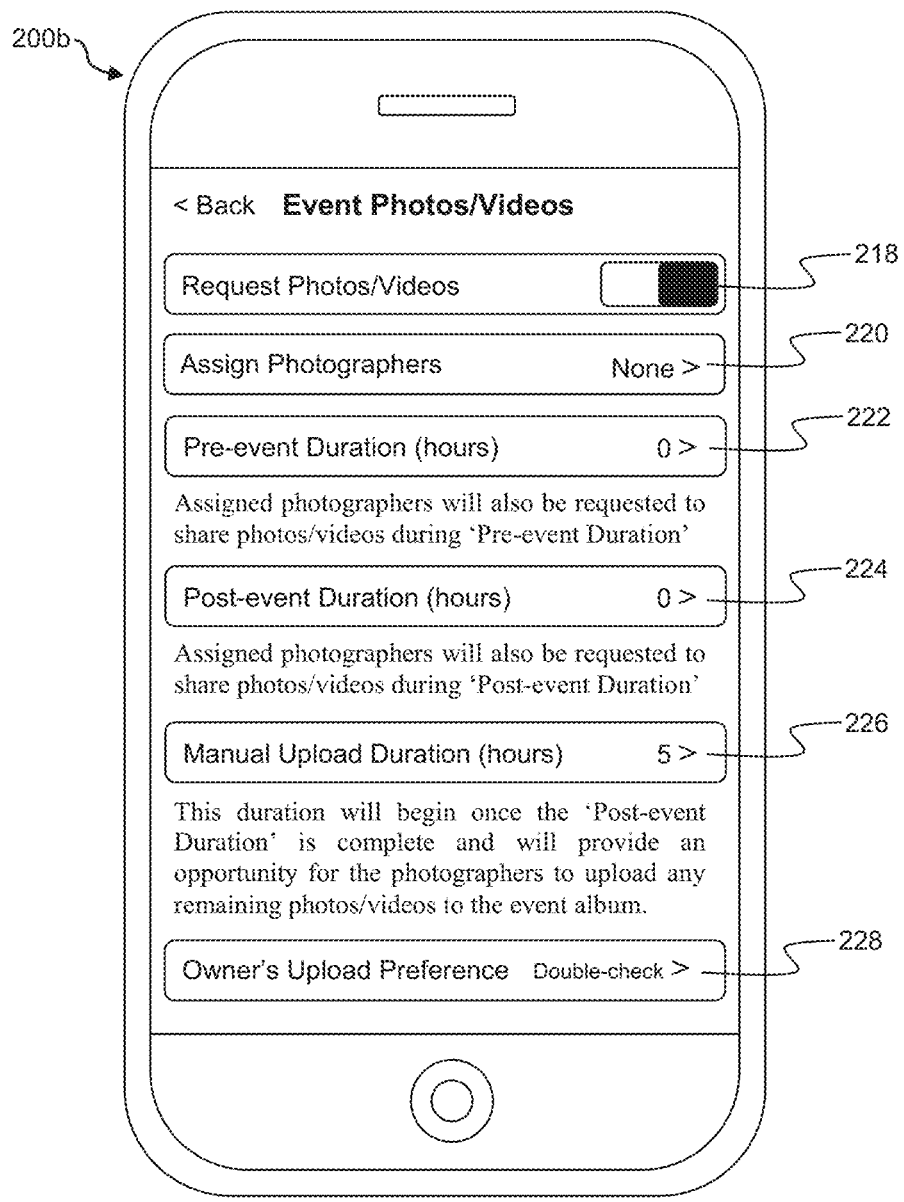

FIG. 2B illustrates an exemplary user interface of the 'Event Photos/Videos' screen of a calendar event, as seen by an event owner, displaying how all the fields on the screen are instantly enabled when the 'Request Photos/Videos' field is changed to 'Yes' by an event owner. Using these enabled fields, an event owner would not only be able to assign photographers for the event, but would also be able to set the values for 'Pre-event Duration', 'Post-event Duration', 'Manual Upload Duration' as well as the 'Owner's Upload Preference' field. In addition, as this figure illustrates, 'Go to Event Album' button wouldn't yet display on this screen because the calendar event hasn't yet been saved by the event owner.

Figure 2C:
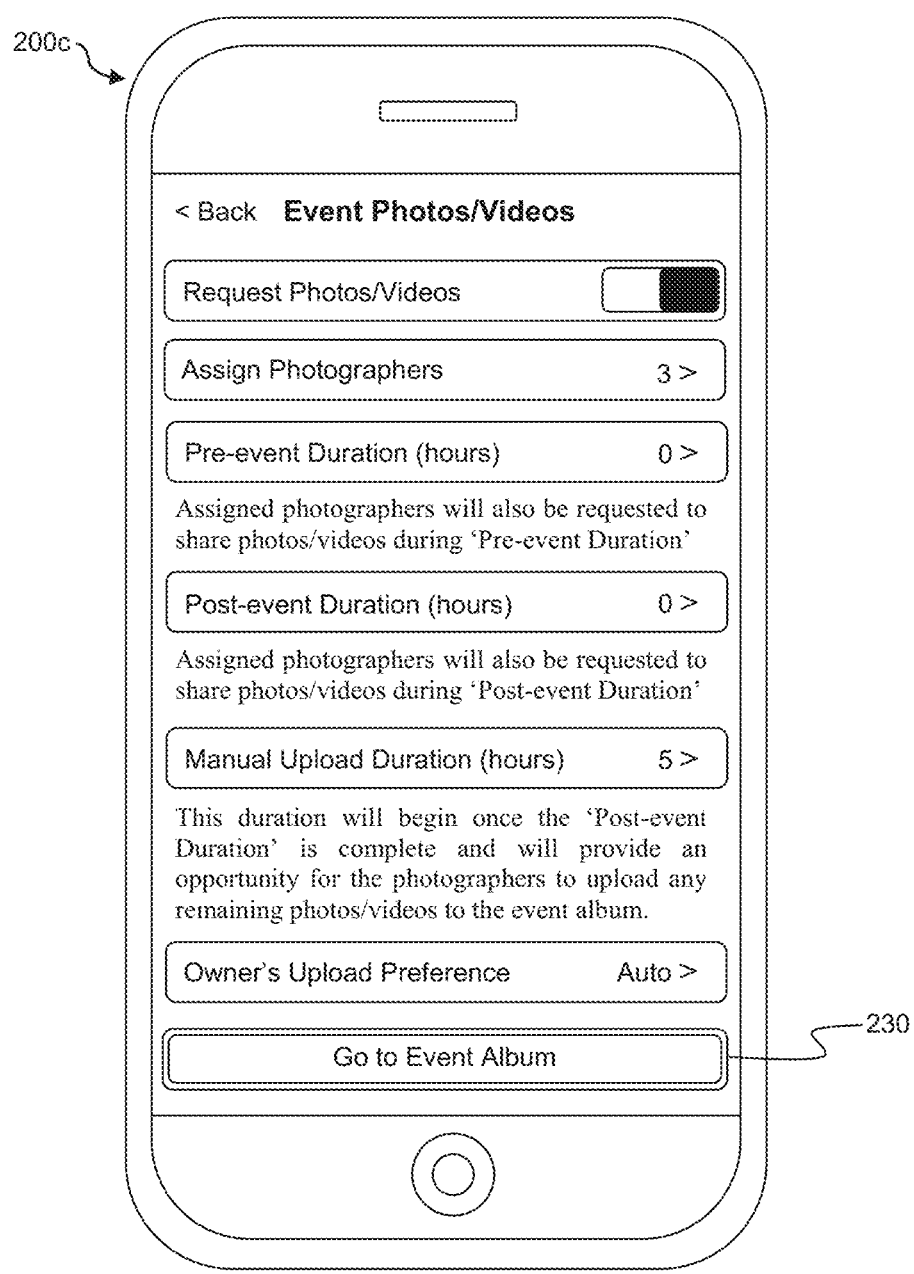

FIG. 2C illustrates an exemplary user interface of the 'Event Photos/Videos' screen of a calendar event, as seen by an event owner, displaying the 'Go to Event Album' button at the bottom of the screen. The reason this button is now visible on this screen indicates that the event was already saved previously i.e. the associated event album was already created and can now be linked from the calendar event.

Figure 3A:
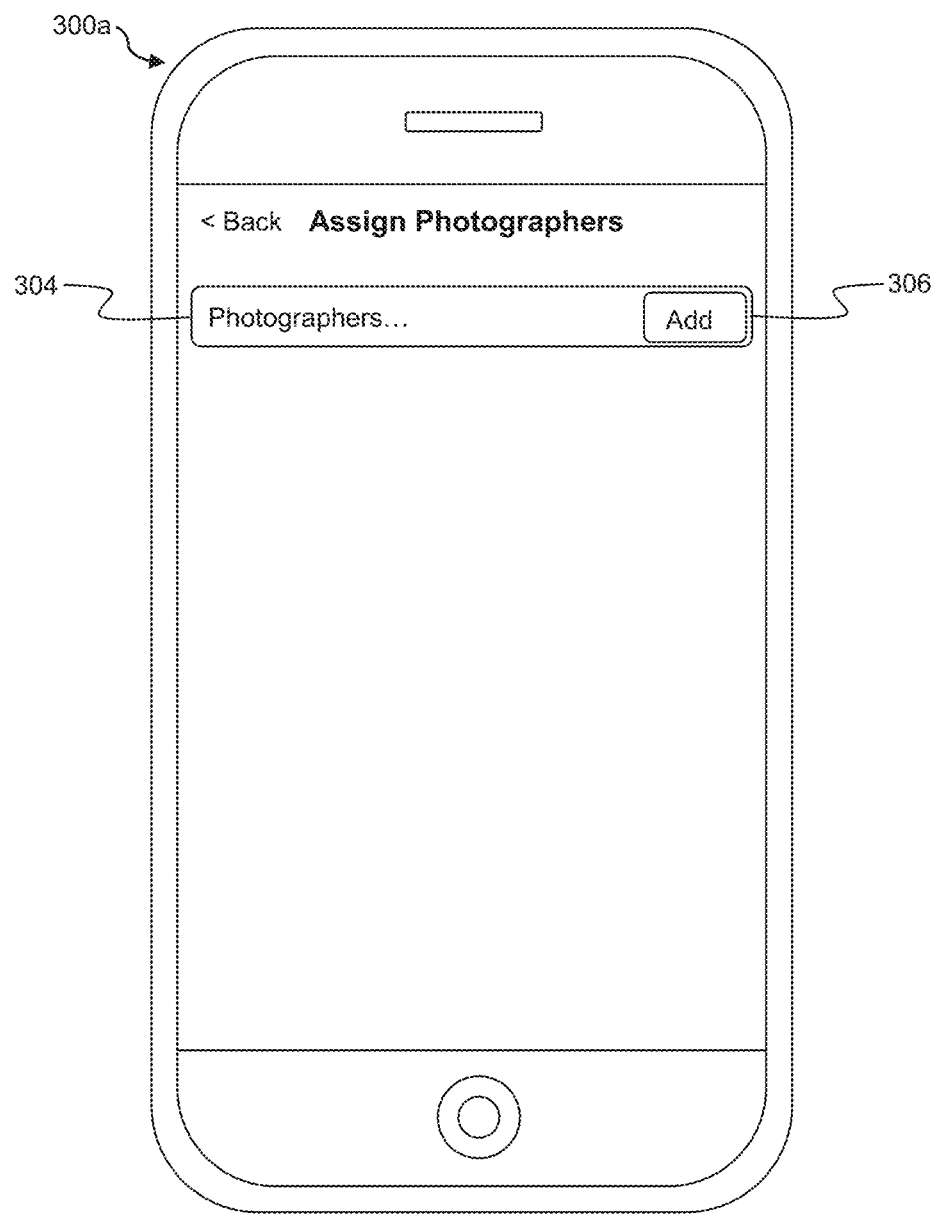

FIG. 3A illustrates an exemplary user interface of the 'Assign Photographers' screen of a calendar event, as seen by an event owner, having an 'Add' option available to be able to assign photographers for the event.

Figure 3B:
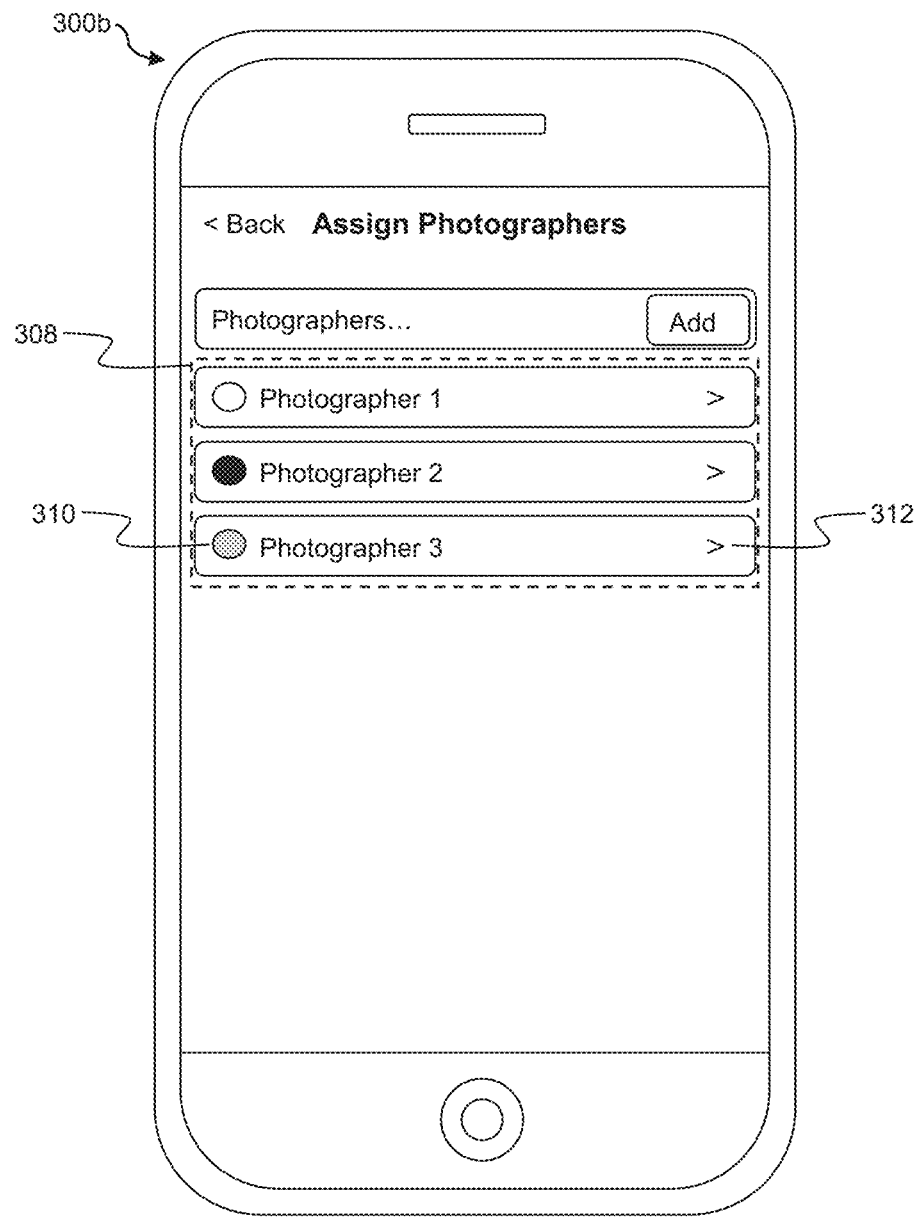

FIG. 3B illustrates an exemplary user interface of the 'Assign Photographers' screen of a calendar event, as seen by an event owner, which not only has an 'Add' option in order to assign additional photographers, but also lists those photographer invitees that might have already been assigned earlier. Note: Once the photographer invitees respond to their photo/video sharing request for the event, then each photographer invitee's latest response would also be indicated on this 'Assign Photographers' screen next to their names, using a green circle (Accept), red circle (Decline) or a blank circle (No response yet).

Figure 3C:
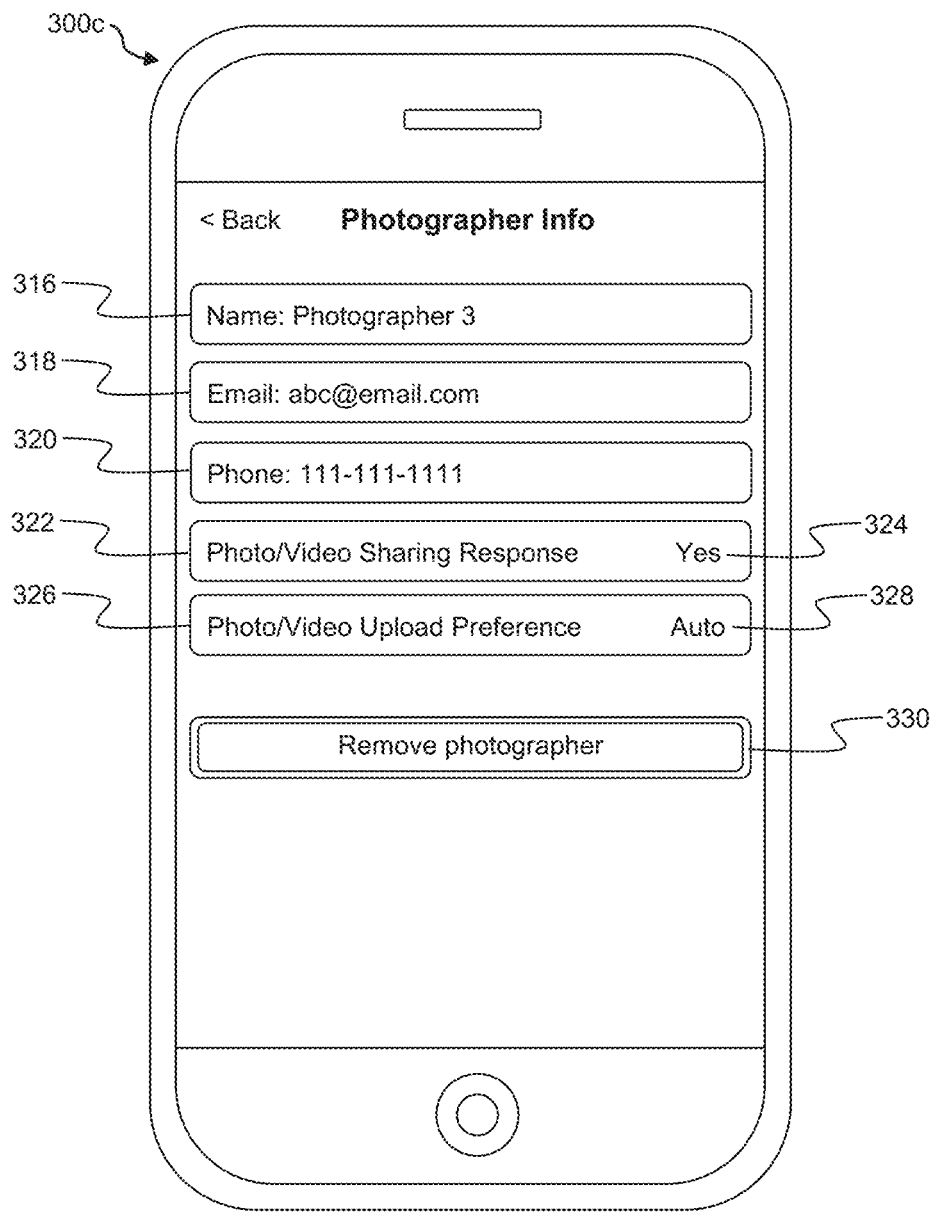

FIG. 3C illustrates an exemplary user interface of the 'Photographer Info' screen of a calendar event, as seen by an event owner, displaying not only the contact details (Name, Email, Phone) of the photographer invitee but also their photo/video sharing response as well as their photo/video upload preference for the event. In addition, 'Remove photographer' button would also be enabled on this screen, which would allow an event owner to remove that photographer invitee from the photographer list of the event.

Figure 4A:
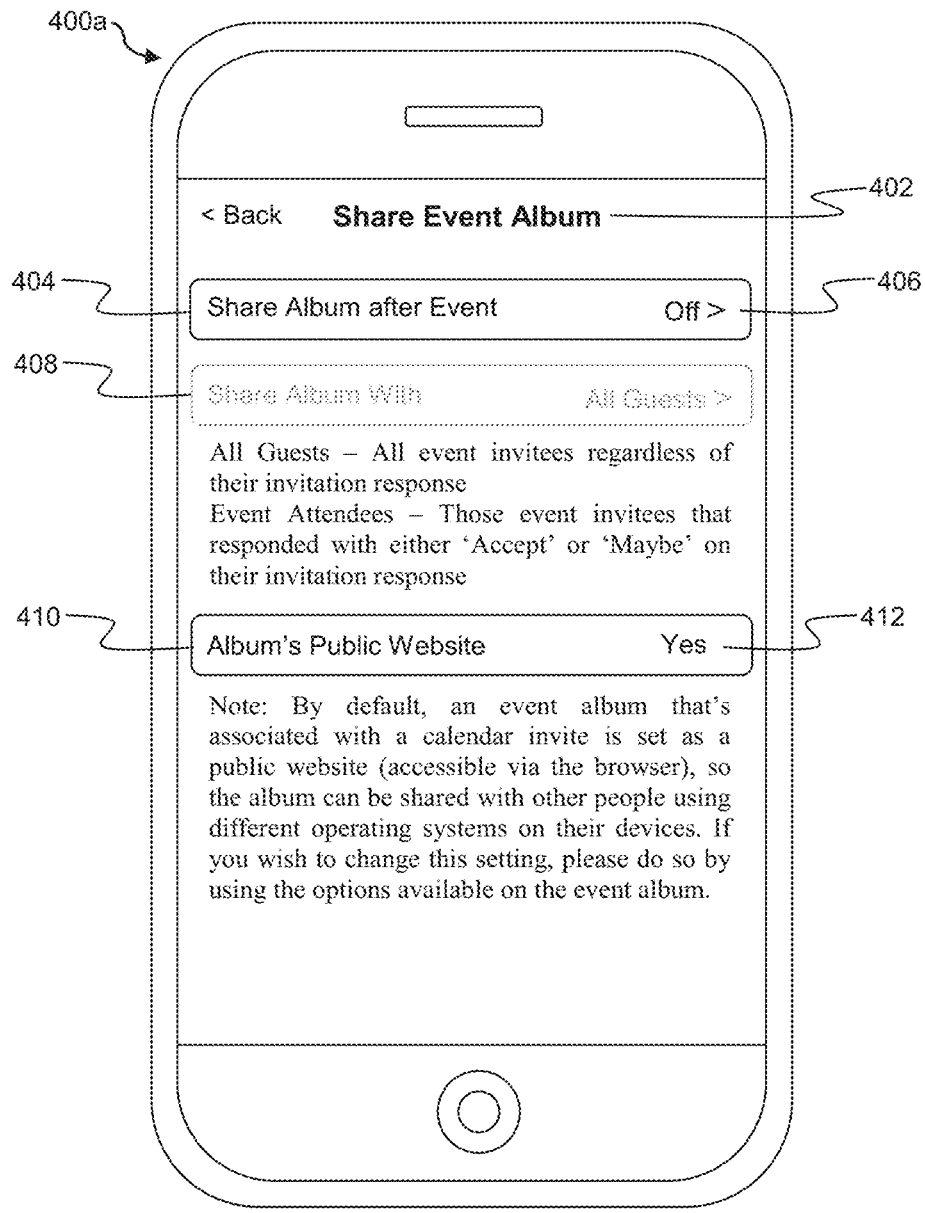

FIG. 4A illustrates an exemplary user interface of the 'Share Event Album' screen of a calendar event, as seen by an event owner. Using this screen, an event owner would be able to indicate if and how they wish to share the event's photo/video album with the selected set of guests once an event is complete. On this screen, 'Share Album With' field would be initially disabled (grayed out) since the 'Share Album after Event' field is set to 'Off' by default. In addition, as this figure illustrates, 'Go to Event Album' button wouldn't yet display on this screen because the calendar event hasn't yet been saved by the event owner. Moreover, 'Share Album Now' button also wouldn't yet display on this screen since the 'Manual Upload Duration' for the event hasn't yet completed.

Figure 4B:
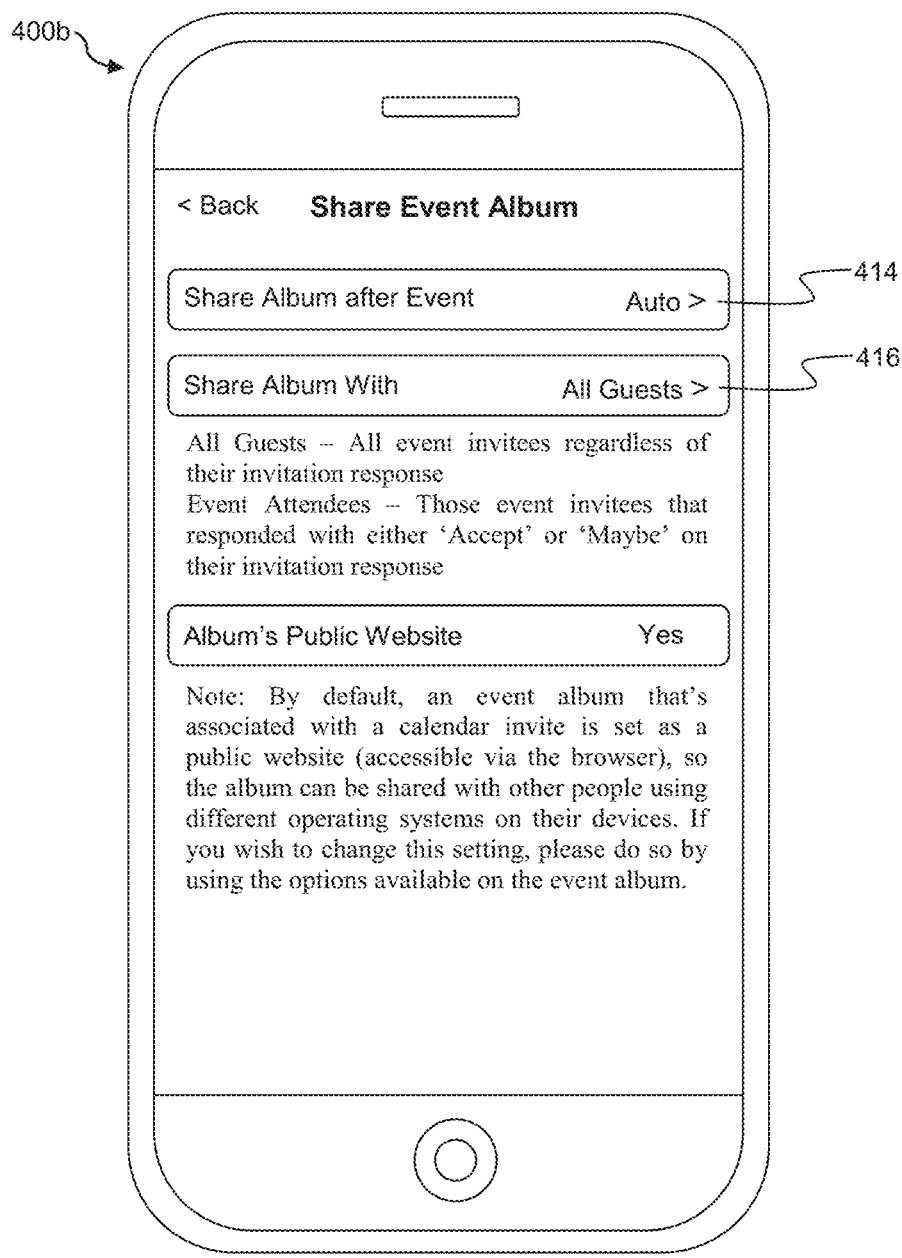

FIG. 4B illustrates an exemplary user interface of the 'Share Event Album' screen of a calendar event, as seen by an event owner, displaying how the 'Share Album With' field instantly becomes enabled when 'Share Album after Event' field is changed to either 'Auto' or 'Manual' by an event owner. Note: The default value for the 'Share Album With' field is set to 'All Guests', and the event's album. In addition, as this figure illustrates, 'Go to Event Album' button wouldn't yet display on this screen because the calendar event hasn't yet been saved by the event owner. Moreover, 'Share Album Now' button also wouldn't yet display on this screen since the 'Manual Upload Duration' for the event hasn't yet completed.

Figure 4C:
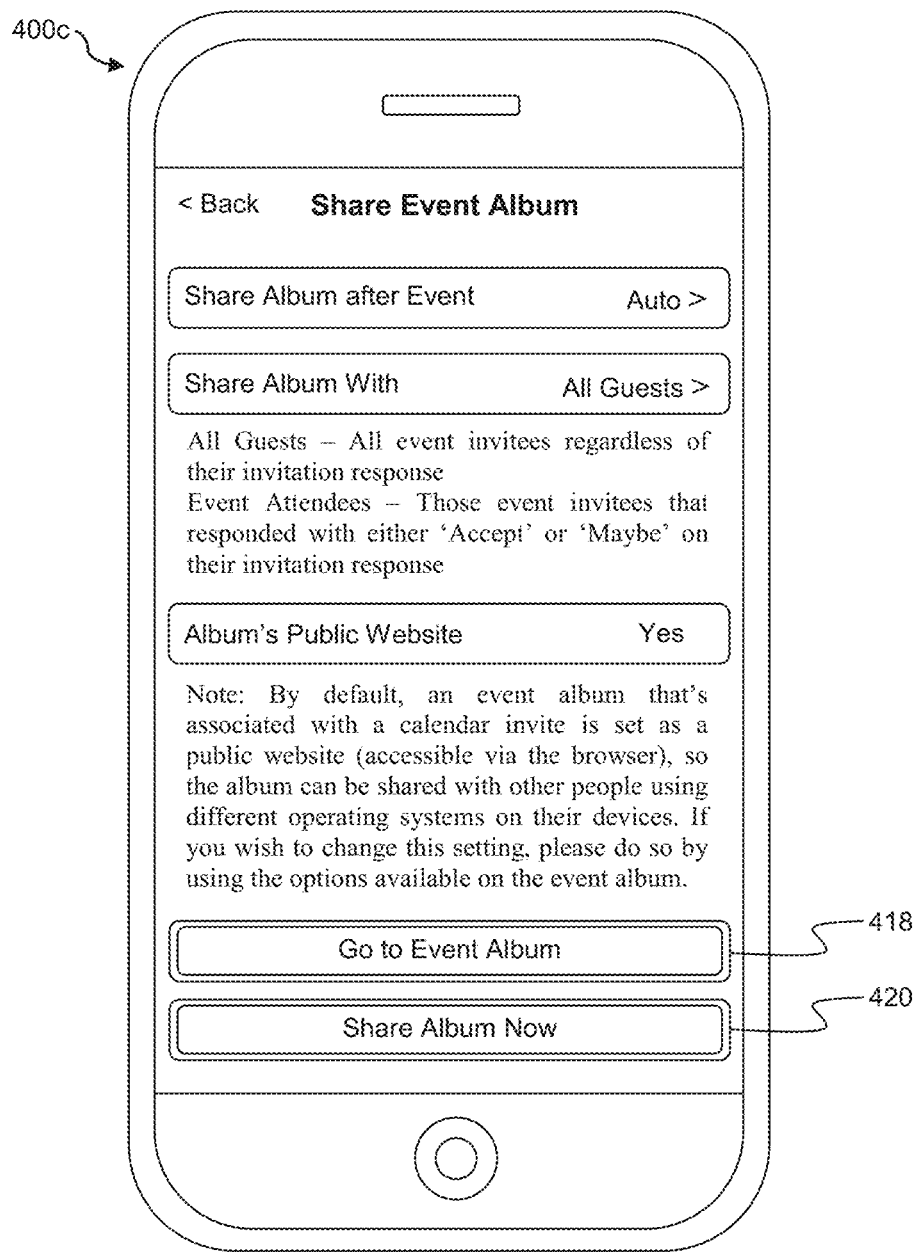

FIG. 4C illustrates an exemplary user interface of the 'Share Event Album' screen of a calendar event, as seen by an event owner, displaying the 'Go to Event Album' button at the bottom of the screen. The reason this button is now visible on this screen indicates that the event was already saved previously i.e. the associated event album was already created and can now be linked from the calendar event. In addition, as the figure illustrates, the 'Share Album Now' button is also visible at the bottom of the screen, indicating that either the value of 'Auto' or 'Manual' might have been selected for the 'Share Album after Event' field as well as the 'Manual Upload Duration' period might have already completed for the event.

Figure 5A:
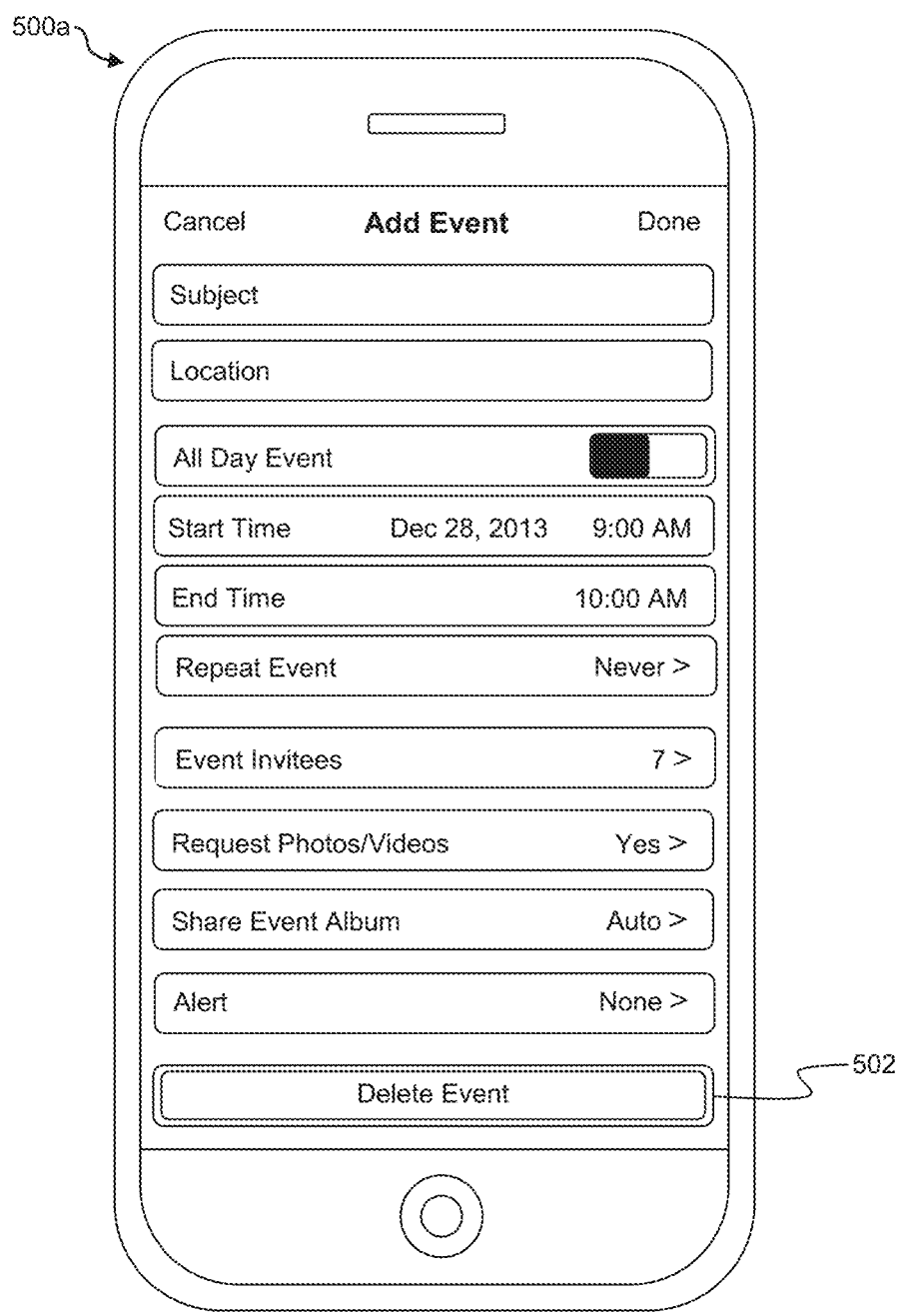

FIG. 5A illustrates an exemplary user interface of the main screen of a calendar event, as seen by an event owner, displaying the 'Delete Event' button at the bottom of the screen. The reason this button is now visible on this screen indicates that the event was already saved previously and now the event owner might be revisiting the main screen of the calendar event.

Figure 5B:
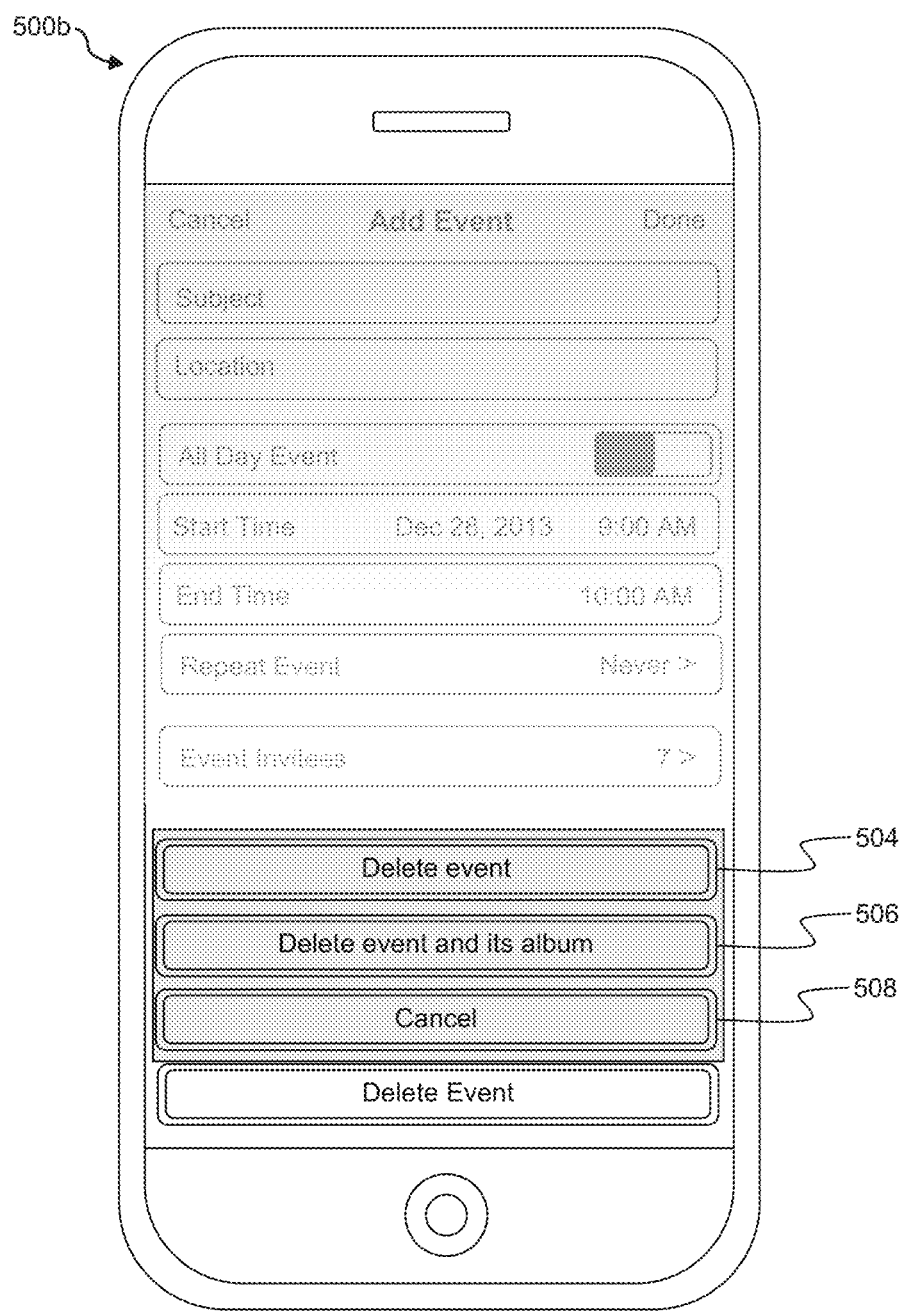

FIG. 5B illustrates an exemplary user interface of the main screen of a calendar event, as seen by an event owner, displaying the available options when 'Delete Event' button is clicked on that event, which has an associated photo/video album. Here is a list of those options—'Delete Event', 'Delete event and its album', 'Cancel'.

Figure 5C:
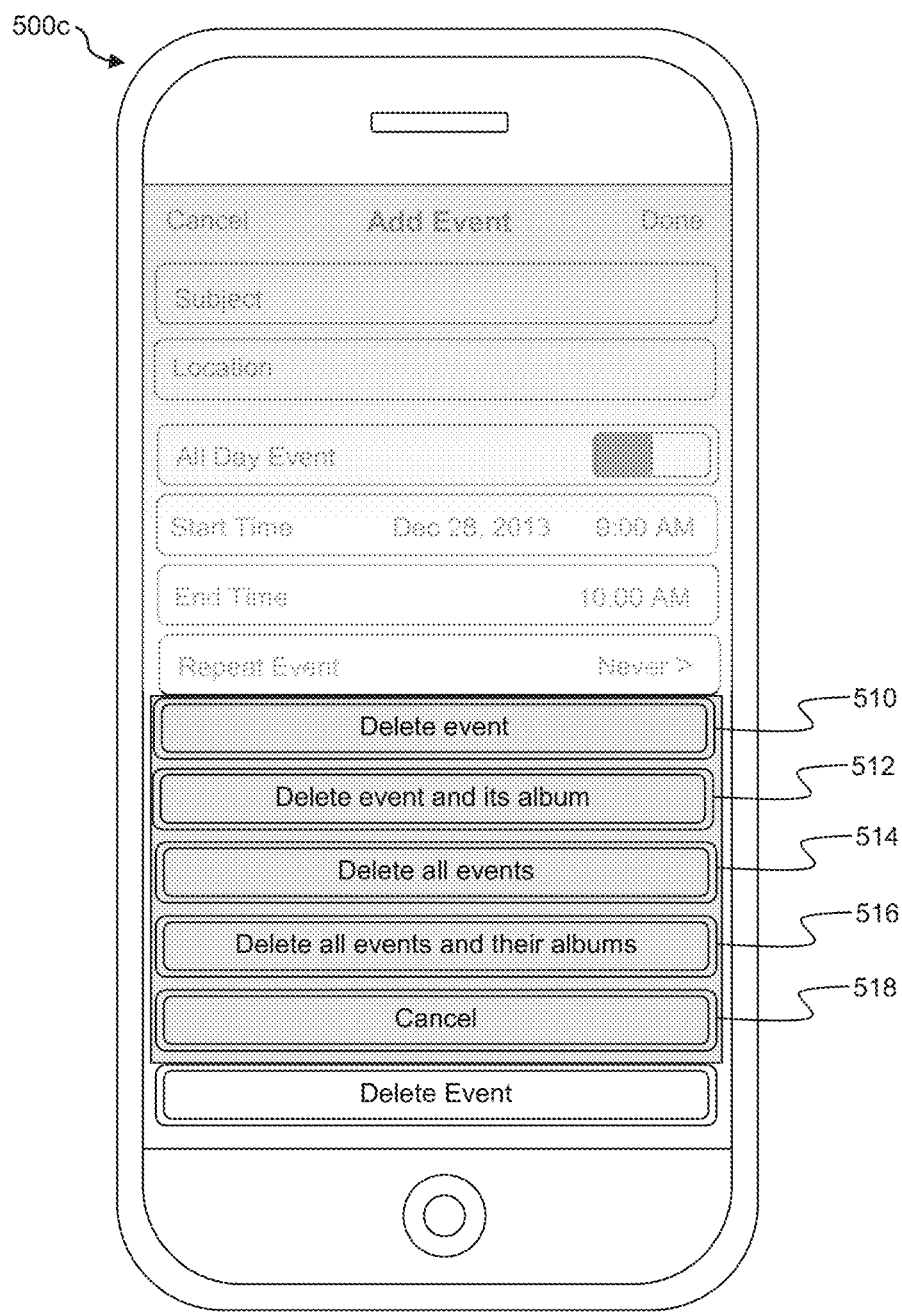

FIG. 5C illustrates an exemplary user interface of the main screen of a recurring calendar event, as seen by an event owner, displaying the available options when 'Delete Event' button is clicked on that recurring event. (Note: this illustration assumes that the recurring event(s) have an associated photo/video album.) The following options would be displayed when 'Delete Event' button is clicked for such a recurring event—'Delete Event', 'Delete event and its album', 'Delete all events', 'Delete all events and their albums', 'Cancel'.

Figure 6A:
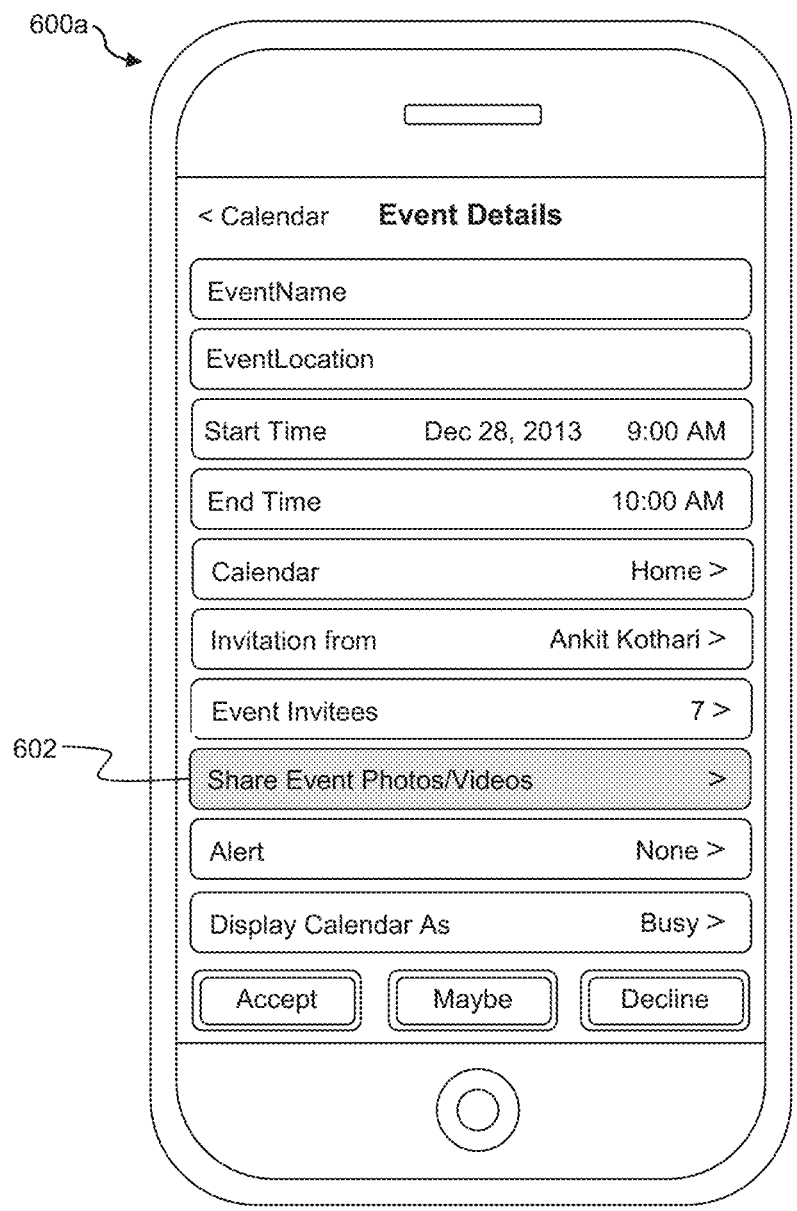

FIG. 6A illustrates an exemplary user interface of the main screen of a calendar event invite, as seen by a photographer invitee, displaying the following additional photo/video sharing related options/sub-options—'Share Event Photos/Videos'. Using 'Share Event Photos/Videos' option, a photographer invitee would be able to indicate if they wish to accept or decline the event's photo/video sharing request. Note: as the figure illustrates, currently there is no value displayed to the right of the 'Share Event Photos/Videos' option since the photographer invitee hasn't yet made their selection for that option and also they haven't yet accepted the overall event invite.

Figure 6B:
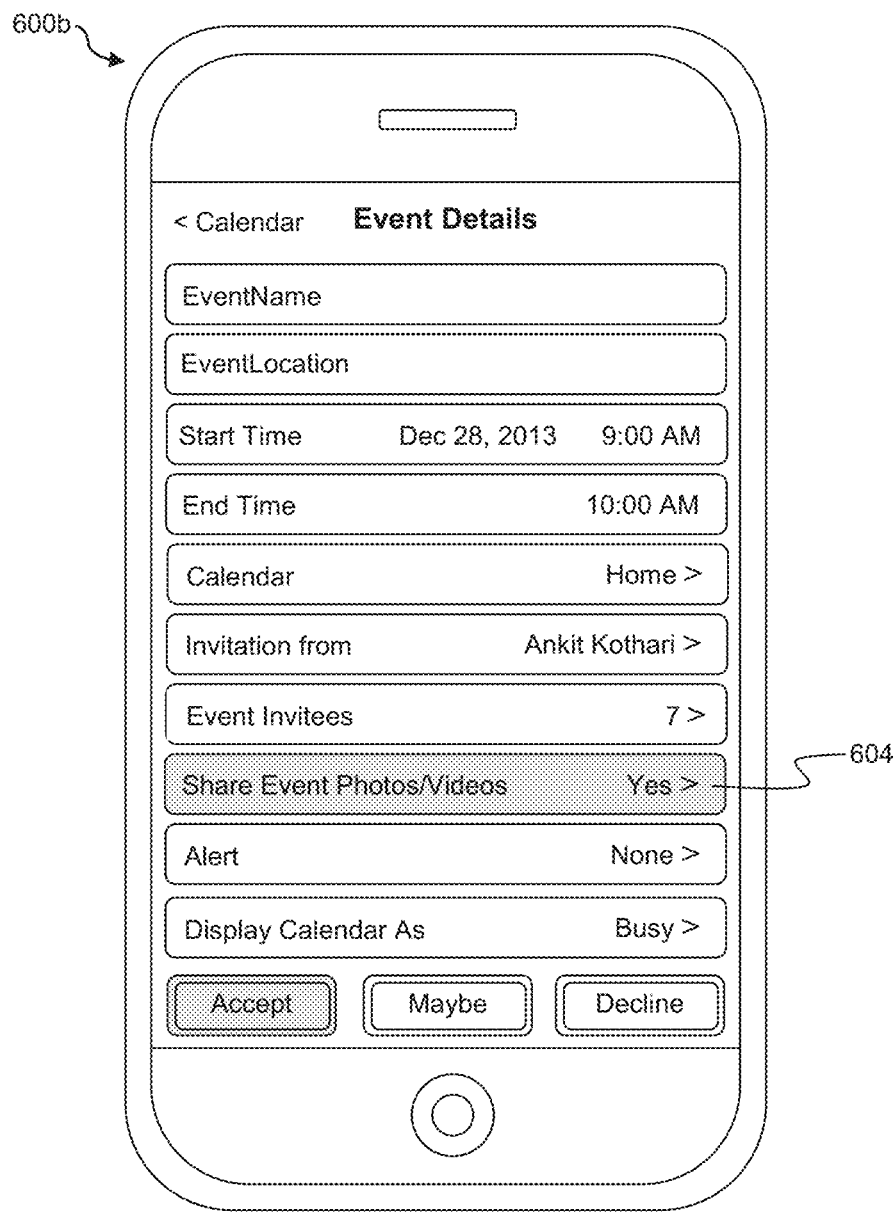

FIG. 6B illustrates an exemplary user interface of the main screen of a calendar event invite, as seen by a photographer invitee, displaying a 'Yes' value next to the 'Share Event Photos/Videos' option indicating that the photographer invitee has accepted the photo/video sharing request for the event. In addition, this figure also illustrates that the photographer invitee has accepted the overall event invitation i.e. 'Accept' button has been selected on the screen.

Figure 7A:
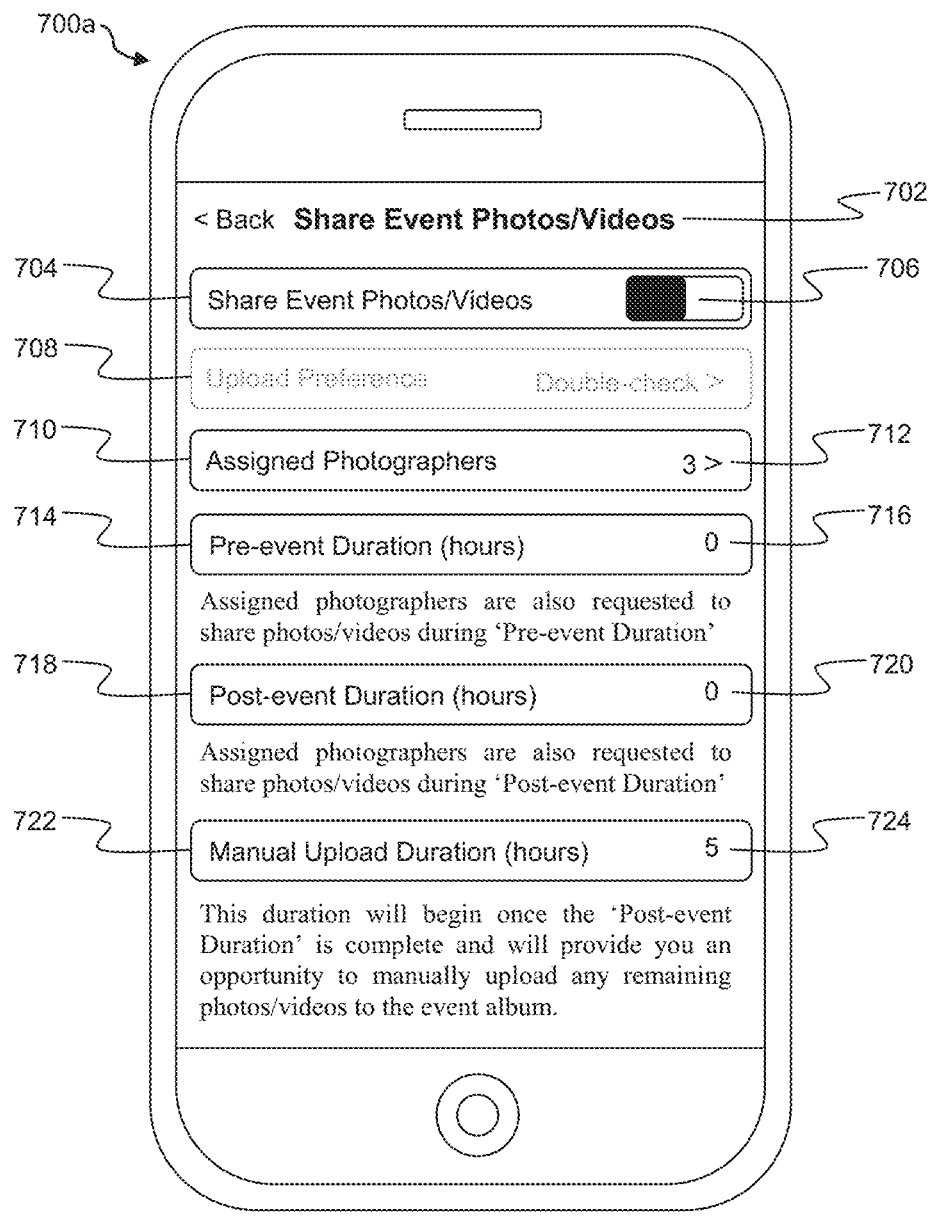

FIG. 7A illustrates an exemplary user interface of the 'Share Event Photos/Videos' screen of a calendar event invite, as seen by a photographer invitee. Using this screen, a photographer invitee would be able to indicate if they wish to accept or decline the event's photo/video sharing request. (Note: 'Share Event Photos/Videos' field will have a default value of 'No') In addition, as this figure illustrates, 'Upload Preference' field on this screen would continue to remain disabled (grayed out) until the 'Share Event Photos/Videos' field is changed to 'Yes' by the photographer invitee. Note: using this screen, a photographer invitee would also be able to view other assigned photographers for the event as well as view the read-only values set for 'Pre-event Duration', 'Post-event Duration' and 'Manual Upload Duration' fields. On a side note, 'Go to Event Album' button wouldn't yet display on this screen because the calendar event invite along with the acceptance of photo/video sharing request hasn't yet been saved by the photographer invitee.

Figure 7B:
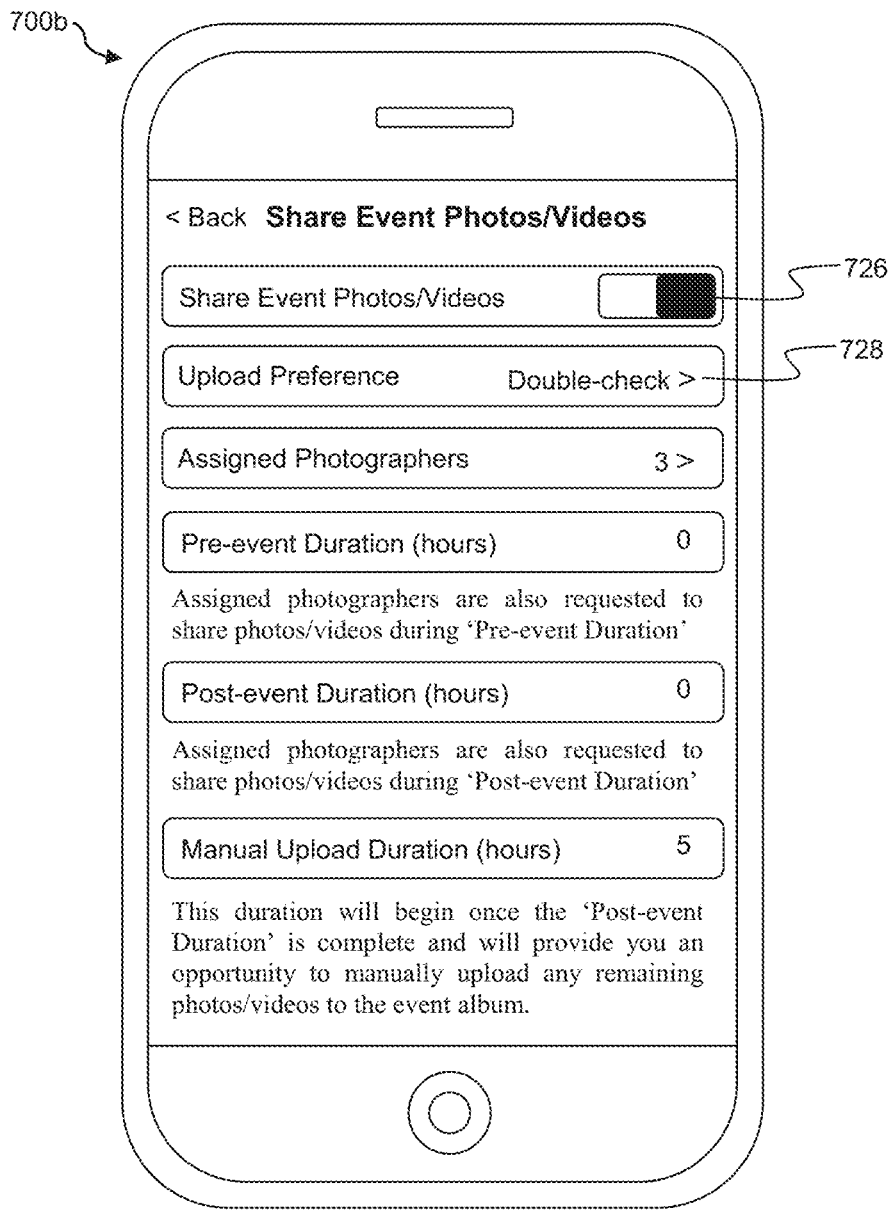

FIG. 7B illustrates an exemplary user interface of the 'Share Event Photos/Videos' screen of a calendar event invite, as seen by a photographer invitee, displaying how the 'Upload Preference' field is instantly enabled when the 'Share Event Photos/Videos' field is changed to 'Yes' by a photographer invitee. In addition, as the figure illustrates, 'Go to Event Album' button wouldn't yet display on this screen because the acceptance of calendar event invitation along with the photo/video sharing request hasn't yet been saved by the photographer invitee.

Figure 7C:
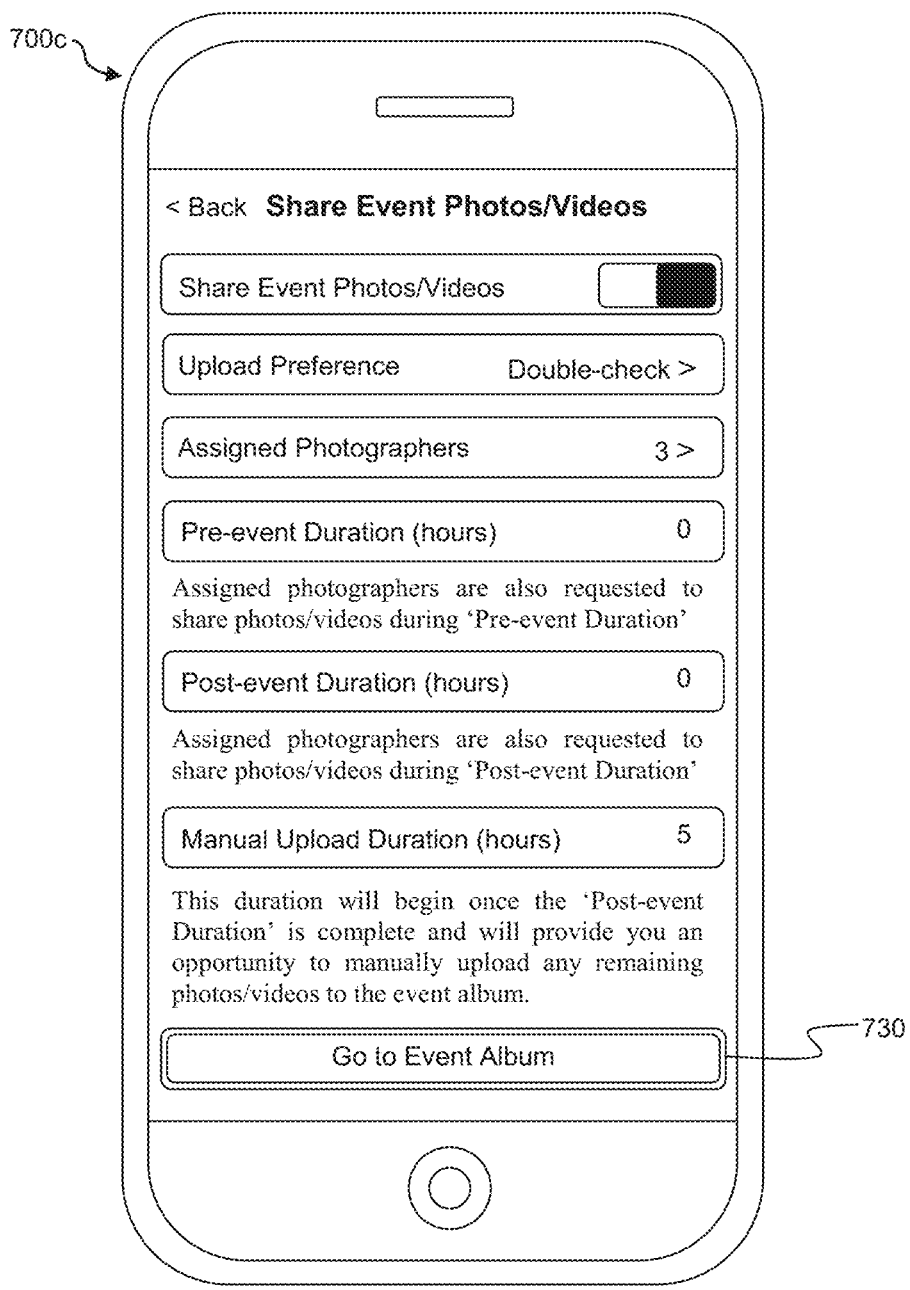

FIG. 7C illustrates an exemplary user interface of the 'Share Event Photos/Videos' screen of a calendar event invite, as seen by a photographer invitee, displaying the 'Go to Event Album' button at the bottom of the screen. The reason this button is now visible on this screen indicates that the acceptance of event invitation along with the photo/video sharing request was already saved previously by the photographer invitee, and now the photographer invitee must be revisiting this screen again. Along the same lines, if the photographer invitee goes ahead and changes the 'Share Event Photos/Videos' to 'No' on the 'Share Event Photos/Videos' screen, then until those changes are saved, 'Go to Event Album' button would not have any impact. On the other hand, if the photographer invitee goes back to the 'Share Event Photos/Videos' screen after they decline the photo/video sharing and save those changes, then they would no longer be able to see the 'Go to Event Album' button at the bottom of that screen.

Figure 8A:
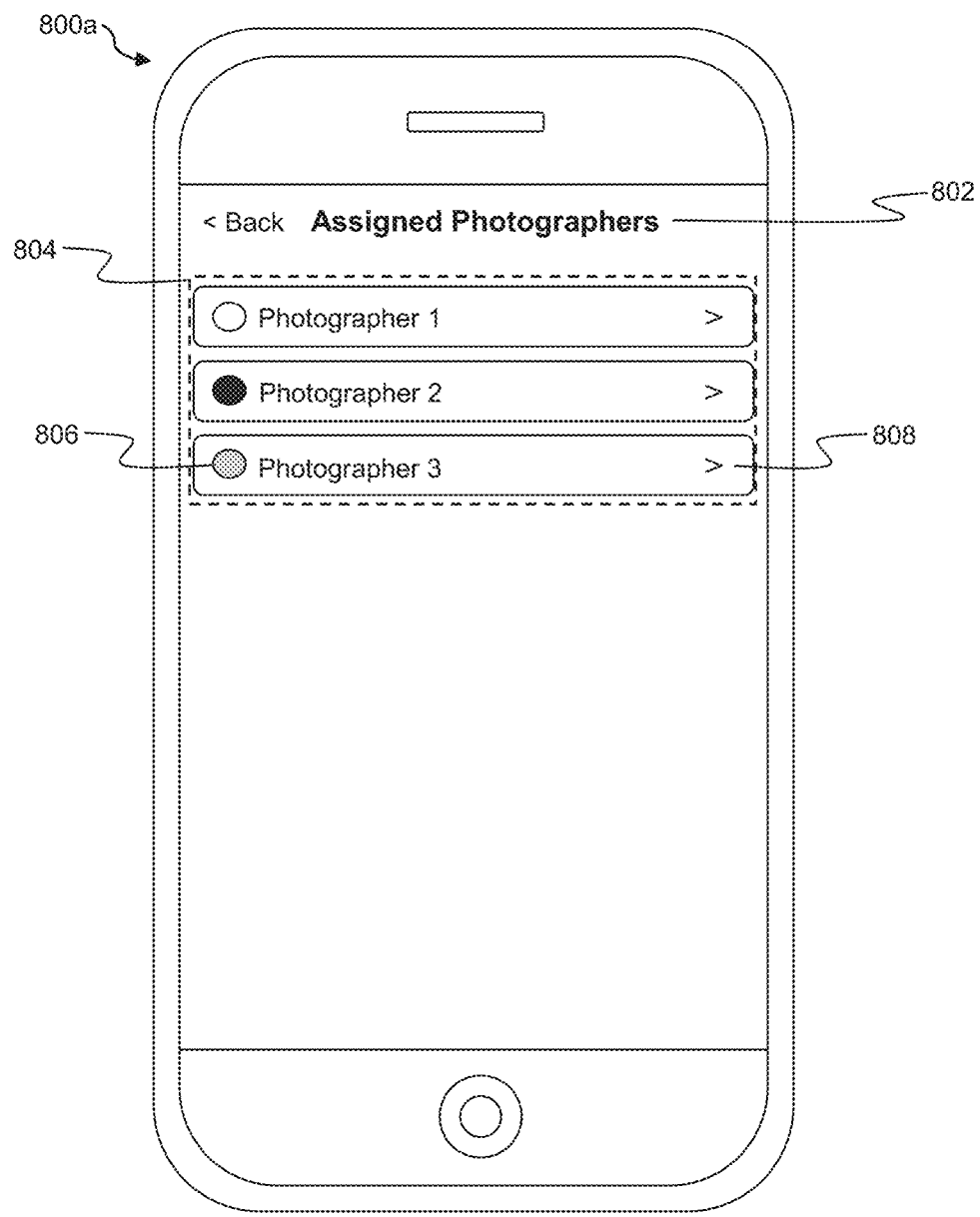

FIG. 8A illustrates an exemplary user interface of the 'Assigned Photographers' screen of a calendar event invite, as seen by a photographer invitee, listing all those photographer invitees that might be assigned to the event by an event owner. Note: Once the assigned photographer invitees respond to their photo/video sharing request for the event, then each photographer invitee's latest response would also be indicated on this 'Assigned Photographers' screen next to their names, using a green circle (Accept), red circle (Decline) or a blank circle (No response yet). In addition, as illustrated on this screen, please note that any of the photographer invitees wouldn't have the permission to add new photographers for an event.

Figure 8B:
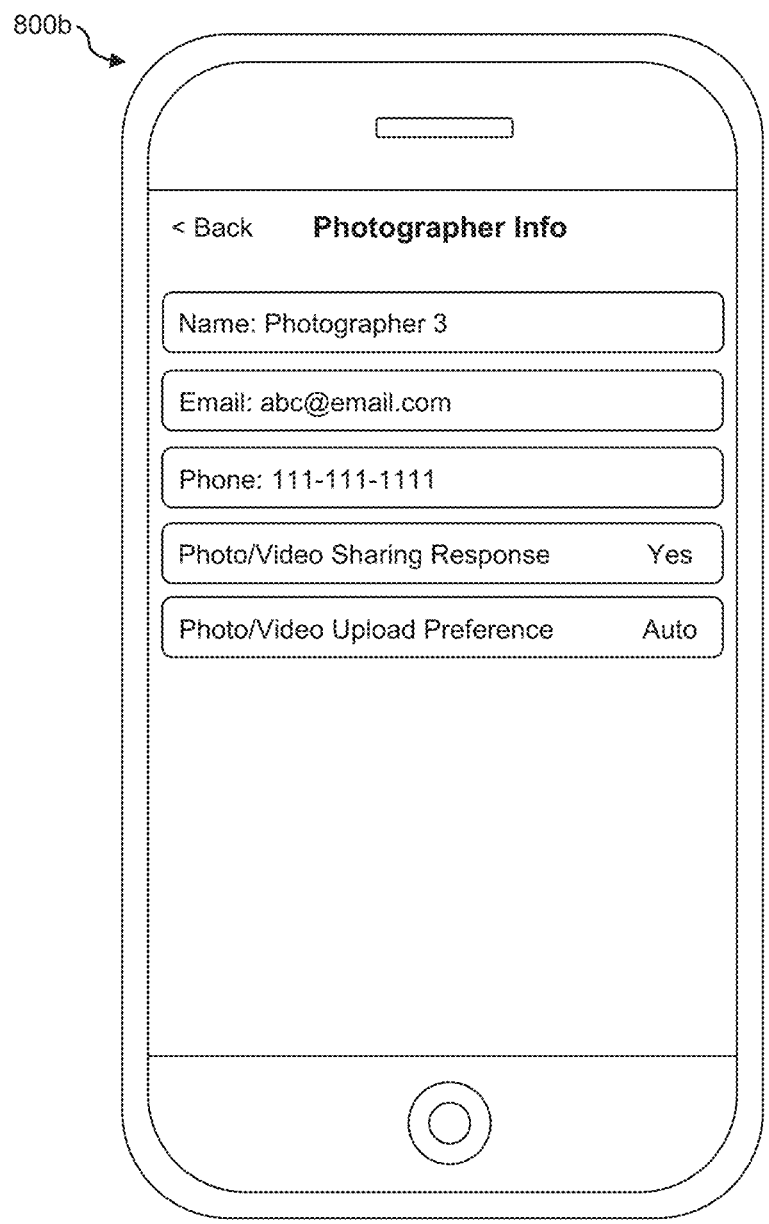

FIG. 8B illustrates an exemplary user interface of the 'Photographer Info' screen of a calendar event invite, as seen by a photographer invitee, displaying not only the contact details (Name, Email, Phone) of the selected photographer invitee but also their photo/video sharing response as well as their photo/video upload preference for the event. In addition, as this figure illustrates, the 'Remove photographer' button wouldn't be enabled on this screen, since a photographer invitee isn't allowed to remove another assigned photographer of an event.

Figure 9:
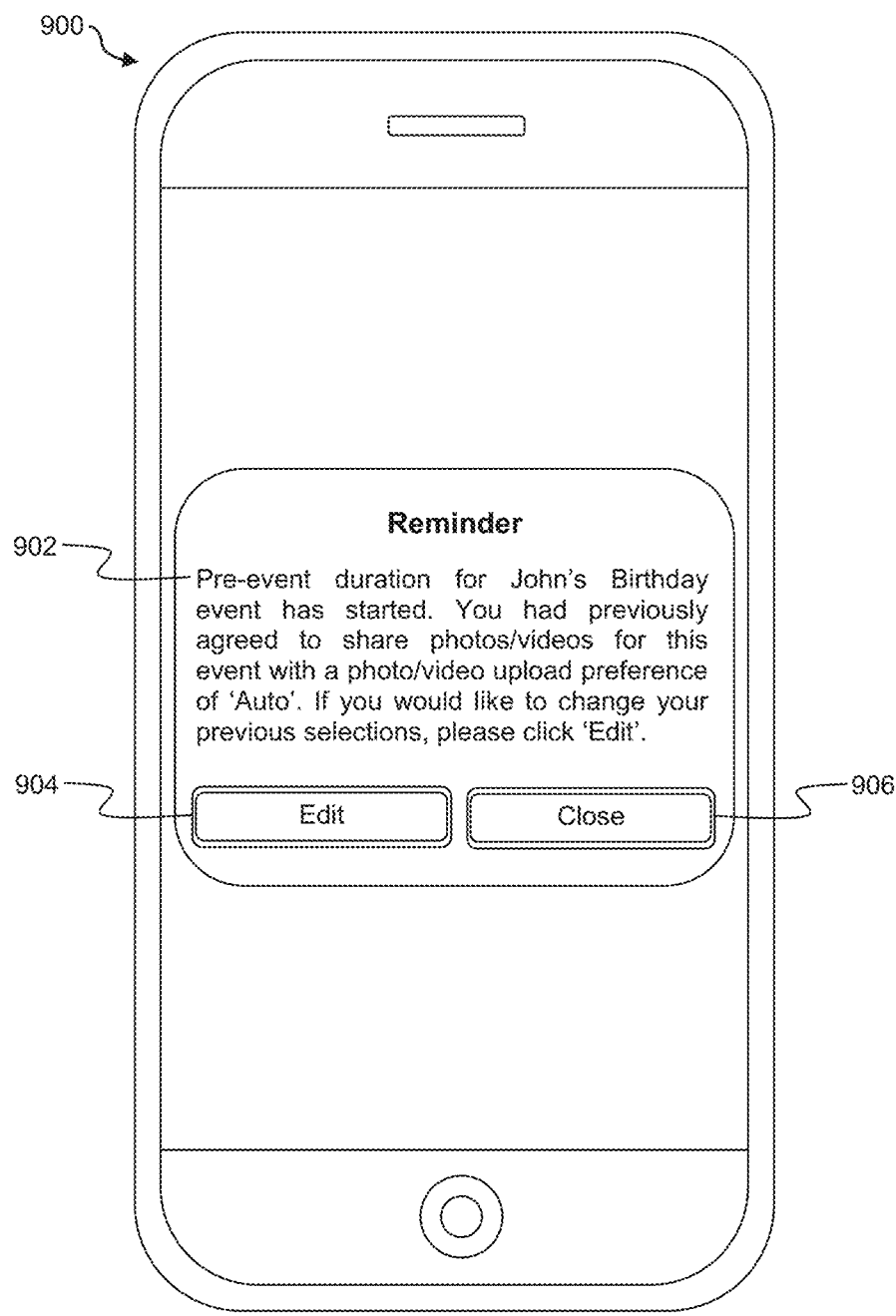

FIG. 9 illustrates an exemplary reminder message that would be displayed to all photographer invitees as well as an event owner at the start of the pre-event duration of an event. Note: In case if the pre-event duration is set to 0 by an event owner, then the reminder message would rather remind everyone that the event has begun instead of the pre-event duration. In addition, as illustrated in the figure, each photographer invitee's last selection of photo/video upload preference would also be displayed on the reminder message, along with an option (Edit' button) to change that photo/video upload preference if needed. (Note: an event owner would also receive similar reminder message, however, the 'Edit' button would instead take them to the calendar event's main setup screen.)

Figure 10A:
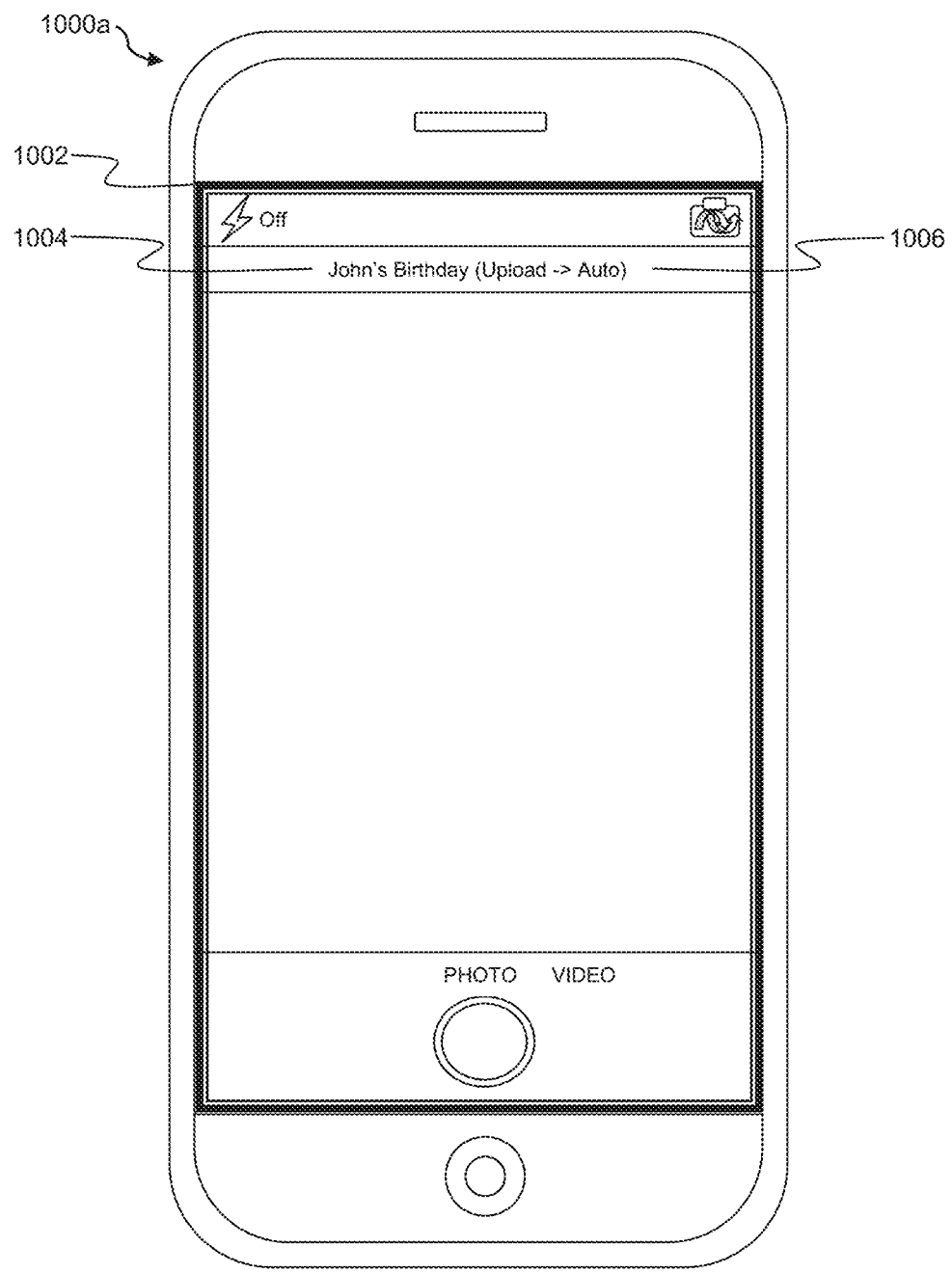

FIG. 10A illustrates an exemplary 'Camera' application of a mobile device, displaying a thin, colored border frame, and in addition, an event's name as well as the photographer invitee's latest photo/video upload preference (in this case, 'Auto') is also displayed on this screen. Note: Not only during an event, but also during the 'Pre-event Duration' and the 'Post-event Duration' of that event, the 'Camera' application would continue to display the above mentioned features to all of its photographer invitees including the event owner. Note: Since the photo/video upload preference is set to 'Auto' in this case, therefore, there would be no other confirmation screens displayed to the photographer invitees for confirming the upload of their photos/videos to the event's centralized album.

Figure 10B:
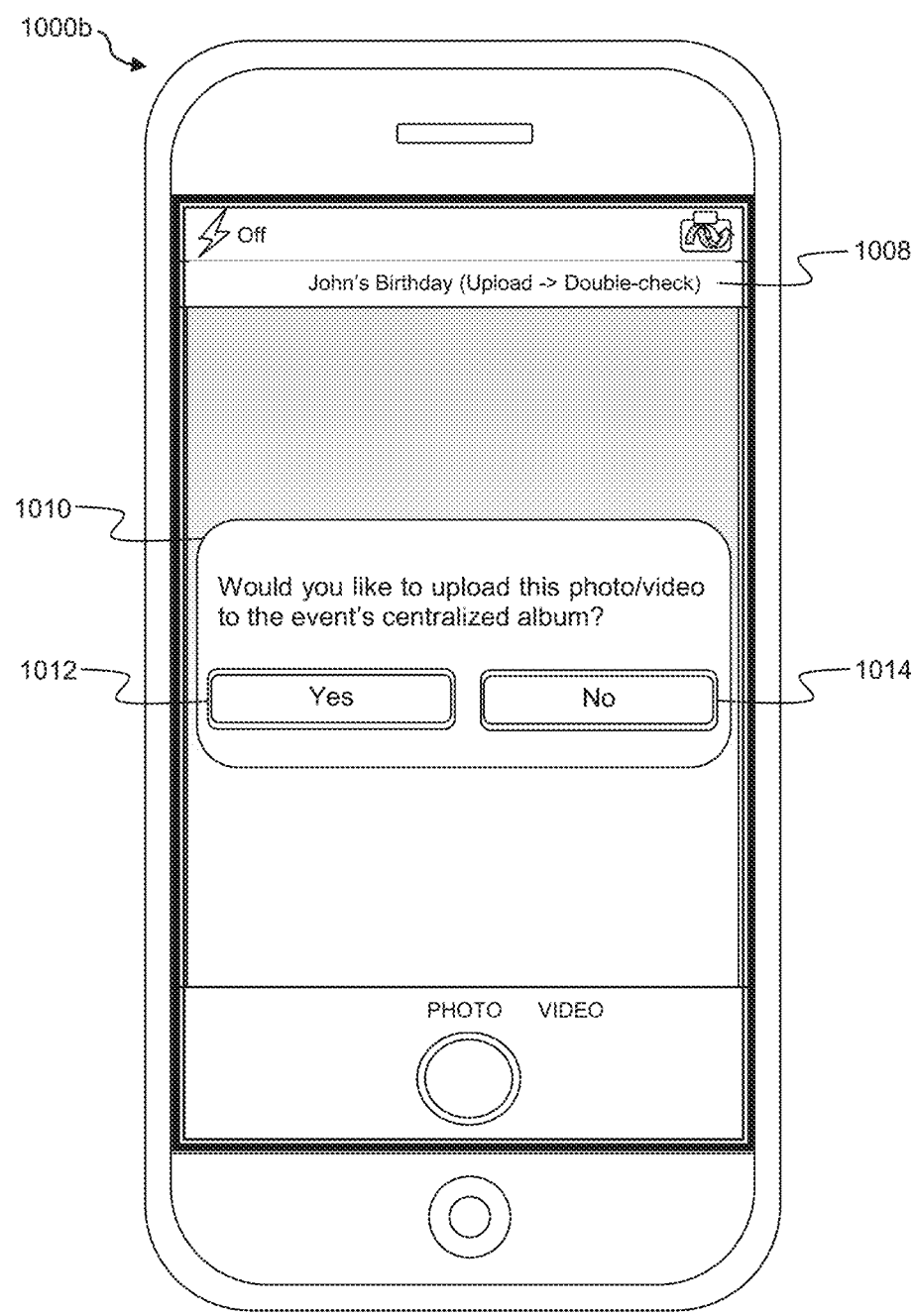

FIG. 10B illustrates an exemplary confirmation screen, which would be displayed on the 'Camera' application of a mobile device for those photographer invitees that have their event's photo/video upload preference selected as 'Doublecheck'. Note: Not only during the event, but also during the 'Pre-event Duration' and the 'Post-event Duration', such photographer invitee's 'Camera' application would display this confirmation screen every time a new photo or video is taken by those photographer invitees, including the event owner. Confirmation screen would have the following message—"Would you like to upload this photo/video to the event's centralized album?" (Note: An event owner would also receive a similar confirmation screen in case if they had previously selected their photo/video upload preference as 'Double-check')

Figure 10C:
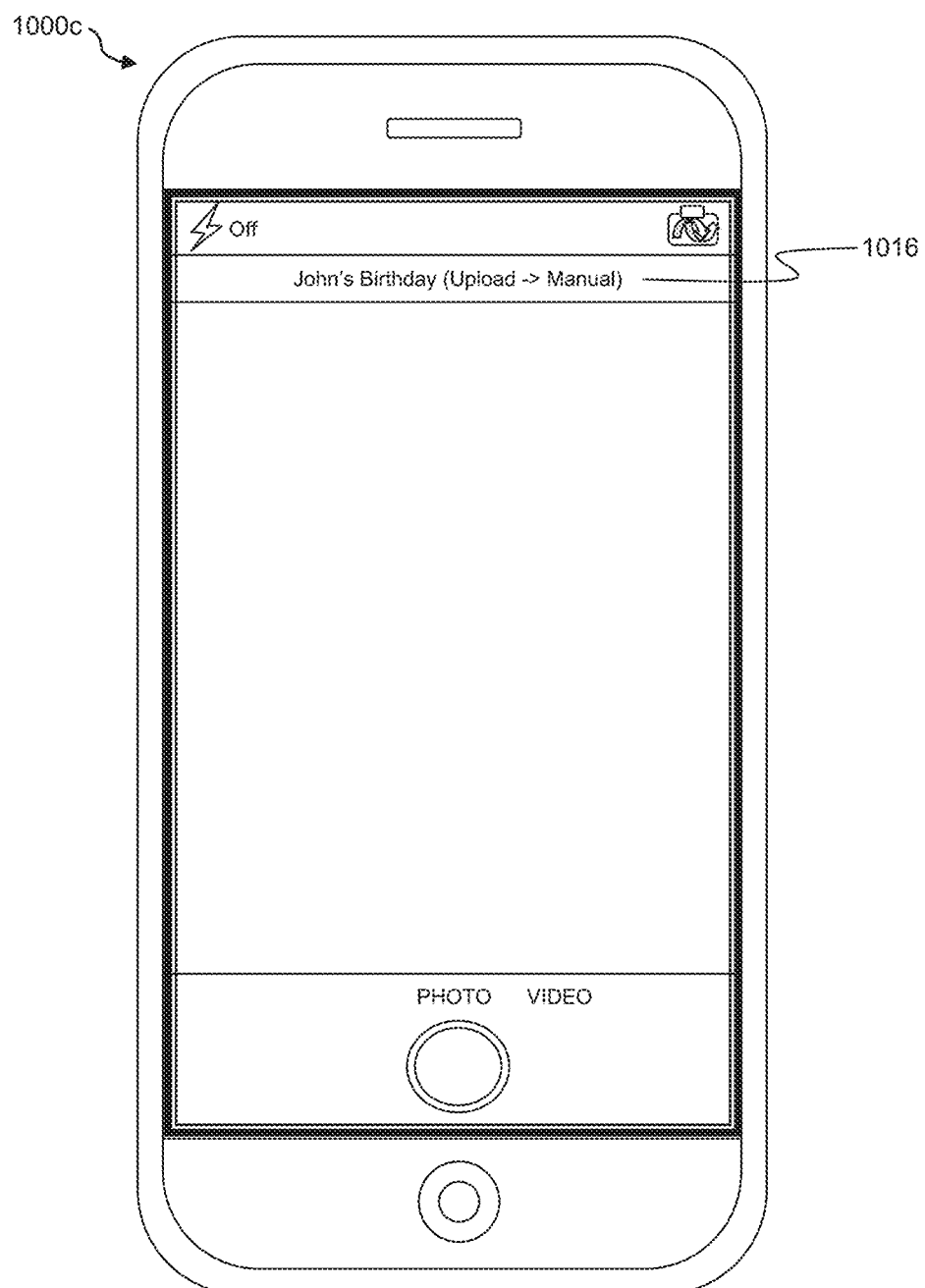

FIG. 10C illustrates an exemplary 'Camera' application of a mobile device, displaying a thin, colored border frame, and in addition, an event's name as well as the photographer invitee's latest photo/video upload preference (in this case, 'Manual') is also displayed on this screen. Note: Not only during an event, but also during the 'Pre-event Duration' and the 'Post-event Duration' of that event, the 'Camera' application would continue to display the above mentioned features to all of its photographer invitees, including an event owner. Note: Since the photo/video upload preference is set to 'Manual' in this case, therefore, there would be no other confirmation screens displayed to the photographer invitees for confirming the upload of their photos/videos to the event's centralized album.

Figure 11:
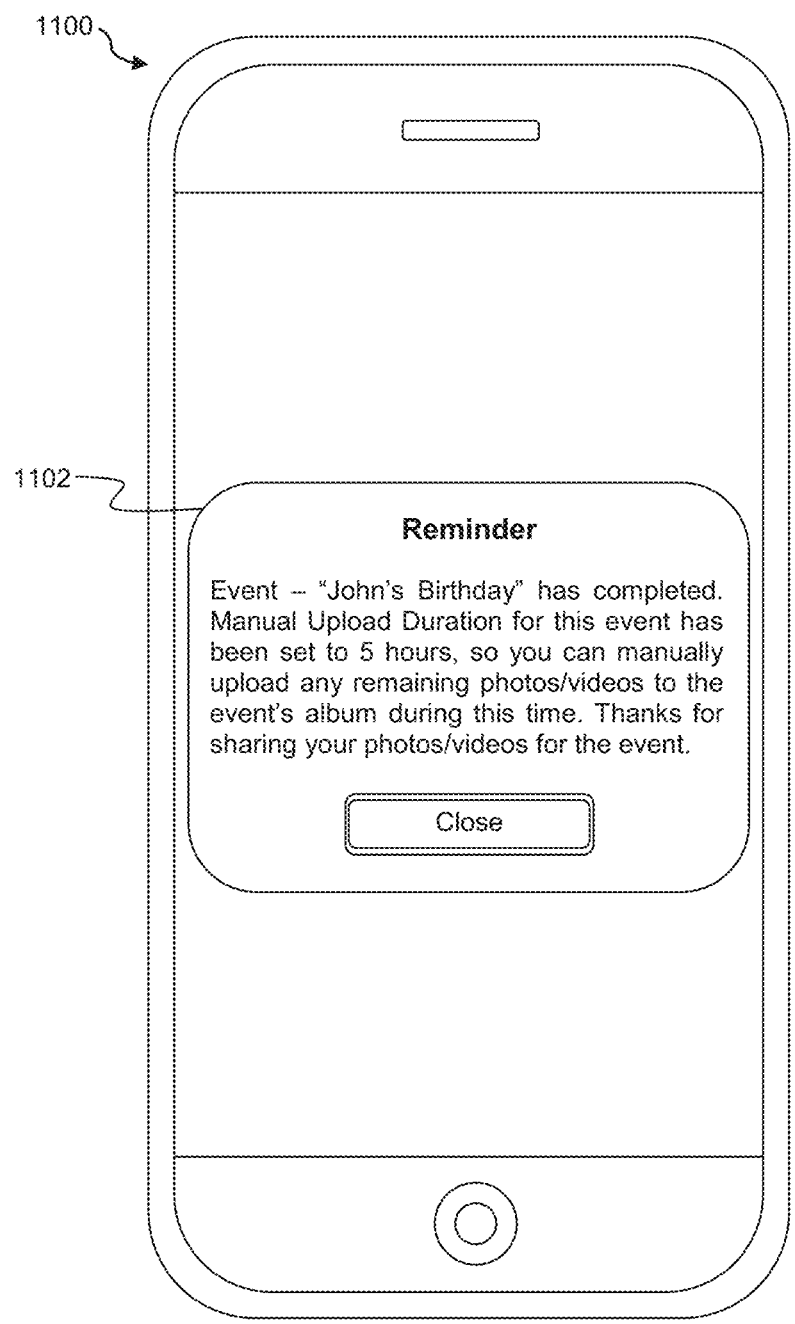

FIG. 11 illustrates an exemplary reminder message, where as long as the event's 'Manual Upload Duration' isn't set to 0, then this message would be displayed to all photographer invitees as well as an event owner at the end of an event, including its 'Post-event Duration'. This reminder message would inform its recipients that the event has completed and that they can upload any remaining photos/videos to the event's album during the 'Manual Upload Duration' timeframe (Value assigned for the event's 'Manual Upload Duration' would also be displayed on the reminder message.) Note: However, if the 'Manual Upload Duration' for an event was set to 0 by its event owner, then a slightly different reminder message would be sent out in that case, informing the recipients that the event is over and there isn't a 'Manual Upload Duration' set for that event.

Figure 12:
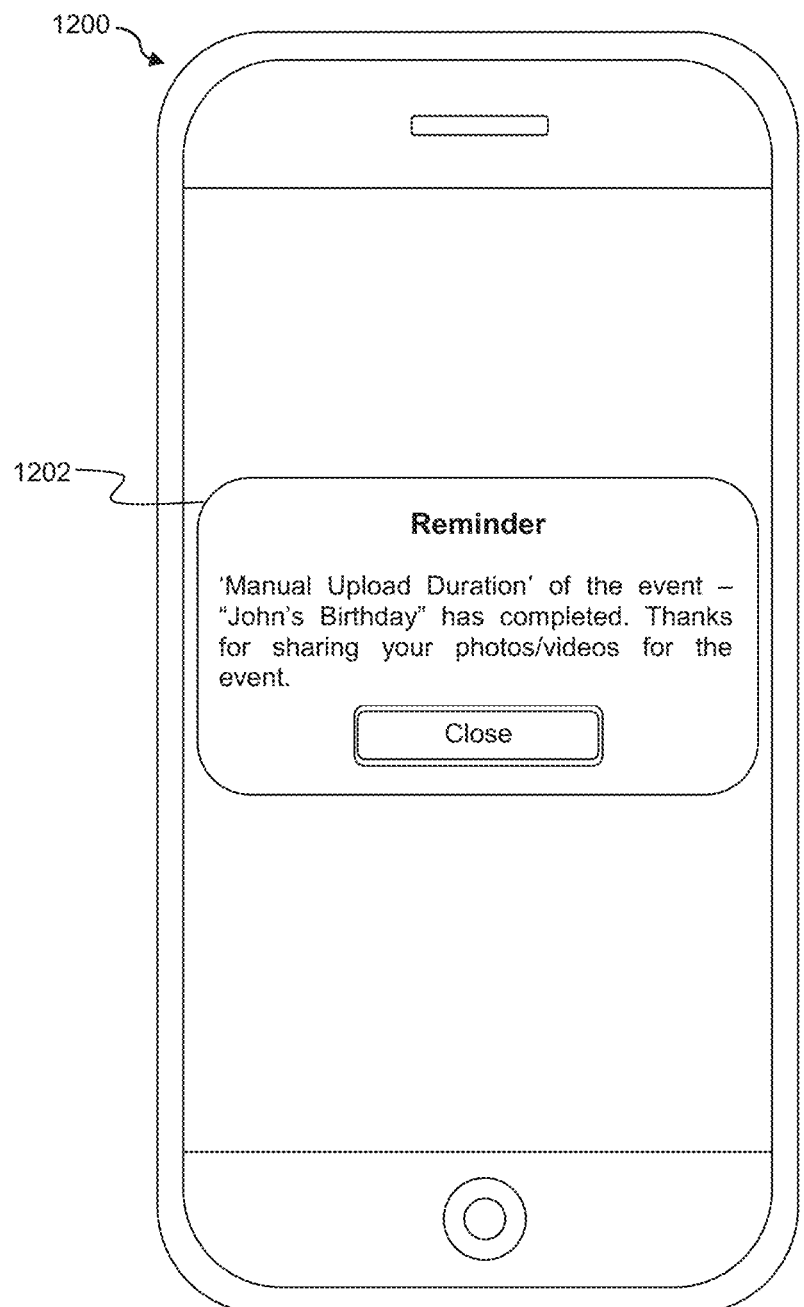

FIG. 12 illustrates an exemplary reminder message, where once the 'Manual Upload Duration' timeframe completes for an event, then this message would be displayed to all photographer invitees as well as an event owner. This reminder message would inform its recipients that the 'Manual Upload Duration' for the event has completed and thank them for sharing their photos/videos for the event. (Note: In case if the event's 'Manual Upload Duration' was set to 0 by its event owner, then this message wouldn't be displayed to the recipients since a similar message would have already been sent out earlier.)

Figure 13A:
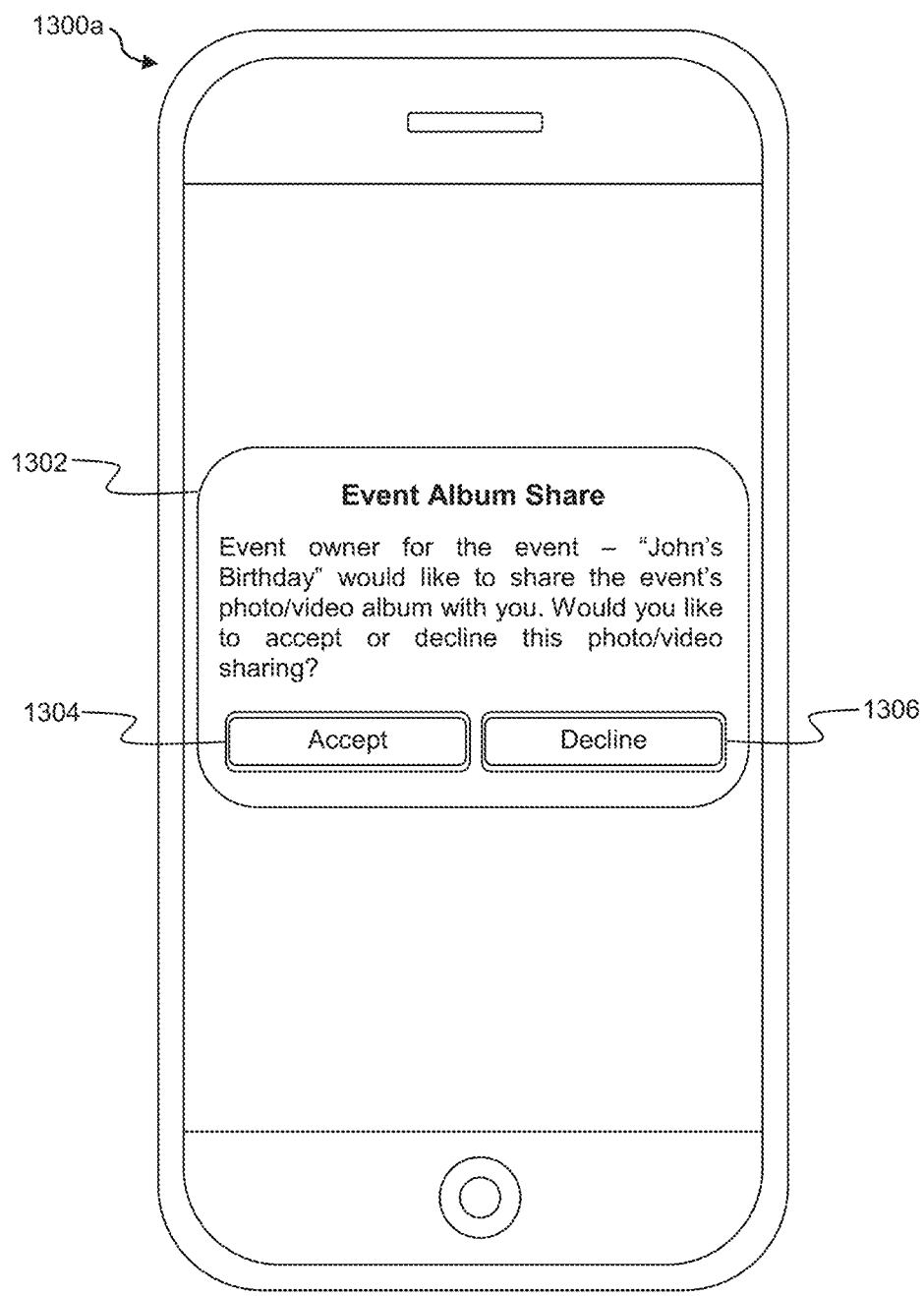

FIG. 13A illustrates an exemplary 'Event Album Share' confirmation screen, which would be displayed to those event invitees that were selected by an event owner for sharing the event's album, and in addition, have the same operating system on their devices as an event owner. Purpose of this confirmation screen is to inform the recipients that the event owner would like to share the event's album with them, and that they can either accept or decline the request.

FIG. 13B illustrates an exemplary email, which would be sent to those event invitees that were selected by an event owner for sharing of the event's album, however, those invitees don't have the same operating system on their devices as an event owner. Purpose of this email is to inform the recipients that the event owner would like to share the event's album with them via a public website, which can be accessed at any time.

Figure 14:
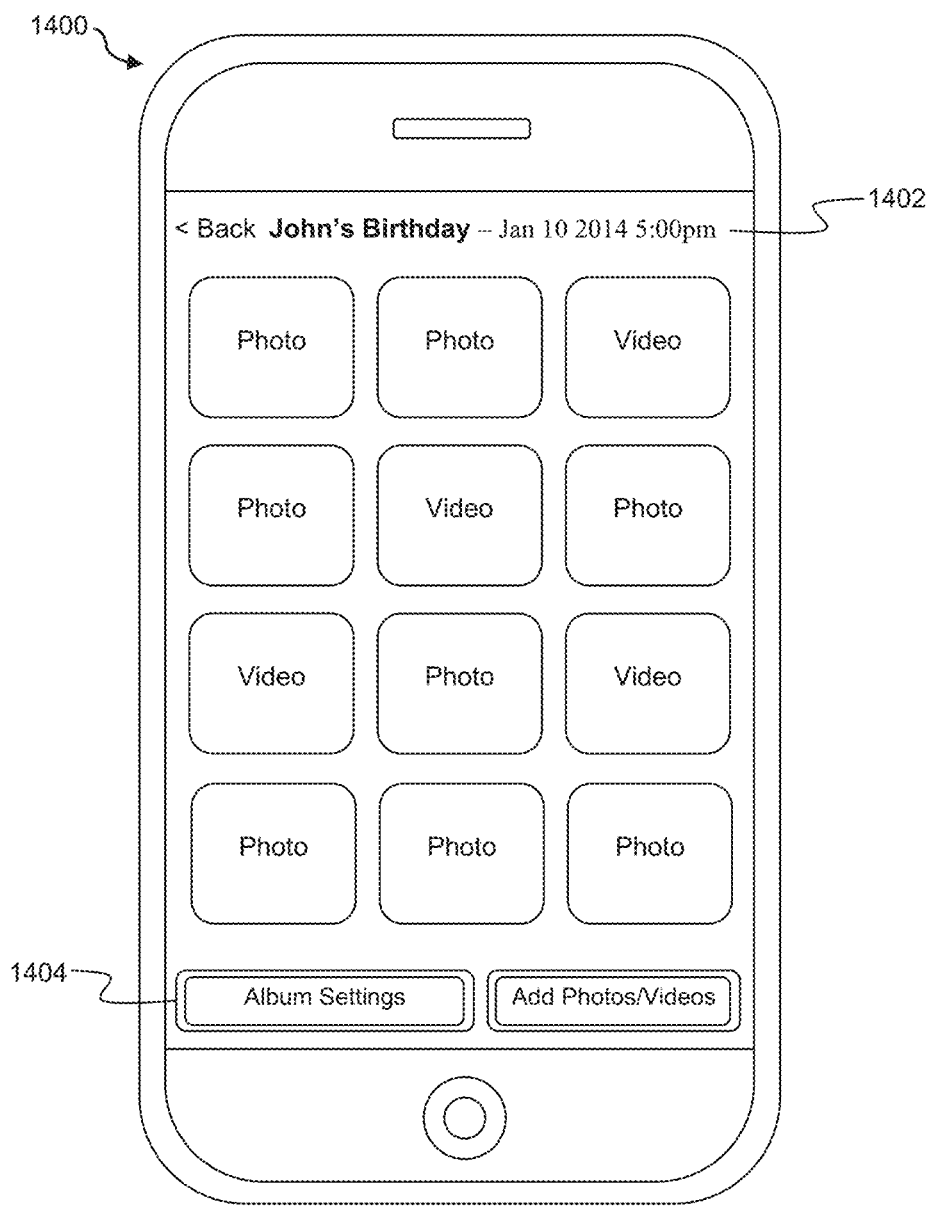

FIG. 14 illustrates an exemplary user interface of an event album, which is associated with a calendar event and can be accessed by both the photographer invitees as well as an event/album owner.

Figure 15A:
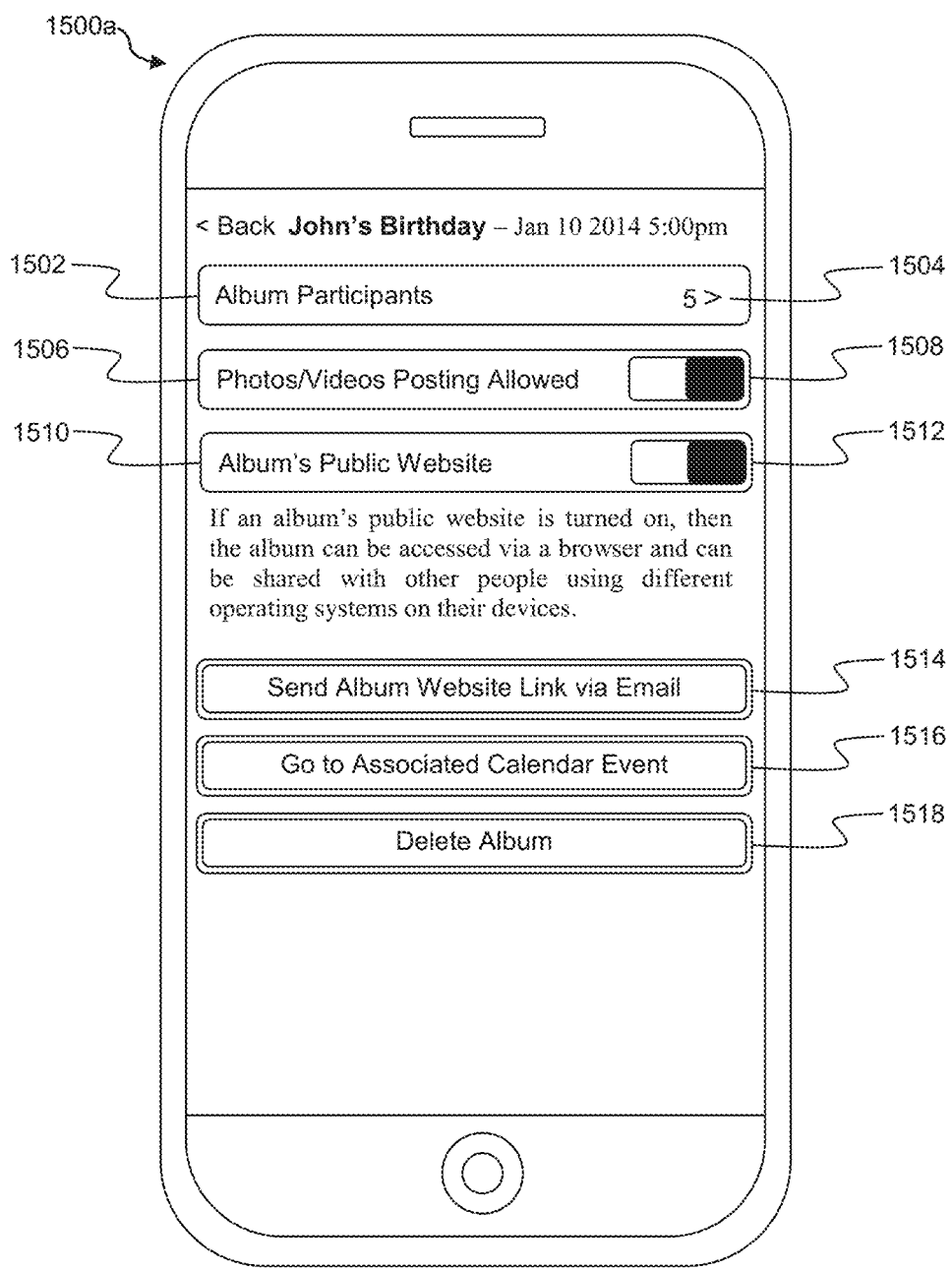

FIG. 15A illustrates an exemplary user interface of the settings/properties screen of an event album, as seen by an event owner. Using the options/sub-options available on this screen, an event owner would be able to add any new regular album participants, review the existing album participants' response, allow or disallow photo/video posting on the event's album, create or remove an album's public website, manually send the album's public website link via email to anyone, go back to the associated calendar event, or even delete that event's album. (Please note that in order to explain the new functionality related to event's photo/video sharing, some of the currently existing options on a photo/video albums' settings screen are also represented here.)

Figure 15B:
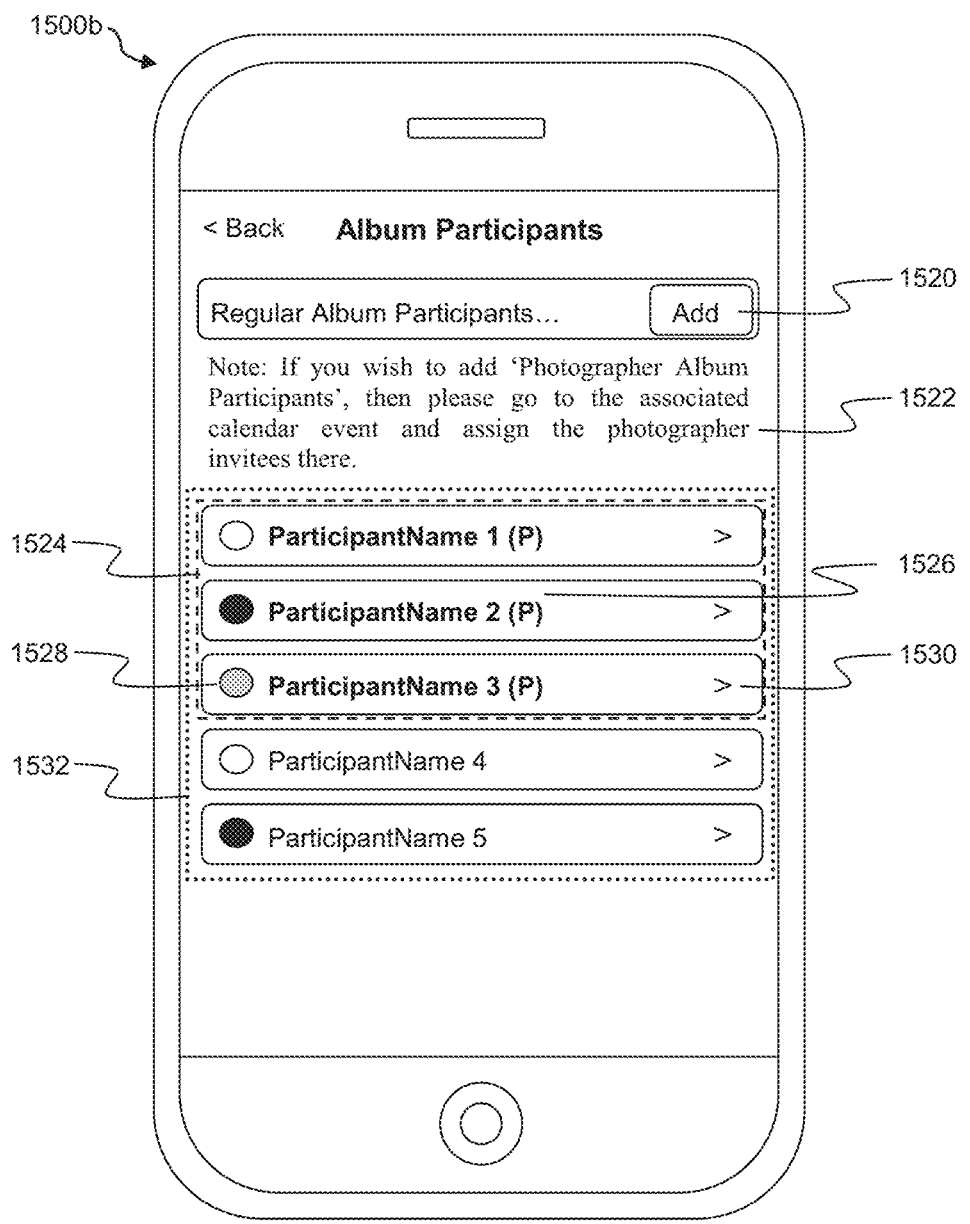

FIG. 15B illustrates an exemplary user interface of the 'Album Participants' screen of an event album, which not only provides an option to be able to add any new regular album participants, but also lists any of the already assigned album participants, including both the regular album participants (displayed in regular text) and the photographer album participants (displayed in bold text along with '(P)' added in the suffix). Once the album participants respond to their photo/video sharing request, then their latest response would also be indicated on this 'Album Participants' screen next to their names, using a green circle (Accept), red circle (Decline) or a blank circle (No response yet). Note: This screen, with its option to add regular album participants, would only be visible to an event/album owner.

Figure 15C:
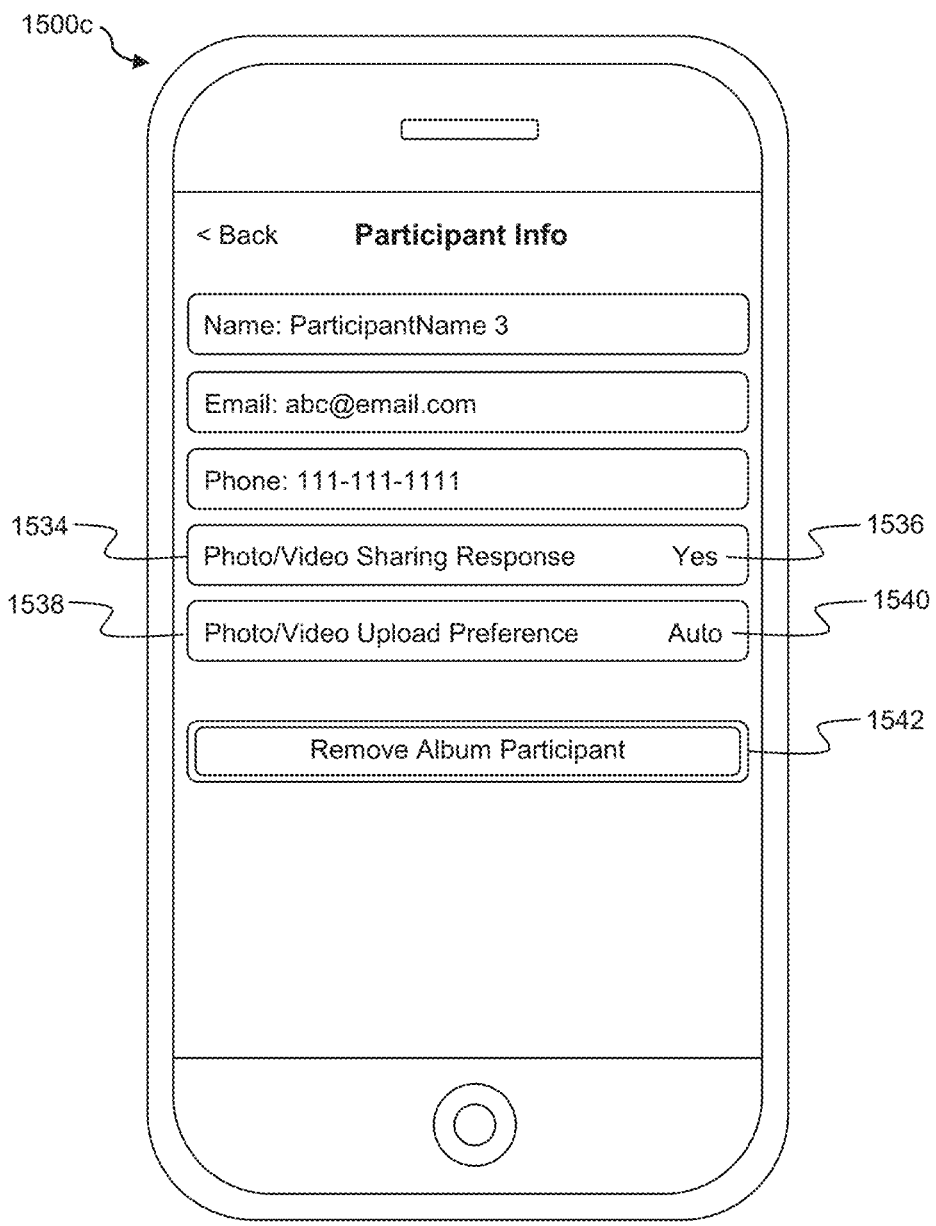

FIG. 15C illustrates an exemplary user interface of the 'Participant Info' screen of an event album, as seen by its event owner, displaying not only the contact details (Name, Email, Phone) of a photographer album participant but also their photo/video sharing response as well as their photo/video upload preference for the event. In addition, 'Remove Album Participant' button would also be enabled on this screen, which would allow an event owner to remove that photographer album participant from the participant list of an event's album.

Figure 16A:
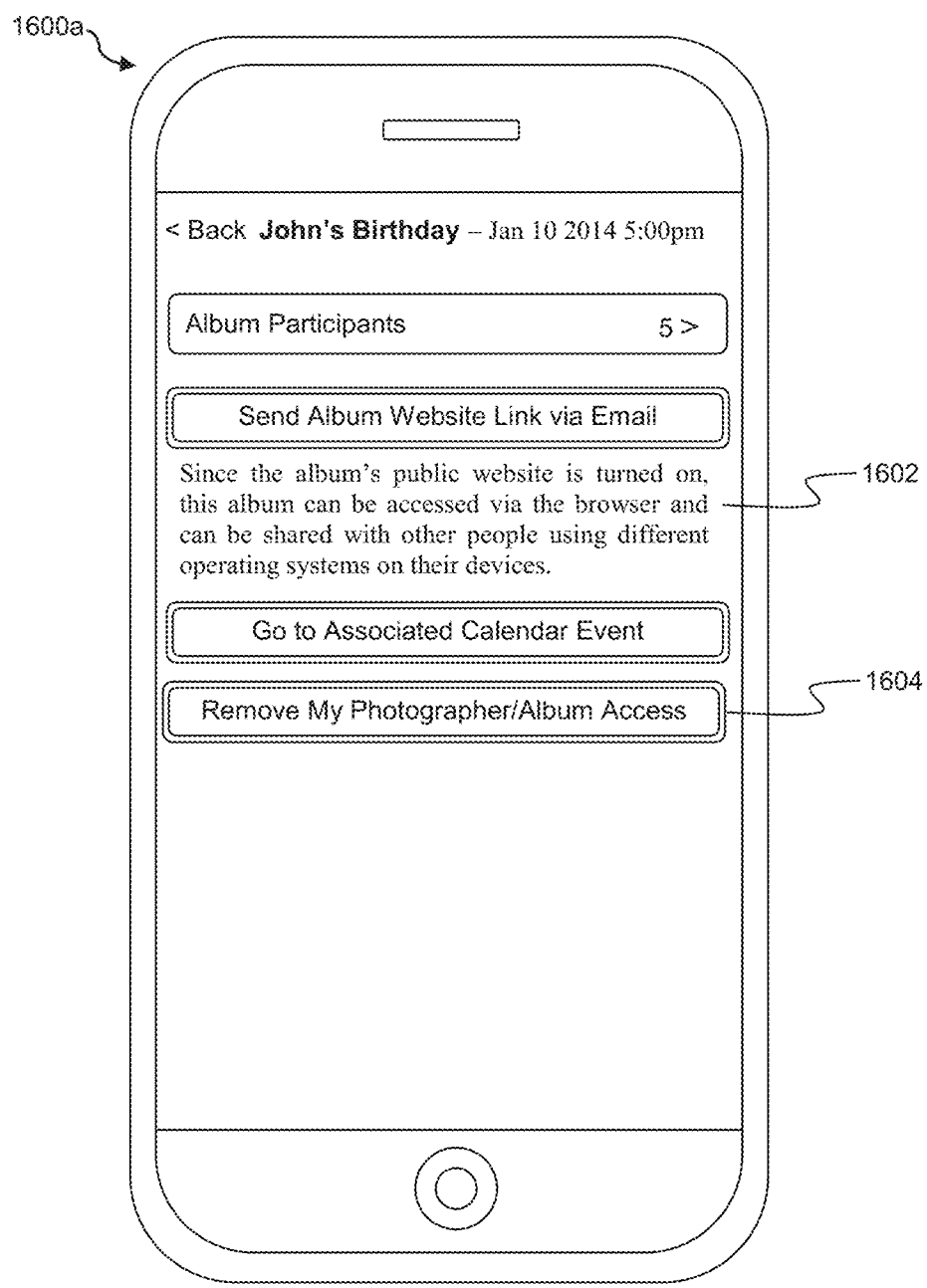

FIG. 16A illustrates an exemplary user interface of the settings/properties screen of an event album, as seen by a photographer album participant. Using the options/sub-options available on this screen, a photographer invitee would be able to view other assigned album participants and their photo/video sharing response, manually send the album's public website link via email to anyone as long as the album's public website is turned on, go back to the associated calendar event, or even remove their photographer/album access. In addition, as we can see in the figure, this screen wouldn't have the options available for the photographer album participants to add/delete any other album participants on the event's album, and also, they wouldn't have permission to delete the event album altogether. (Please note that in order to explain the new functionality related to event's photo/video sharing, some of the currently existing options on a photo/video albums' settings screen are also represented here.)

Figure 16B:
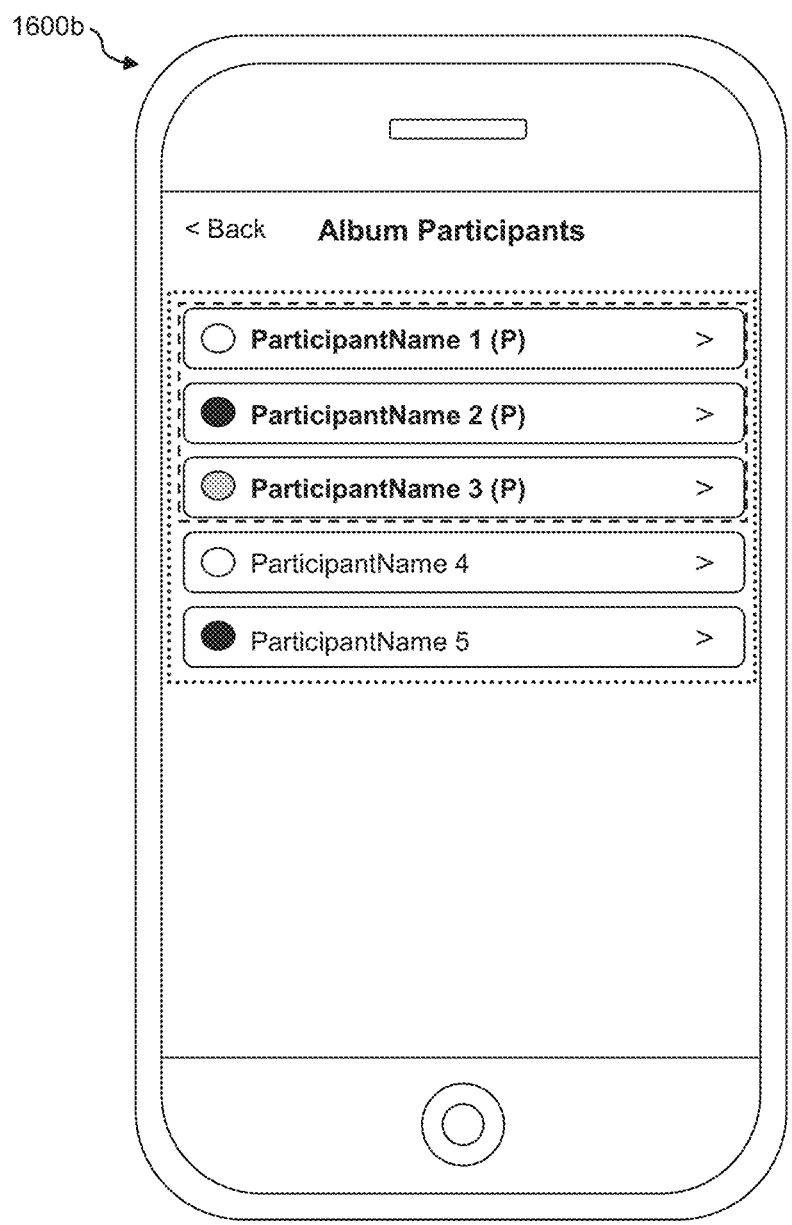

FIG. 16B illustrates an exemplary user interface of the 'Album Participants' screen of an event album, as seen by a photographer album participant, listing any of the already assigned album participants, including both the regular album participants (displayed in regular text) and the photographer album participants (displayed in bold text along with '(P)' added in the suffix). Once the album participants respond to their photo/video sharing request, then their latest response would also be indicated on this 'Album Participants' screen next to the album participants' names, using a green circle (Accept), red circle (Decline) or a blank circle (No response yet). In addition, as we can see in the figure, this screen wouldn't have the options available for the photographer album participants to add/delete any other album participants on the event's album.

Figure 16C:
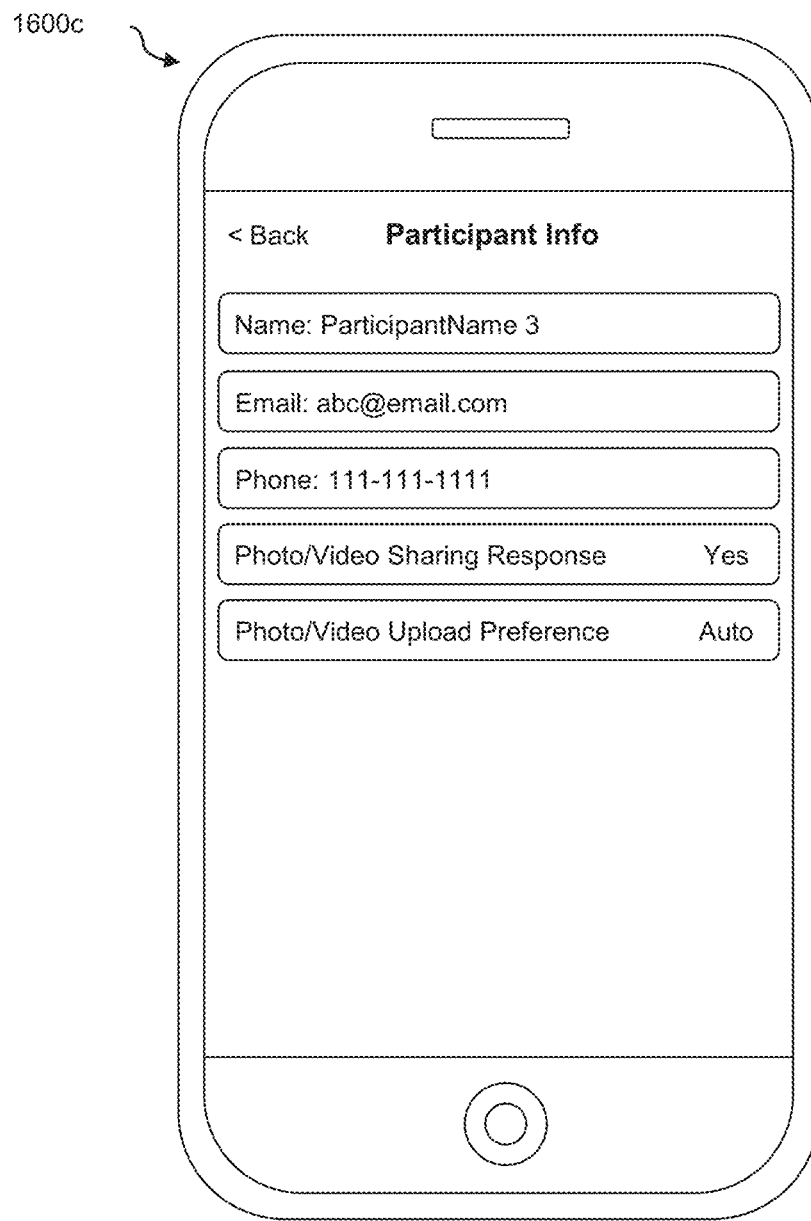

FIG. 16C illustrates an exemplary user interface of the 'Participant Info' screen of an event album, as seen by a photographer album participant, displaying not only the contact details (Name, Email, Phone) of the selected photographer album participant but also their photo/video sharing response as well as their photo/video upload preference for the event. In addition, as this figure illustrates, the 'Remove Album Participant' button wouldn't be enabled on this screen, since a photographer album participant isn't allowed to remove another assigned photographer album participant on an event's album.

Figure 17A:
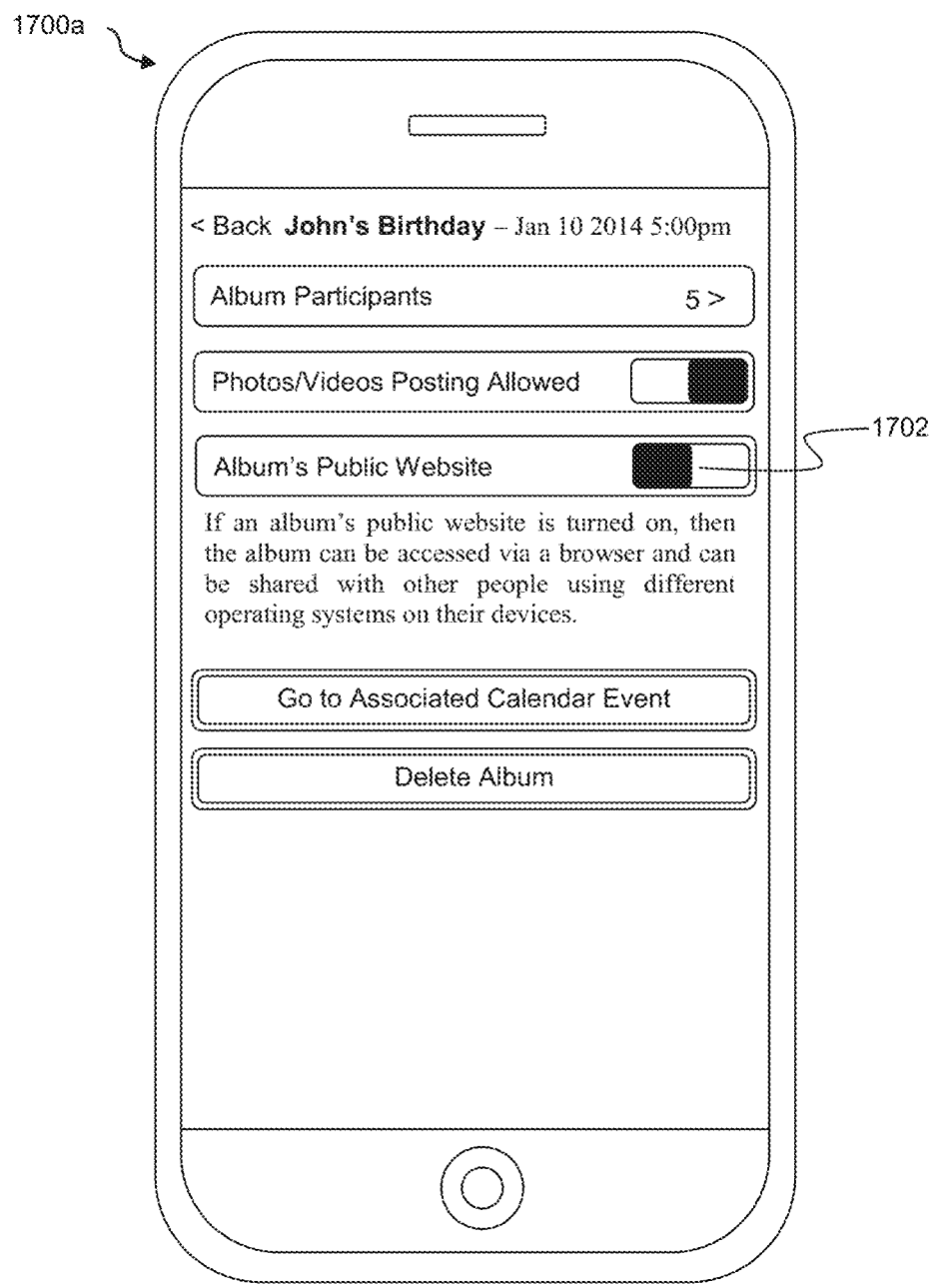

FIG. 17A illustrates an exemplary user interface of the settings/properties screen of an event album, as seen by an event owner, displaying how the 'Send Album Website Link via Email' button is instantly removed (no longer visible) when the 'Album's Public Website' field is changed from 'Yes' to 'No' by an event owner.

Figure 17B:
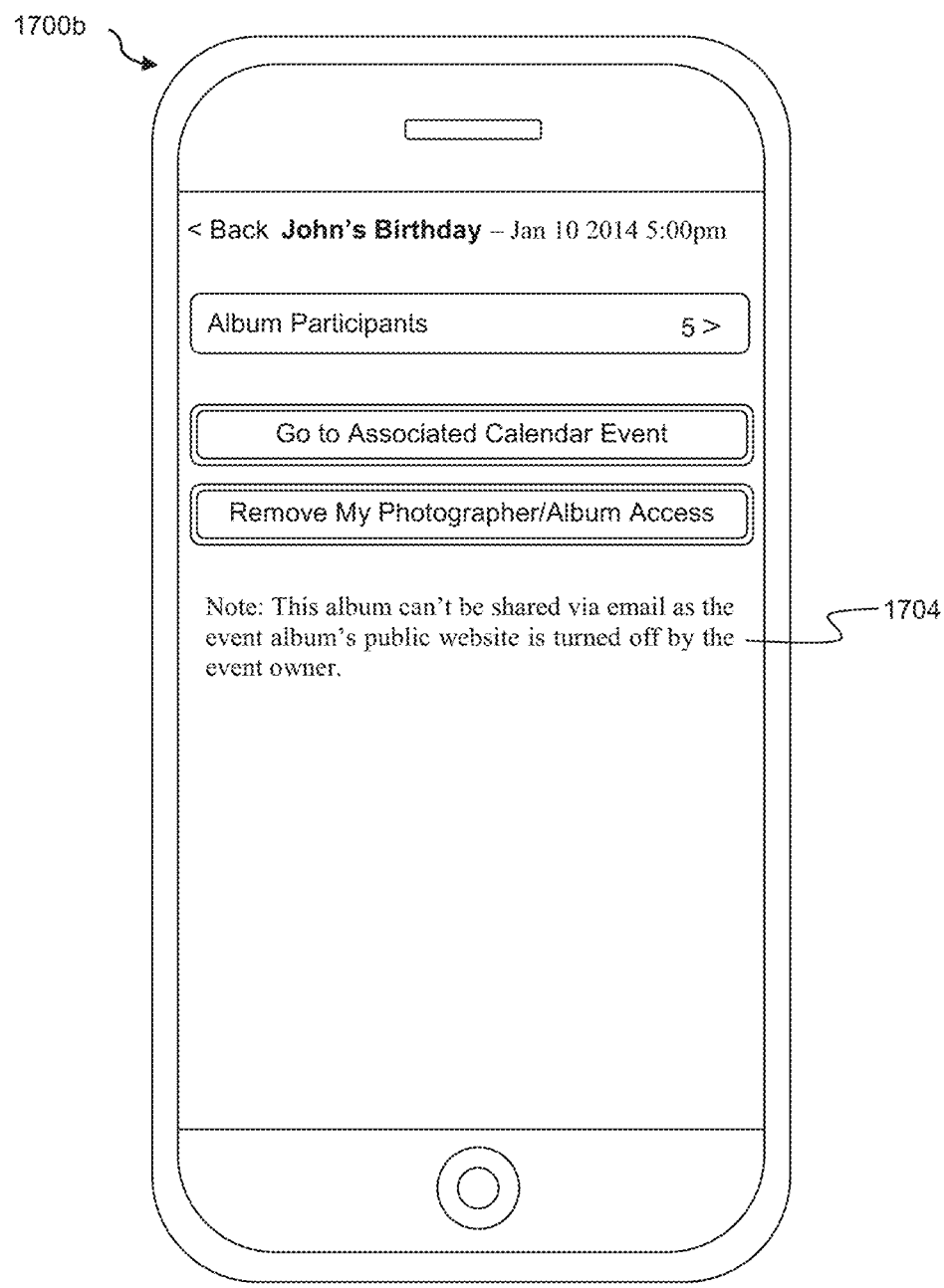

FIG. 17B illustrates an exemplary user interface of the settings/properties screen of an event album, as seen by a photographer album participant, when the 'Album's Public Website' is turned off (No' selected) by an event owner. In this case, 'Send Album Website Link via Email' button would no longer be visible on this screen. In addition, as illustrated in the figure, supporting note/text would be displayed at the bottom of the screen to inform the photographer album participant that the album's public website is turned off by the event owner.

DEFINITIONS

Event owner—an individual who sets up the event invitation and sends the request to the invitees for attending the event. According to the software functionality mentioned in this document, an event owner is also the one who can assign/request some invitees on the event invitation to take and upload photos/videos for the event to a centralized photo/video album. In addition, an event owner can also specify their preferences on the event invitation regarding the sharing of the event's photo/video album with the event's invitees once that event is complete.

Event invitees—all individuals that receive the event invitation sent by the event owner for attending an event. Event invitees may also be called invitees, regular invitees, or event guests.

Photographer invitees—any individuals that not only receive the event invitation for attending an event but also receive the photo/video sharing request from the event owner for taking photos/videos for the event and uploading them to a centralized photo/video album.

Event attendees—any of the event invitees that respond with either 'Accept' or 'Maybe' to the event invitation. In other words, it's all those people who actually attend or might have intended to attend the event.

Event album—a centralized photo/video album that gets automatically created when an event owner selects 'Yes' for photo/video sharing i.e. requests event's photos/videos on an event invitation.

Album's regular participants—an album's regular participants are those individuals that are directly added to the event album using the options available on the album itself. Such regular album participants are able to manually view, add or delete photos/videos on that album, but aren't able to participate in any automated photo/video sharing during the event since they weren't originally assigned as photographers on the calendar invite. (Note: While looking at the album's participant list, the regular participants are displayed without bold and also don't have (P) next to their name in the suffix, which helps to distinguish them from the album's photographer participants.)

Album's photographer participants—an album's photographer participants are those individuals that are automatically added to the event's album because of their assignment/acceptance as photographer invitees on the associated event invite. Such photographer participants are not only able to manually view, add or delete photos/videos on an album, but are also able to participate in automated photo/video sharing during the event since they were originally assigned as photographers on the event invite. (Note: While looking at the album's participant list, the photographer participants are displayed in bold and also have (P) next to their name in the suffix, which helps to distinguish them from the album's regular participants.)

Pre-event Duration—the amount of time (in hours) before the start of the actual event. An event owner can specify the 'Pre-event Duration' value while setting up an event's invite as long as the photo/video sharing is enabled for that event. During the 'Pre-event Duration', the photographer invitees would take and upload photos/videos to the event's centralized album similar to what they would do during the actual event itself.

Post-event Duration—the amount of time (in hours) after an actual event has completed. An event owner can specify the 'Post-event Duration' value while setting up an event's invite as long as the photo/video sharing is enabled for that event. During the 'Post-event Duration', the photographer invitees would take and upload photos/videos to the event's album similar to what they would do during the actual event itself.

Manual Upload Duration—the amount of time (in hours) after the Post-event Duration' is complete for an event. An event owner can specify the 'Manual Upload Duration' value while setting up an event's invite as long as the photo/video sharing is enabled for that event. During the 'Manual Upload Duration', any of the event's photographer invitees can manually upload their event's photos/videos. (Note: Photographer invitees can also manually upload their photos/videos either before or after the 'Manual Upload Duration', however, the significance of the 'Manual Upload Duration' is that it provides a time-bound set opportunity for the photographer invitees to manually upload any outstanding photos/videos before the event album might get shared with the event's invitees/attendees.

DETAILED SPECIFICATION

The present invention generally relates to requesting, uploading, and sharing photos and videos taken using a mobile device. Specifically, embodiments of the present invention provide for integrating a calendar and photo sharing function of a mobile device to allow requesting, taking, sharing, and managing, photos or videos tied to the event.

Here are the high-level details about the proposed solution. It would begin with an event owner assigning the photographers on their event invite itself i.e. requesting photos/videos for an event from some of the invitees, which would indirectly trigger the auto-creation of a new photo/video album for the event. Once such an invite, including the photo/video sharing request, is received by the photographer invitees, then they would not only be able to accept that request using the options on their event invite but would also be able to set their preferences for either automatic (real-time) or manual upload of the photos/videos for the event's duration. Thereafter, on the day of the event, the photographer invitees would receive a reminder about their acceptance of the event's photo/video sharing request, and henceforth, would be allowed to upload (real-time or manual) any photos/videos that they take during the event, including the pre-event activities and the post-event activities, to the event's centralized album. Finally, once an event is complete and the photographer invitees have also uploaded any of their remaining photos/videos during the 'Manual Upload Duration' timeframe set by an event owner, then the event's album (all uploaded photos/videos) would be allowed to be automatically shared with either all invitees or just the event attendees, depending upon the preferences set by an event owner. (Note: even if an event owner wants to manually share or potentially not even share the event's photo/video album with the event invitees, then they would also be able to do so by making an appropriate selection on the album sharing options available on their event invite.) Therefore, starting from requesting of photos/videos for an event, to the collecting/uploading of those photos/videos to a centralized location, to the sharing of those photos/videos with guests, this would provide an end-to-end solution, streamlining and automating the entire process from beginning to end.

Here is the main functionality associated with this software solution—An event owner, either while setting up the initial event invite or later while updating an event invite, would be able to assign one or more invitees as photographers (request photos/videos) for the event.

A new photo/video album would be auto-generated and associated with the event when the event's owner selects 'Yes' to request photos/videos for the event from some of the event invitees.

If an event owner also wishes to capture the activities/moments that occur either before or after an event, this solution would allow them to set the values for 'Pre-event Duration' and the 'Post-event Duration' on the event's invite itself. These fields would help to inform the photographer invitees that photos/videos are also being requested for the pre and/or post event activities in addition to the actual event's duration.

In order to accommodate those photographer invitees who prefer to manually upload their photos/videos after an event is complete, this solution would also give event owner an option to set the value for 'Manual Upload Duration' field on the event invite itself. This field would indicate the photographer invitees that they have been allocated some additional time to manually upload any of their remaining photos/videos once an event, including its 'Post-event Duration', is complete.

All photographer invitees, including an event owner, would be able to specify their photos/videos upload preference for the event. Here are the three options that would be available for selection—'Auto', 'Double-check', 'Manual'. If 'Auto' option is selected, all photos/videos taken by the photographer invitee during the event would be uploaded to the event album immediately in real-time. On the other hand, if 'Double-check' option is selected, all photos/videos taken during the event would still be uploaded real-time similar to the 'Auto' option, however, the photographer invitee would be polled after each photo/video to verify if they would like to upload that photo/video to the centralized event album or not. Lastly, if 'Manual' option is selected, it would be up to the photographer invitee to manually go to the event album and upload any photos/videos that they took during the event.

Any photographer invitees that might have accepted the photo/video sharing request for the event would receive a reminder/notification before the start of the event. Purpose of this reminder would be to inform the photographer invitees about their previous acceptance of photo/video sharing request for the event, and would also give them an opportunity to change their response if needed. In addition, the photographer invitees would also be allowed to change their photo/video upload preference in case if their originally selected preference no longer works for them.

Depending upon the 'photo/video upload preference' selected by the photographer invitees, they would be able to take photos/videos during the event, including its 'Pre-event Duration' and 'Post-event Duration' (if present), and share those photos/videos with the event owner by uploading them on the event's centralized album, either real-time or later manually.

Once an event is complete and the photographer invitees have also uploaded any of their remaining photos/videos during the 'Manual Upload Duration' timeframe set by an event owner, then the event's album (all uploaded photos/videos) would be allowed to be automatically shared with either all invitees or just the event attendees, depending upon the preferences set by an event owner. (Note: even if an event owner wants to manually share or potentially not even share the event's photo/video album with the event invitees, then they would also be able to do so by making an appropriate selection on the album sharing options available on their event invite.) Using this solution, even for the recurring event invites, an event owner would be able to assign photographers (request photos/videos for those recurring events).

Whether it's the event owner or any of the photographer invitees, they would be allowed to make changes to their original selections on the event invite related to photo/video sharing, providing flexibility as well as ease of use.

Where can this Solution be Used and its Associated Impact

This proposed solution can either be integrated directly with the core apps, which are available as part of the operating system/mobile operating system, or it can also be integrated/individually developed as a standalone 'app', 'mobile app' or an 'application' (app) that might exist on a single operating system or might even co-exist on multiple operating systems. For example: this solution can be easily integrated with the existing applications like the 'calendar', 'camera' and 'photo album' applications of a smartphone or a tablet, or it can also be integrated/developed as a stand-alone application. However, note that this solution isn't just limited to smartphone or a tablet, and can be used with any devices/applications that can assign photographers and/or store photos/videos. Depending upon the type of integration, whether the solution is integrated with the core app of an operating system, or integrated with a standalone app, or developed as a new application, here is the potential impact to the event owner, who sets up the event invite, and the photographer invitees, who take photos/videos during the event—

If the software functionality (detailed below) is integrated with any of the core apps of an operating system/mobile operating system, then the event owner and the photographer invitees would need to use the same operating system/mobile operating system on their devices, unless and until there is another app on a different operating system, which can still mimic the functionality of the core apps of the original operating system.

If the software functionality detailed below is integrated/individually developed as a standalone 'app', 'mobile app' or an 'application' (i.e. an app, which isn't a part of the core operating system apps), then depending upon the app's existence on a single operating system or multiple operating systems, the following would occur—

If the standalone app supports only a single operating system platform, then both the event owner and the photographer invitees must use devices that have the same operating system.

If the standalone app supports multiple operating system platforms, then the event owner and the photographer invitees would be able to use any devices with one of those supported operating systems and would still be able to automate the requesting, uploading and sharing of photos/videos for an event.

For example: an event owner would be able to install the standalone app on their individual operating system device and set up a new event, assigning the photographer invitees to take and upload photos/videos for the event. At the same time, the photographer invitees would also be able to install a standalone app on their individual operating system devices and accept the event owner's request for taking and uploading photos/videos for the event. Thereafter, once the event is complete, the central album with all the photos/videos aggregated would be automatically/manually shared with the event guests, depending upon the preferences set by the event owner.

Proposed Solution Details

For the purpose of this explanation (software functionality mentioned below), it's assumed that the event owner and the photographer invitees have similar operating system on their devices. Also, it's assumed that the suggested software solution is integrated with the existing 'calendar', 'camera' and 'photo album' applications of a smartphone or a tablet, which would make it easy to explain the details of this solution. However, as mentioned earlier, please note that this solution isn't just limited to a smartphone or a tablet, or even a particular operating system. Here are the details of the solution—
Photo/Video Sharing Related Options on the Main Screen of the Event Owner's Event Invite As seen in FIG. 1A-1C, the following additional option(s) would be available on the main screen of the event owner's calendar invite (Note: even if the event is set up as a recurring event, the below options would remain the same on the event owner's screen)—

'Request Photos/Videos' option 102—Event owner, while creating an event invite, would be able to use this option and request certain invitees to be the photographers for the event and ask them to upload (automatically/manually) any photos/videos that they take during the event to the centralized photo/video album.

If the event owner hasn't yet made a selection on the 'Request Photos/Videos' option, then no value would displayed to the right of the 'Request Photos/Videos' option on the main screen of the calendar event. However, if the event owner had previously selected a value on the 'Request Photos/Videos' option i.e. either 'Yes' or 'No', then that previously selected value would be displayed to the right of the 'Request Photos/Videos' option on the main screen of the calendar event.

'Share Event Album' option 104—This 'Share Event Album' option and its sub-options would be initially disabled (grayed out) until an event owner selects 'Yes' on the 'Request Photos/Videos' option. However, as seen in FIG. 1B, note that as soon as the 'Request Photos/Videos' is changed to 'Yes' 108, the 'Share Event Album' option/sub-options would be immediately enabled without even requiring the save of the calendar event. Similarly, as seen in FIG. 1C, if the 'Request Photos/Videos' option is again changed back to 'No' 112, then the 'Share Event Album' option/sub-options would be immediately disabled without even requiring the save of the calendar event.

Using the 'Share Event Album' option 104, an event owner would be able to specify if they wish to share the event's photos/videos (album) with the guests once the event is complete, and if yes, then they can also specify if they wish to share those automatically or manually. In addition, an event owner can also specify with which guests (all guests or just the event attendees) the event album would be shared.

If the event owner hasn't yet made a selection on the 'Share Event Album' screen for the 'Share Album after Event' field, then 'Off' value 110 would be displayed to the right of the 'Share Event Album' option on the main screen of the calendar event. However, if the event owner had previously selected a value on the 'Share Album after Event' field on the 'Share Event Album' screen i.e. either 'Auto', 'Manual' or 'Off', then that previously selected value would be displayed to the right of the 'Share Event Album' option on the main screen of the calendar event.

As seen in FIG. 1A, the following note would constantly display below the "Share Event Album" option on the main screen of the calendar event—"This feature is only available when the 'Request Photos/Videos' option is set to 'Yes'." 106 'Request Photos/Videos' Option and its Sub-Options on the Event Owner's Event Invite As seen in FIG. 1A and FIG. 2A, when the 'Request Photos/Videos' option 102 is selected, a new window 'Event Photos/Videos' 200a will open up with the title 'Event Photos/Videos' 202. On the 'Event Photos/Videos' screen, the following options will be available (Note: even if the event is set up as a recurring event, the below options would remain the same on the event owner's screen)—

'Request Photos/Videos' field 204 with 'Yes' and 'No' options. 'No' 206 would be the default value for this field. (Note: All other fields 208, 210, 212, 214, 216 on the 'Event Photos/Videos' screen would remain grayed out until the 'Request Photos/Videos' field is changed by the event owner to 'Yes')

As seen in FIG. 2B, when the 'Request Photos/Videos' field is changed to 'Yes' 218, the following changes would occur immediately i.e. it wouldn't require saving of the calendar event—

As seen in FIG. 2B, all the other fields on the 'Event Photos/Videos' screen would become enabled (would no longer be grayed out). As seen in FIG. 1B, the 'Share Event Album' option on the main page of the calendar invite would become visible/enabled and would automatically get highlighted to give a reminder to the event owner that since they are already collecting photos/videos, they might also want to make their selection for the sharing of that event album for when the event is complete.

Note: If the 'Request Photos/Videos' field on the 'Event Photos/Videos' screen was changed to 'Yes' (photo/video sharing requested for the first time) by the event owner and thereafter the entire event was saved, then the following would occur upon save—

As seen in FIG. 14, a new centralized photo/video album would be automatically created. Name for such photo/video album will be same as the event title/subject along with the event start date/time (including hours and minutes) in the suffix of the name 1402. For example: 'Anniversary Invitation—Jan. 10, 2014 5:00 pm' (Note: Event start date/time in the album name will help to distinguish between different recurring events.) Note: In case if the calendar event, which has a photo/video sharing request included, is saved without anything in the 'Subject' field, then the associated event album would still be created, however, it would use the following naming format—'Event' text along with the event start date/time in the suffix (including hours and minutes) For example: 'Event—Jan. 10, 2014 5:00 pm'

Even if no photographers were invited for the event, centralized photo/video album would still be created since the event owner might themselves take the photos/videos and share those with the event guests. On the other hand, if the photos/videos were requested from others, however, those people decline to take or share photos/videos for the event, then even in that case, the centralized photo/video album would still be created because the event owner might themselves want to take event photos/videos and share those with the event guests.

'Assign Photographers' 208—As seen in FIGS. 2B and 3A-3C, an event owner will be able to request photos/videos i.e. assign photographer(s) for the event from within the list of invitees already selected by the event owner previously. In addition, when this option is selected 220, it would also display the list of the already assigned photographer invitees for the event.

When the event owner tries to assign the photographers using the 'Add' button 306 on the 'Photographers . . . ' 304 field of the 'Assign Photographers' screen 300a, the entire list of invitees that were previously selected for the event would be displayed to the event owner. However, only those invitees that use the same proprietary operating system on their device as the event owner would be enabled/bold on the list, whereas the other invitees would be grayed out. Note: An event owner will only be able to add those photographers that already exist on the event invitee list, and will not be able to add other people that don't yet exist on the event invitee list.

While setting up an event, in case if the event owner first tries to select/add the photographers, however if no invitees were added until that time, then the event owner would be prompted with the following error message along with the 'Ok' button—"You must first add the event invitees and then attempt to assign any photographers for the event." When the event owner selects 'Ok' on the prompted message, then they would be taken back to the main setup page of the event's invite.

If an event owner tries to assign a new photographer for the event, however, that person already existed on the event's photographer list 308, then that person would not be added twice on the list. Also, no new notification would be sent out to such a photographer invitee. Note: An event owner wouldn't need to manually add themselves to the 'Assign photographers' field. In other words, as long as the event's photo/video album is once created, then the event owner would be automatically assigned as one of the photographers for that event. In fact, an event owner would not be able to remove themselves from being one of the photographers for the event.

If the event owner clicks on any of the added photographer invitee's name 312, then a new screen 'Photographer Info' 300c would open, containing the following fields—

'Name' field 316—This field would display the name of the photographer invitee, who was invited to act as one of the photographers for the event. Note: If the photographer invitee's name isn't available/known, then their email address or the phone number would just be repeated on this 'Name' field. This would be a read-only field.

'Email' field 318—This field would display the photographer invitee's email address (if available). This would be a read-only field.

'Phone' field 320—This field would display the photographer invitee's phone number (if available). This would be a read-only field.

'Photo/Video Sharing Response' field 322—This field would display the latest response 324 of the photographer invitee if they would share their photos/videos taken during the event or not. (Note: This field would only display the latest response even though a photographer invitee might have changed their response multiple times). This would be a read-only field.

'Photo/Video Upload Preference' field 326—This field would only be visible if the above field 'Photo/Video Sharing Response' is 'Yes'. If the 'Photo/Video Upload Preference' field is visible, it would display the photographer invitee's latest selection 328 for photos/videos upload preference. (Note: This field would only display the latest photo/video upload preference even though a photographer invitee might have changed their photos/videos upload preference multiple times.) If visible, this would be a read-only field.

'Remove photographer' button 330—If an event owner clicks the 'Remove Photographer' button (either before an event completes or after an event ends) on the 'Photographer Info' screen, then regardless of the photographer invitee's current response for the photo/video sharing request, the following would occur—

When the 'Remove Photographer' button is clicked before an event ends, including its 'Post-event Duration' and the 'Manual Upload Duration', then there would be no notification/message prompt displayed to the event owner and all the actions mentioned later in this section for deleting a photographer invitee would be taken. However, if the 'Remove Photographer' button is clicked after an event ends and that photographer invitee had previously accepted the photo/video sharing request for the event, then in this situation the following message prompt along with the 'Yes/No' options would be displayed to the event owner—"Since the event has already ended, an event album might have already been shared with the event guests. If you remove this photographer, then they wouldn't have access to the event album until you manually share the album again with such deleted photographer invitees. Are you sure you would like to proceed with these changes?"

If the event owner selects 'No', then no changes would be made i.e. photographer invitee wouldn't be deleted and the event owner would be taken back to the 'Photographer Info' screen for that photographer invitee. If the event owner selects 'Yes', then all the actions mentioned below would be taken in order to delete that photographer invitee.

Note: Even though an event owner might click on the 'Remove Photographer' button and accept confirmation, however, that photographer invitee would only be removed when the event owner saves (selects 'Done') the entire event. Deleted photographer invitee would no longer remain on the photographer list of the event's calendar invite. Regardless of the deleted photographer invitee's previous response (Accepted, Declined, No Response) for photo/video sharing request for the event, they would be removed from the participant list of the event album. In other words, photographer invitee would lose their access to view, add, or delete any photo/videos on the event's album. A notification would be sent to the deleted photographer invitee that the event owner has removed their photographer (photo/video sharing) permissions for the event—[EventName] i.e. they no longer have photo/video sharing abilities for the event. Deleted photographer invitee would no longer see the 'Share Event Photos/Videos' option or any of its sub-options on their calendar invite. Note: An event owner would never be able to delete/remove themselves from the photographer list of an event. Note: Any of the deleted photographer invitees would still remain on the event's invitee list as regular event invitees.

'Back' button (An option to go back to the previous screen). When this 'Back' button is clicked, it would take the event owner back to the 'Assign Photographers' screen.

As seen in FIG. 15B and FIG. 16B, once an event invite is sent out (saved), if an event owner or a photographer invitee went to the event's album and looked for the participants with whom the event album had been shared, then any photographer invitees 1524 (regardless of their acceptance or decline of the photo/video sharing request) would be displayed in bold and would also have (P) 1526 next to their name in the suffix on that event album participant list 1532. This would make it easy to identify which people have been assigned as the photographers for the event via the calendar invite. In addition, depending upon the photographer invitees' photo/video sharing response, an indicator 1528 would be displayed next to the photographer invitees' names on the event album participant list, indicating if the photographer invitees have accepted (green circle), declined (red circle) or haven't yet responded (blank circle) to the event's photo/video sharing request.

As seen in FIG. 3B and FIG. 8A, similar to the event album participant list, a photo/video sharing response indicator 310, 806 would also be displayed next to the photographer invitees' names on the calendar event's photographer list 308, 804 i.e. on both the 'Assign Photographers' screen 300*b*, which is visible to the event owner, and the 'Assigned Photographers' screen 800*a*, which is visible to all the photographer invitees of the event. This response indicator would show if the photographer invitees have accepted (green circle), declined (red circle) or haven't yet responded (blank circle) to the event's photo/video sharing request.

'Pre-event Duration (hours)' 210—As seen in FIG. 2A and FIG. 2B, an event owner will be able to use this option to request the photographer invitees to take pre-event photos/videos by providing the number of hours 222 that the 'Pre-event Duration' will be before the actual event. Default value will be '0' hours for this field and the maximum value allowed will be up to '12' hours. The following note/explanation will be added below the 'Pre-event Duration (hours)' field—"Assigned photographers will also be requested to share photos/videos during 'Pre-event Duration'"

'Post-event Duration (hours)' 212—As seen in FIG. 2A and FIG. 2B, an event owner will be able to use this option to request the photographer invitees to take post-event photos/videos by providing the number of hours 224 that the 'Post-event Duration' will be after the actual event. Default value will be '0' hours for this field and the maximum value allowed will be up to '12' hours. The following note/explanation will be added below the 'Post-event Duration (hours)' field—"Assigned photographers will also be requested to share photos/videos during 'Post-event Duration'"

'Manual Upload Duration (hours)' 214—As seen in FIG. 2A and FIG. 2B, an event owner will also be able to select a value for this 'Manual Upload Duration (hours)' field. This is the duration (in hours) 226 that comes after the 'Post-event Duration' and provides the photographer invitees a time-bound set opportunity to manually upload any remaining photos/videos before the event album might get shared with the event's invitees/attendees. Default value will be '5' hours, however the event owner would be allowed to select any value between '0' and '24' hours. The following note/explanation will be added below the 'Manual Upload Duration (hours)' field—"This duration will begin once the 'Post-event Duration' is complete and will provide an opportunity for the photographers to upload any remaining photos/videos to the event album." Note: All photographer invitees, including the event owner, would still be allowed to manually upload their photos/videos to the event album either before or after the 'Manual Upload Duration' is complete. However, the significance of the 'Manual Upload Duration' is that it provides a time-bound set opportunity for the photographer invitees to manually upload any outstanding photos/videos before the event album might get shared with the event's invitees/attendees.

'Owner's Upload Preference' 216—As seen in FIG. 2A and FIG. 2B, this field only applies to an event owner. It allows the event owner to select either 'Auto', 'Double-check' or 'Manual', indicating their upload preference for the event's photos/videos. Note: 'Double-check' 228 is the default value for this field. Here is a detailed description for each of those selections—

'Auto'—When 'Auto' is selected, —An event owner agrees to instantly/automatically upload all photos/videos taken during the event, including the 'Pre-event Duration' and 'Post-event Duration', to the event's photo/video album. In other words, any photos/videos that are taken by the 'Camera' application of the event owner's device between the start of the event's 'Pre-event Duration' to the end of that event's 'Post-event Duration' would be automatically uploaded to the event's photo/video album.

Here are some exceptions to the 'Auto' functionality—Regardless of 'auto' selection in the "Owner's Upload Preference" field, an event owner can always go directly to the event's shared photo/video album (FIG. 14) on their supported operating system device and upload any additional photos/videos manually. Or an event owner can also install an app or client software on their unsupported (different operating system) devices, which would allow them to manually upload any photos/videos, existing on their unsupported devices, to the shared photo/video album of the supported operating system.

If the event owner takes a photo/video that has size more than the allowed/set limit for cellular data upload (for example: 100 Mb), then even though the upload preference might be set to 'Auto,' the photo/video would not be automatically uploaded, and the following notification would be sent to the event owner—"Since [photo/video file name] is more than [MbLimit] Mb, which is above the cellular data upload limit, you will need to manually upload this photo/video to the event album when your device is within the wifi range." (Note: Here [photo/video file name] would be replaced with the actual photo/video filename, and [MbLimit] would be replaced with the maximum value that's set for cellular data upload.)

'Double-check'—When 'Double-check' is selected, As seen in FIG. 10 B, after each photo or video is taken during the event, including the 'Pre-event Duration' and 'Post-event Duration', event owner will be prompted with a question 1010 to either upload or not to upload that photo/video to the event's album. (Note: Only the photos/videos that were taken using 'Camera' application of the event owner's device will be prompted for upload to the event's photo/video album.) If the event owner selects 'yes' 1012 to upload the photo/video, then that would be instantly uploaded to the event's photo/video album. If the event owner selects 'no' 1014 for uploading a photo/video, then no additional action would be taken for that photo/video rather than just storing it on the device's photo library i.e. that photo/video would not be uploaded to event's photo/video album.

Here are some exceptions to the 'Double-check' functionality—Regardless of 'Double-check' selection in the "Owner's Upload Preference" field, an event owner can always go directly to the event's shared photo/video album (FIG. 14) on their supported operating system device and upload any additional photos/videos manually. Or an event owner can also install an app or client software on their unsupported (different operating system) devices, which would allow them to manually upload any photos/videos, existing on their unsupported devices, to the shared photo/video album of the supported operating system.

If the event owner takes a photo/video that has size more than the allowed/set limit for cellular data upload (for example: 100 Mb), then even though the event owner might have the upload preference set to 'Double-check' and confirms to upload the photo/video, it would still not be automatically uploaded. In addition, the following popup would be displayed to the event owner—"Since [photo/video file name] is more than [MbLimit] Mb, which is above the cellular data upload limit, you will need to manually upload this photo/video to the event album when your device is within the wifi range." (Note: Here [photo/video file name] would be replaced with the actual photo/video filename, and [MbLimit] would be replaced with the maximum value that's set for cellular data upload.)

'Manual'—When 'Manual' is selected, An event owner agrees to manually select and upload photos/videos to the event's centralized album. In other words, rather than automatically/instantly uploading their photos/videos that are taken during the event, an event owner prefers to manually upload those photos/videos. It will also provide an opportunity to event owner to even upload those photos/videos that were initially saved to their device's photo library by possibly a third-party application on their device. Note: For the manual upload option, an event owner can also install an app or client software on their unsupported (different operating system) devices, which would allow them to manually upload any photos/videos, existing on their unsupported devices, to the shared photo/video album of the supported operating system.

By selecting this 'Manual' option, an event owner takes the responsibility to try and upload any photos/videos before the event's 'Manual Upload Duration' is complete. By doing so, an event owner's photos/videos would already be there on the event's album when that album notification is sent to the event guests. Note: In case if the event owner isn't able to upload their photos/videos within the 'Manual Upload Duration', then they will still be allowed to upload those at a later time. The only problem with that is if any guests try to view the album before the new photos/videos are uploaded, then they would not be able to view the new ones.

Here is an exception to the 'Manual' functionality—If the event owner tries to manually upload a photo/video that has size more than the allowed/set limit for cellular data upload (for example: 100 Mb), then that photo/video would not be uploaded, and the following notification would be sent to the event owner—"Since [photo/video file name] is more than [MbLimit] Mb, which is above the cellular data upload limit, you will need to later upload this photo/video to the event album when your device is within the wifi range." (Note: Here [photo/video file name] would be replaced with the actual photo/video filename, and [MbLimit] would be replaced with the maximum value that's set for cellular data upload.)

'Go to Event Album' button 230—As seen in FIG. 2A—2C, this 'Go to Event Album' button wouldn't be visible/enabled initially on the 'Event Photos/Videos' screen until an event owner selects 'Yes' 218 for 'Request photos/videos' field 204, and in addition, also saves that entire event. It's only later that if the event owner goes back to the 'Event Photos/Videos' screen 200c of the calendar invite, then they would see the 'Go to Event Album' button 230 at the bottom of that screen.

An event owner would be able to click on this 'Go to Event Album' button 230 and go directly to the associated photo/video album 1400 (FIG. 14) for that event. Note: This 'Go To Event Album' button isn't visible/enabled initially since the event's album isn't even created until the calendar invite, containing the photo/video sharing request, is once saved by an event owner.

By using the 'Go to Event Album' button, an event owner can go to the associated event album to not only view, add or delete any photos/videos but can also go to the album to change any of the album settings/properties. For example: An event owner can use the 'Go to Event Album' button to go to the event album, and thereafter, change the album setting from a 'Public Album' to a 'Non-public Album'. Note: Once the 'Go to Event Album' button is added at the bottom of the 'Event Photos/Videos' screen, it would remain there until the album no longer exists or the event itself is deleted by the event owner. In other words, even if the event owner keeps changing their selection for 'Request photos/videos' field from 'Yes' to 'No' and vice versa, the 'Go to Event Album' button, which has been once added, would continue to remain on the 'Event Photos/Videos' screen to signify that an event album is/was associated with that event. (Note: This 'Go to Event Album' button on the 'Event Photos/Videos' screen is only visible to the event owner of that particular event.)

'Back' button (An option to go back to the previous screen). When this 'Back' button is clicked, it would take the event owner back to the main screen of the calendar invite.

'Share Event Album' Option and its Sub-Options on the Event Owner's Event Invite As seen in FIGS. 1A-1B and FIG. 4A, when the 'Share Event Album' option 104 is enabled and it's selected 110 by an event owner, a new window 400a with the same title 'Share Event Album' 402 will open up. On the 'Share Event Album' screen, the following options will be available (Note: even if the event is set up as a recurring event, the below options would remain the same on the event owner's screen)—

'Share Album after Event' 404—Using this field, an event owner would be able to set their preference whether or not they wish to share the event's photo/video album once that event is complete. (Note: 'Off' 406 would be the default value for this 'Share Album after Event' field.) An event owner would be able to change the 'Share Album after Event' field to either 'Auto', 'Manual' or 'Off' value. Upon selection of 'Auto' 414 on the 'Share Album after Event' field 404, the following would occur—

Upon selection of 'Auto', when the event's total duration including the 'Post-event Duration' and the 'Manual Upload Duration' is complete, then the invitees selected 416 by an event owner on the 'Share Album With' field 408 would automatically receive a notification about the event's centralized photo/video album i.e. as seen in FIG. 13A, selected invitees that use the same operating system as the event owner would be directly sent the album sharing notification on their devices. On the other hand, as seen in FIG. 13B, selected invitees that don't use the same operating system as the event owner would be sent the album link via an email. Here are the details—

If the invitee has a device with the same operating system as the event owner, then the following would occur—They would automatically receive a request 1302 after the 'Manual Upload Duration' that the event owner would like to share [EventName] photo/video album with them. If the guest selects 'Accept' 1304 for the request, then they would be able to view the event album, and depending upon the permissions granted by the event owner, they might even be able to add any additional photos/videos to that album. However, if the guest selects 'Decline' 1306, then they wouldn't get access to the event's album. Note: When the album is about to be shared with the invitees, at that time if there were any photographer invitees that already had the photo/video sharing request accepted, then those photographer invitees would not receive the event's album sharing request again. This is because the event photographers anyways would have access to the event's photo/video album, and therefore, do not need to be notified again. (In other words, when the album is about to be shared with the invitees, only those invitees that don't have the photo/video sharing request accepted at that time would receive the event's album sharing request.)

If the invitee has a device with a different operating system than the event owner, then the following would occur—Invitees would automatically receive an email 1300b after the 'Manual Upload Duration' that the event owner would like to share [EventName] photo/video album with them. When the invitees click on the album link in the email, they would be able to view the event's photo/video album in the browser, but they would not be able to add any additional photos/videos or comments to that album until they login using the proprietary operating system's account. Any of those updates would be automatically published to all participants of the shared event album.)

When 'Auto' 414 is selected for the 'Share Album after Event' field 404, then the next field 'Share Album With' 408 would automatically/immediately get enabled (without requiring save on the calendar event) and allow the event owner to make their appropriate selection 416 for the guests that must receive the event's photo/video album. Note: In case if there were no photos/videos in the event's centralized album at the end of the event, the album would still be shared automatically with the recipients either via the device or via an email, and that would depend upon their recipients' device operating system.

As seen in FIG. 13B, when an event album link is shared via email, all recipients' email addresses would be put in the bcc section of the email such that one recipient isn't able to view another recipient's email address. Note: Even though 'Auto' is selected on the 'Share Album after Event' field, an event owner would still be able to do the following—

As seen in FIG. 4C, an event owner would be able to manually share the album directly with 'All Guests' or just the 'Event Attendees' using the 'Share Album Now' button 420 available on the 'Share Event Album' screen 400c of the event's calendar invite. Note: 'Share Album Now' button 420 would be enabled/visible on the screen only once the 'Manual Upload Duration' is complete for an event. In addition, this button is available only when 'Auto' or 'Manual' is selected on the 'Share Album after Event' field on the 'Share Event Album' screen.

As seen in FIG. 15A, an event owner would also be able to manually share 1514 the album individually with any people that they want and at any time, regardless if that person is an event invitee or not, by using the options available on the event album's properties/settings screen 1500a. (Note: this feature of being able to manually sharing an event album with any individuals would be available regardless if 'Auto', 'Manual' or 'Off' is selected on the 'Share Album after Event' field on the 'Share Event Album' screen. More details about this feature is provided in the below sections as it's mainly used when 'Manual' or 'Off' might be selected on the 'Share Album after Event' field.)

Upon selection of 'Manual' on the 'Share Album after Event' field 404, the following would occur—When the event's total duration including the 'Post-event Duration' and the 'Manual Upload Duration' is complete, then the event owner would be informed that they can go ahead and review (edit/delete) the event's photos/videos and can also manually share the album with people that they want.

An event owner would be able to manually share the album directly with 'All Guests' or just the 'Event Attendees' using the 'Share Album Now' button 420 available on the 'Share Event Album' screen of the event's calendar invite. Note: 'Share Album Now' button would be enabled/visible on the screen only once the 'Manual Upload Duration' is complete for an event.

As seen in FIG. 15A, an event owner would also be able to manually share 1514 the album individually with any people that they want and at any time, regardless if that person is an event invitee or not, by using the options available on the event album's properties/settings screen 1500a.

When 'Manual' is selected on the 'Share Album after Event' field 404, then the next field 'Share Album With' 408 would automatically/immediately get enabled (without requiring save on the calendar event). This 'Share Album With' field would allow the event owner to make their appropriate selection 416 for the invitees that must receive the event's album when it's shared manually using the 'Share Album Now' button available on the 'Share Event Album' screen. (Note: 'Share Album Now' button is enabled on the screen only when 'Manual' or 'Auto' is selected on the 'Share Album after Event' field, and it provides an easy option for the event owner to share the event album with either 'All guests' or just the 'Event attendees'.) Note: When 'Manual' is selected for the 'Share Album after Event' field, an event owner would still be able to go to the event's photo/video album and do the following using the options available on the album's properties/settings screen—

As seen in FIG. 15A—15B, using the options available on an event album 1504, 1520, an event owner would be able to share the album with any individuals that have the same proprietary operating system on their devices as the event owner's device (Note: such individuals also don't need to be an event invitee to be shared the album with them). Here is what would occur in this situation—Such invitees would receive a request that the event owner would like to share [EventName] photo/video album with them. If the invitee accepts the request, then they would be able to view the event album, and depending upon the permissions granted by the event owner, they might even be able to add any additional photos/videos to that album.

Note: When the album is about to be shared with the invitees, at that time if there were any photographer invitees that already had the photo/video sharing request accepted, then those photographer invitees would not receive the event's album sharing request again. This is because the event photographers anyways would have access to the event's photo/video album, and therefore, do not need to be notified again. (In other words, when the album is about to be shared with the invitees, only those invitees that don't have the photo/video sharing request accepted at that time would receive the event's album sharing request.)

Note: Even if there were no photos/videos in the event's album, the album would still be shared with the recipients that have the same operating system. (This is allowed because even though there are currently no photos/videos on the album, an event owner might have planned to add photos/videos later or the recipients themselves might want to add some new photos/videos to that album.)

As seen in FIG. 15A, using the options available on an event album, an event owner would also be able to send the album link via email 1514 (either in advance or after the event is complete) to anyone that doesn't have the same proprietary operating system on their devices as the event owner's device. Here is what will happen when the album link is shared with any individuals—

Selected individuals would receive an email that the event owner would like to share the [EventName] photo/video album link with them.

When the invitees click on the album link in the email, they would be able to view the event's photo/video album in the browser, but they wouldn't be able to add any additional photos/videos or comments on that album until they login using the proprietary operating system's account.) Note: even if there were no photos/videos in the event's album, it would not restrict the event owner to be able to send the album link via email and also won't restrict the recipient to pull up the blank album. This is allowed because the event owner might want to send the album link in advance and later upload the photos.

As seen in FIG. 15A and FIG. 13B, when an event album's website link is shared via email 1514, all recipients' email addresses would be put in the bcc section of the email 1300b such that one recipient isn't able to view another recipient's email address.

Upon selection of 'Off' 406 on the 'Share Album after Event' field 404, the following would occur—Note: 'Off' 406 is the default value for this 'Share Album after Event' 404 field.

It would mean that the event owner doesn't intend to share the event's photo/video album with any of the guests after an event is complete. Therefore, once an event is complete, including its 'post event duration' and the 'Manual Upload Duration', then the event owner would just be informed that all event's photos/videos have been uploaded to the event's album. However, they would not be asked to either review those photos/videos or to share the event album with any of the guests.

As seen in FIG. 4A, when 'Off' is selected for the 'Share Album after Event' field, then the next field 'Share Album With' 408 wouldn't be enabled i.e. would not allow the event owner to make any advance selection for the guests that must receive the photo/video album link. In addition, 'Share Album Now' button also wouldn't be enabled since 'Off' is selected for the 'Share Album after Event' field.

Note: Even though 'Off' might be selected for the 'Share Album after Event' field, an event owner can still go directly to the event's photo/video album 1400 at any time and either review (edit/delete) photos/videos or share the album with anyone using the options available on the album's properties/settings screen 1500a, 1500b. (In short, this feature would be available regardless if an event owner selects 'Auto', 'Manual' or 'Off' for the 'Share Album after Event' field.) Depending upon whether the album recipients, with whom the album was shared, have the same operating system on their devices as the event owner's device or not, the following would occur—

As seen in FIG. 15A—15B, using the options available on an event album 1504, 1520, an event owner would be able to share the album with any individuals that have the same proprietary operating system on their devices as the event owner's device (Note: such individuals also don't need to be an event invitee to be shared the album with them). Here is what would occur in this situation—

Such invitees would receive a request that the event owner would like to share [EventName] photo/video album with them. If the invitee accepts the request, then they would be able to view the event album, and depending upon the permissions granted by the event owner, they might even be able to add any additional photos/videos to that album.

Note: When the album is about to be shared with the invitees, at that time if there were any photographer invitees that already had the photo/video sharing request accepted, then those photographer invitees would not receive the event's album sharing request again. This is because the event photographers anyways would have access to the event's photo/video album, and therefore, do not need to be notified again. (In other words, when the album is about to be shared with the invitees, only those invitees that don't have the photo/video sharing request accepted at that time would receive the event's album sharing request.)

Note: Even if there were no photos/videos in the event's album, the album would still be shared with the recipients that have the same operating system. (This is allowed because even though there are currently no photos/videos on the album, an event owner might have planned to add photos/videos later or the recipients themselves might want to add some new photos/videos to that album.)

As seen in FIG. 15A, using the options available on an event album, an event owner would also be able to send the album link via email 1514 (either in advance or after the event is complete) to anyone that doesn't have the same proprietary operating system on their devices as the event owner's device. Here is what will happen when the album link is shared with any individuals—

Selected individuals would receive an email that the event owner would like to share the [EventName] photo/video album link with them. When the invitees click on the album link in the email, they would be able to view the event's photo/video album in the browser, but they wouldn't be able to add any additional photos/videos or comments on that album until they login using the proprietary operating system's account.) Note: even if there were no photos/videos in the event's album, it would not restrict the event owner to be able to send the album link via email and also won't restrict the recipient to pull up the blank album. This is allowed because the event owner might want to send the album link in advance and later upload the photos.

As seen in FIG. 15A and FIG. 13B, when an event album's website link is shared via email 1514, all recipients' email addresses would be put in the bcc section of the email such that one recipient isn't able to view another recipient's email address.

Regardless if the event owner has 'Auto', 'Manual' or 'Off' selected on the 'Share Album after Event' field 404, when the album is actually shared (using the automated album sharing, or using the 'Share Album Now' option available on the calendar event, or the sharing options available on the album settings screen), the following scenarios could potentially take place—

When sharing an event album, depending upon whether the recipients are already on the event album's participant list or not, the following would occur—If the new album recipient didn't exist previously on the event album's participant list, then the following would occur—Album recipients that don't currently exist on an event album's participant list, however use same operating system on their device as the event owner's device, those people would be added as regular album participant on the event album's participant list 1532, and would receive an album sharing message directly on their devices. Album recipients that don't currently exist on an event album's participant list and also don't have same operating system on their devices as the event owner's device, those people would be sent the album's browser website link via email 1300b in order to share that album with those album recipients.

If the new album recipient already existed on the event album's participant list, then the following would occur—

| New album recipient already exists on the event album as - | New album recipient's previous/ last response for event album subscribe | Action to take when the same participant is requested to be added again as regular album participant |
|---|---|---|
| Photographer Album Participant | Yes | Don't add them again and let the event owner know that the participant already has access to event album |
| Photographer Album Participant | No | Add them again on the event album, however, this time as a regular album participant (So, there would be two entries for that individual on the album's participant list, one as a photographer album participant and another as a regular album participant) |
| Photographer Album Participant | No Response | Add them again on the event album, however, this time as a regular album participant (So, there would be two entries for that individual on the album's participant list, one as a photographer album participant and another as a regular album participant) |
| Regular Album Participant | Yes | Don't add them again and let the event owner know that the participant already has access to event album |
| Regular Album Participant | No | Change the album participant's last subscribe response to blank and inform the participant to respond again. |
| Regular Album Participant | No Response | Change the album participant's last subscribe response to blank and inform the participant to respond again. |

'Share Album With' 408—As seen in FIG. 4A-4C, 'Share Album With' field would be initially disabled when the 'Share Album after Event' field 404 has 'Off' 406 selected on it. However, when an event owner selects either 'Auto' or 'Manual' on the 'Share Album after Event' field, then the 'Share Album With' field 408 would be automatically/immediately enabled (without requiring save on the calendar event). An event owner will be able to set the 'Share Album With' field to either of the following values—'Event attendees', 'All guests'. Note: 'All guests' 416 will be the default value for this field.

The following note/explanation will be added below the 'Share Album With' field on the 'Share Event Album' screen—

"All Guests—All event invitees regardless of their invitation response. Event Attendees—Those event invitees that responded with either 'Accept' or 'Maybe' on their invitation response." When 'Event attendees' is selected on the 'Share Album With' field—It would mean that the event owner wishes to only send the event's photos/videos album to those invitees that respond with either 'Accept' or 'Maybe' on their invitation response.

When 'All Guests' is selected on the 'Share Album With' field—It would mean that the event owner wishes to send the event's photos/videos album to all invitees regardless of their invitation response.

'Album's Public Website' 410—As seen in FIG. 4A-4C, this read-only field would display if the associated album would be accessible via a browser webpage or not. Here are the possible values for this field—'Yes' or 'No'. (Note: Since the photo/video album is associated with a calendar invite, the default value for this "Album's Public Website' field would always be 'Yes' 412. Its reason is that the event invite could have a set of invitees using different devices/operating systems, and when the album is shared, some of those invitees might only be able to access the event album via the browser website.)

The following note would be added below the "Album's Public Website" field on the 'Share Event Album' screen—
"Note: By default, an event album that's associated with a calendar invite is set as a 'public' website, so it can be shared with other people that use different operating systems on their devices. If you wish to change this default setting, please do so by going directly to the options available on the event album."

'Go to Event Album' button 418—Based on FIG. 4C and FIG. 2A, this button won't be visible/enabled on the 'Share Event Album' screen 400c until an event owner once selects 'Yes' 218 for 'Request photos/videos' field 204 on the 'Event Photos/Videos' screen 200a and saves that entire event. Thereafter, if an event owner ever goes back to the 'Share Event Album' screen 400c of the calendar invite, then they would see the 'Go to Event Album' button 418 at the bottom of that screen as long as the event album still exists.

Note: This 'Go To Event Album' button isn't visible/enabled initially since the event's album isn't even created until the calendar invite, containing the photo/video sharing request, is once saved by an event owner. An event owner would be able to click on this 'Go to Event Album' button and go directly to the associated photo/video album 1400 for that event. By using the 'Go to Event Album' button, an event owner can go to the associated event album to not only view, add or delete any photos/videos but can also go to the album to change any of the album settings/properties. For example: An event owner can use the 'Go to Event Album' button to go to the event album, and thereafter, change the album setting from a 'Public Album' to a 'Non-public Album'.

Suppose that an event owner changes 'Request Photos/Videos' field 204 to 'No' 206 on the 'Event Photos/Videos' screen 200a, then 'Share Event Album' option/screen 104 itself would no longer be enabled i.e. 'Go to Event Album' button wouldn't even be accessible. However, if the event owner again changes 'Request Photos/Videos' field 204 to 'Yes' 218 on the 'Event Photos/Videos' screen 200a, then the 'Share Event Album' option/screen 104, 400c would be immediately enabled without even requiring save of the changes. And if the earlier album still existed, then the 'Go to Event Album' button 418 would still be present on that 'Share Event Album' screen 400c before even the event owner saves the entire calendar event.

'Share Album Now' 420—Based on FIG. 4C and FIG. 4A, this button would only be visible/enabled on the 'Share Event Album' screen 400c once the 'Manual Upload Duration' is complete for an event and as long as the value for 'Share Album after Event' field 404 has been selected as either 'Auto' or 'Manual'.

For further clarification, depending upon the selection made on the 'Share Album after Event' field (either 'Auto', 'Manual' or 'Off') on the 'Share Event Album' screen, the 'Share Album Now' button 420 would either be enabled or disabled—If 'Off' 406 is selected on the 'Share Album after Event' field 404, the following would occur—'Share Album Now' button 420 at the bottom of the 'Share Event Album' screen 400c wouldn't be enabled either before or after the event.

If either 'Auto' or 'Manual' is selected on the 'Share Album after Event' field 404, the following would occur—'Share Album Now' button 420 wouldn't be enabled on the 'Share Event Album' screen 400c before an event ends, including its 'Post-event Duration' and the 'Manual Upload Duration'. However, after the 'Manual Upload Duration' is complete for an event, the 'Share Album Now' button 420 would be automatically enabled/visible at the bottom of the 'Share Event Album' screen 400c.

If the 'Share Album Now' button 420 is clicked, then the following confirmation screen would be displayed to the event owner along with the 'Yes/No' buttons—"Are you sure you would like to share the event album with [LatestSelectionOnShareAlbumWithField]?" (Note: [LatestSelectionOnShareAlbumWithField] would be replaced with either 'All Guests' or 'Event Attendees' depending upon the latest selection on the 'Share Album With' field.) If the event owner selects 'Yes' on the confirmation screen, then the event's album would be shared with the guests 416 listed on the 'Share Album With' 408 field. If the event owner selects 'No' on the confirmation screen, then no action would be taken i.e. the event's album wouldn't be shared at this time.

Note: Suppose that an event owner decides to change their selection for 'Share Album With' field 408 after the completion of 'Manual Upload Duration' for the event, however without saving those changes, they immediately click on the 'Share Album Now' button 420. In this situation, the event's album would be shared with the guests 416 that were just selected by an event owner on the 'Share Album With' field 408. To avoid any confusion, when an event owner makes such a change on 'Share Album With' field and without saving that change, if they click on 'Share Album Now' button, then they would be prompted with the following popup message along with 'Yes/No' buttons—"Are you sure you would like to share the event album with [LatestSelectionOnShareAlbumWithField]?" (Note: [LatestSelectionOnShareAlbumWithField] would be replaced with either 'All Guests' or 'Event Attendees' depending upon the latest selection on the 'Share Album With' field.) If the event owner selects 'Yes' on the pop-up screen, then the event's album would be shared with the guests that were just selected on the 'Share Album With' field. If the event owner selects 'No' on the pop-up screen, then no other action would be taken i.e. the event's album wouldn't be shared at this time.

Back' button (An option to go back to the previous screen) When this 'Back' button is clicked, it would take the event owner back to the main screen of the calendar invite.

Event's Photo/Video Album and its Settings as Seen by an Event Owner

Once the calendar event is sent out (saved) by an event owner, which also includes the request for photo/video sharing, then the first thing that would occur is the auto-creation of the event's album. When an event owner goes to such an album and clicks on 'Album Settings' button 1404, then the album's settings screen as shown in FIG. 15A would open with the below listed options enabled/visible. (Please note that in order to explain the new functionality related to event's photo/video sharing, some of the currently existing options on a photo/video albums' settings screen are also described below.)—

'Album Participants' 1502—As seen in FIG. 15A, this 'Album Participants' option on the album settings screen would display the total count 1504 of the regular album participants as well as the photographer album participants for an event album. If the event owner clicks on this 'Album Participants' option, as seen in FIG. 15B, a new screen 1500b with the same name 'Album Participants' would open, listing all the assigned regular as well as the photographer album participants. Here are all the fields/options that would be available on this screen 1500b—

Using the 'Add' button 1520 available next to the 'Regular Album Participants' field on the album settings screen, an event owner would also be able to add any new regular album participants to the event album.

Right below the 'Regular Album Participants' field, the following text 1522 would be displayed in order to remind that the photographer album participants can only be added via the options available on the calendar event invite—"Note: If you wish to add 'Photographer Album Participants', then please go to the associated calendar event and assign the photographer invitees there."

All the assigned album participants 1532 including the regular as well as the photographer album participants 1524 would be displayed on this screen. (Note: the photographer album participant's name on the participant list (regardless of the photo/video sharing response) would be displayed in bold and would also have (P) next to their name in the suffix 1526. This would help to distinguish between regular album participants and the photographer album participants.) In addition, depending upon the photographer album participant's photo/video sharing response, an indicator 1528 would be displayed next to their names on the event album participant list, indicating if the photographer invitees have either accepted (green circle), declined (red circle) or haven't yet responded (blank circle) to the event's photo/video sharing request. If an event owner clicks on top of any of the album participant 1530, then as seen in FIG. 15C, a new screen 'Participant Info' 1500c would open, containing the following fields—

'Name' field—This field would display the name of the album participant. Note: If the album participant's name isn't available/known, then their email address or phone number would just be repeated on this 'Name' field. This would be a read-only field.

'Email' field—This field would display the album participant's email address. (if available). This would be a read-only field.

'Phone' field—This field would display the album participant's phone number. (if available). This would be a read-only field.

'Photo/Video Sharing Response' field 1534—This field would only be visible when looking at a photographer album participant's profile. In other words, for regular album participants, this field wouldn't display. This field would display the latest response ('Yes', 'No') 1536 of the photographer invitee i.e. the photographer album participant to indicate if they would share their photos/videos taken during the event or not. (Note: This field would only display the latest response even though a photographer invitee might have changed their response multiple times.) This would be a read-only field.

'Photo/Video Upload Preference' field 1538—This field would only be visible when looking at a photographer album participant's profile. In other words, for regular album participants, this field wouldn't display. Even when the profile is of a photographer album participant, this field would only be visible only if the above field 'Photo/Video Sharing Response' 1534 is set to 'Yes'.

If the 'Photo/Video Upload Preference' field 1538 is visible, it would display the photographer album participant's latest selection ('Auto', 'Double-check', 'Manual') 1540 for photos/videos upload preference. (Note: This field would only display the latest photo/video upload preference even though a photographer invitee might have changed their photos/videos upload preference multiple times.) If visible, this would be a read-only field.

'Remove Album Participant' button 1542—this button would assist to remove an album participant. If an individual to be deleted is a photographer album participant, who was previously assigned via a calendar event, then the following would occur when the 'Remove Album Participant' button 1542 is clicked by the event owner—

Deleted photographer album participant would no longer remain on the photographer list of the event's calendar invite i.e. the deleted photographer album participant would be removed from the 'Assign Photographers' screen 300*b*, which is visible to the event owner. In addition, the deleted photographer album participant would also be removed from the 'Assigned Photographers' screen 800*a*, which is visible to the other active photographer invitees of an event.

Deleted photographer album participant would no longer receive any notifications or reminders related to being a photographer i.e. event's photo/video sharing.

Deleted photographer album participant would also no longer remain on the participant list 1532 of the event album i.e. both the event owner and the other active photographer album participants would no longer see the deleted photographer album participant on the event album's participant list. In other words, photographer invitee would lose their access to view, add, edit or delete any photo/videos on the event's album.

Deleted photographer album participant would no longer see the 'Share Event Photos/Videos' option 602 on their event's calendar invite 600*a*. A notification would be sent to the deleted photographer album participant that the event owner has removed their photographer as well as the album participant permissions i.e. they would neither have photo/video sharing abilities for the event nor access to the event's album. Note: A deleted photographer album participant would still continue to remain on the event's invitee list.

If an individual to be deleted is a non-photographer (regular album participant), who was previously assigned via the options available on the event album, then the following would occur when the 'Remove Album Participant' button 1542 is clicked by the event owner—

Deleted regular album participant would no longer remain on the participant list 1532 of the event album. In other words, the regular album participant would lose their access to view, add, edit or delete any photo/videos on the event's album.

A notification would be sent to the deleted regular album participant that the event owner has removed their album participant permissions from the event album.

'Back' button (An option to go back to the previous screen)—When this 'Back' button is clicked, it would take the event owner back to the 'Album Participants' screen.

'Photos/Videos Posting Allowed' 1506—As seen in FIG. 15A, the default value for this field would be 'Yes' 1508 i.e. any of the album participants including the event owner would be able to add/post or delete photos/videos on the event album as long as this field is set to 'Yes'.

'Album's Public Website' 1510—In this case, since the photo/video album is associated with a calendar invite, the default value for this "Album's Public Website' field 1510 would be 'Yes' 1512 i.e. the associated event album would be accessible via a browser webpage.

The following note would be added below the "Album's Public Website" field on the album settings screen—"If an album's public website is turned on, then the album can be accessed via a browser and can be shared with other people using different operating systems on their devices."

'Send Album Website Link via Email' button 1514—When this button is clicked, it would allow to send the event album's website link via an email to anyone. This button would remain enabled on the album's settings screen 1500*a* as long as the "Album's Public Website" field 1510 is set to 'Yes' 1512. In other words, this 'Send Album Website Link via Email' button 1514 on the album's settings screen 1500*a* would no longer be enabled if the "Album's Public Website" field is changed from 'Yes' to 'No'.

'Go to Associated Calendar Event' button 1516—When this button is clicked, it would take the event owner from the event album's settings screen 1500*a* to the associated calendar event 100*b*. (Note: This button would be automatically disabled (not visible) if the associated calendar event no longer exists.)

'Delete Album' button 1518—When this button is clicked by an event owner, it would not only delete the event album but also since this album was associated with a calendar event, any of the photo/video sharing related options on the calendar invite would be automatically reset to no photo/video sharing. (More details provided in a later section describing the associated impact.)

Photo/Video Sharing Related Options on the Main Screen of the Photographer Invitee's Event Invite Once the calendar event is sent out (saved) by the event owner and its associated event album is created, thereafter, all the event invitees would receive a regular invitation about the event. However, the photographer invitees, excluding the event owner, would receive an additional notification to take and upload photos/videos for the event, and in addition, they would also see the following options/additions on their calendar invitation request 600*a* (Note: Even if it is a recurring event, the photographer invitees would still see the same options)—

As seen in FIG. 6A, a new option called 'Share Event Photos/Videos' 602 would be available on the invitation details screen 600*a* for the photographer invitees, highlighted in a different color to remind invitees to either accept or decline the photo/video sharing request. If an invitee selects this 'Share Event Photos/Videos' field, as seen in FIG. 7A, a new screen with the same title 'Share Event photos/Videos' 702 will open up. (Reminder: this 'Share Event photos/Videos' option/screen will only be available/visible to those photographer invitees that have been requested by the event owner to share photos/videos for the event.)

Note: As seen in FIG. 6A, the 'Share Event Photos/Videos' option 602 will initially have no default value listed on the main screen of the calendar invite 600*a*. In other words, if the photographer invitee hasn't yet made a selection on the 'Share Event Photos/Videos' field, then no value would be displayed to the right of the 'Share Event Photos/Videos' option on the main screen of the calendar event. However, as seen in FIG. 6B, if the photographer invitee selects a value on the 'Share Event Photos/Videos' field i.e. either 'Yes' or 'No', then that selected value 604 would be displayed to the right of the 'Share Event Photos/Videos' option on the main screen of the calendar event.

Note: For clarification, any photographer invitees, excluding the event owner, would see the following option related to event's photo/video sharing on their main screen of the calendar invite—'Share Event Photos/Videos' 602. On the other hand, an event owner of the event would see the following option(s) related to event's photo/video collection and sharing on their main screen of the calendar invite—'Request Photos/Videos' 102, 'Share Event Album' 104.

Note: An event owner would not receive the event invitation like the other photographer invitees for accepting or declining the photo/video sharing request i.e. they would be automatically confirmed as one of the event photographers to take photos/videos for the event. In addition, depending on the event owner's previous selection for the "Owner's Upload Preference" field 216, they would also be able to upload their photos/videos to the event's photo/video album.

'Share Event Photos/Videos' Option and its Sub-Options on the Photographer Invitee's Event Invite As seen in FIG. 7A-7C, photographer invitees would see the following photo/video sharing related options on the 'Share Event Photos/Videos' screen of their calendar invite (Note: Even if it's a recurring event, the photographer invitees would still see the same options and their response would apply to all the recurring events)—

'Share Event Photos/Videos' 704—Photographer invitees will be able to select either 'Yes' 726 or 'No' 706 for this field i.e. agree or disagree for taking and sharing of the event's photos/videos.

If the invitee selects 'Yes' 726, then it means that the invitee agrees to take and share photos/videos for that event, and the following would occur—As seen in FIG. 7B, 'Upload Preference' field on the 'Share Event Photos/Videos' screen would be enabled for selection.

As seen in FIG. 15B and FIG. 16B, an indicator 1528 on the event album's participant list would display a green circle next to the photographer invitee's name to indicate that the photographer invitee has accepted the photo/video sharing request. Note: the photographer invitee's name on the album participant list (regardless of their photo/video sharing response) would be displayed in bold and would also have (P) next to their name in the suffix 1526. This would help to distinguish between regular album participants and the assigned photographer participants.

As seen in FIG. 3B and FIG. 8A, similar to the event album participant list, a green circle indicator would also be displayed next to the photographer invitee's name on the calendar event's photographer lists i.e. on both the 'Assign Photographers' screen 300b, which is visible to the event owner, as well as the 'Assigned Photographers' screen 800a, which is visible to all the photographer invitees of the event.

As seen in FIG. 7C, once a photographer invitee saves their changes and later goes back to the calendar invite, then they would also see the 'Go to Event Album' button 730 at the bottom of the 'Share Event Photos/Videos' screen 700c.

If the invitee selects 'No' 706, then it means that the invitee has declined to take and share photos/videos for that event. In this case, the following would occur—As seen in FIG. 7A, 'Upload Preference' field on the 'Share Event Photos/Videos' screen would remain grayed out i.e. wouldn't be enabled for selection.

As seen in FIG. 15B and FIG. 16B, an indicator 1528 on the event album's participant list would display a red circle next to the photographer invitee's name to indicate that the photographer invitee has declined the photo/video sharing request. Note: even though the photographer invitee declined the photo/video sharing request, their name would still be listed on the album participant list (regardless of their photo/video sharing response) in bold and would also have (P) next to their name in the suffix 1526. This would help to distinguish between regular album participants and the assigned photographer participants.

As seen in FIG. 3B and FIG. 8A, similar to the event album participant list, a red circle indicator would also be displayed next to the photographer invitee's name on the calendar event's photographer lists i.e. on both the 'Assign Photographers' screen 300b, which is visible to the event owner, as well as the 'Assigned Photographers' screen 800a, which is visible to all the photographer invitees of the event. 'Go to Event Album' button wouldn't be available at the bottom of the 'Share Event Photos/Videos screen.

'Upload Preference' 708—This field would be immediately enabled for selection when the photographer invitee selects 'Yes' 726 for 'Share Event Photos/Videos' field 704, which is also available on the 'Share Event Photos/Videos' screen. A photographer invitee will be able to edit this field and select either 'Auto', 'Double-check' or 'Manual' 728. The default value will be 'Double-check' for this field. Here is a detailed description for each of those selections—

'Auto'—When 'Auto' is selected, The photographer invitee agrees to instantly/automatically upload all photos/videos taken during the event, including the 'Pre-event Duration' and 'Post-event Duration', to the event's photo/video album.

In other words, any photos/videos that are taken by the 'Camera' application of the invitee's device between the pre-event start time and the post-event end time would be automatically uploaded to the event's photo/video album.

Here are some exceptions to the 'Auto' functionality—Regardless of 'auto' selection, a photographer invitee can always go directly to the event's shared photo/video album (FIG. 14) on their supported operating system device and upload any additional photos/videos manually. Or a photographer invitee can also install an app or client software on their unsupported (different operating system) devices, which would allow them to manually upload any photos/videos, existing on their unsupported devices, to the shared photo/video album of the supported operating system.

If the photographer invitee takes a photo/video that has size more than the allowed/set limit for cellular data upload (for example: 100 Mb), then even though the upload preference might be set to 'Auto,' the photo/video would not be automatically uploaded, and the following notification would be sent to the photographer invitee—

"Since [photo/video file name] is more than [MbLimit] Mb, which is above the cellular data upload limit, you will need to manually upload this photo/video to the event album when your device is within the wifi range." (Note: Here [photo/video file name] would be replaced with the actual photo/video filename, and [MbLimit] would be replaced with the maximum value that's set for cellular data upload.)

'Double-check'—When 'Double-check' is selected, As seen in FIG. 10B, after each photo or video is taken during the event, including the 'Pre-event Duration' and 'Post-event Duration', photographer invitee will be prompted with a question 1010 to either upload or not to upload that photo/video to the event's centralized album. (Note: Only the photos/videos that were taken using 'Camera' application of the photographer invitee's device will be prompted for upload to the event's photo/video album.)

If the photographer invitee selects 'yes' 1012 to upload the photo/video, then it would be instantly uploaded to the event's photo/video album. If the photographer invitee selects 'no' 1014 for uploading a photo/video, then no additional action would be taken for that photo/video rather than just storing it on the device's photo library i.e. that photo/video would not be uploaded to event's photo/video album.

Here are some exceptions to the 'Double-check' functionality—Regardless of the 'Double-check' option selection, a photographer invitee can always go directly to the event's shared photo/video album (FIG. 14) on their supported operating system device and upload any additional photos/videos manually. Or a photographer invitee can also install an app or client software on their unsupported (different operating system) devices, which would allow them to manually upload any photos/videos, existing on their unsupported devices, to the shared photo/video album of the supported operating system.

If the photographer invitee takes a photo/video that has size more than the allowed/set limit for cellular data upload (for example: 100 Mb), then even though the event owner might have the upload preference set to 'Double-check' and confirms to upload the photo/video, it would still not be automatically uploaded. In addition, the following popup would be displayed to the photographer invitee—

"Since [photo/video file name] is more than [MbLimit] Mb, which is above the cellular data upload limit, you will need to manually upload this photo/video to the event album when your device is within the wifi range." (Note: Here [photo/video file name] would be replaced with the actual photo/video filename, and [MbLimit] would be replaced with the maximum value that's set for cellular data upload.)

'Manual'—When 'Manual' is selected, A photographer invitee agrees to manually select and upload photos/videos to the event's photo/video album. In other words, rather than automatically/instantly uploading their photos/videos that are taken during the event, a photographer invitee prefers to manually upload those photos/videos.

It will also provide an opportunity to photographer invitee to even upload those photos/videos that were initially saved to their device's photo library by possibly a third-party application on their device.

Note: For the manual upload option, a photographer invitee can also install an app or client software on their unsupported (different operating system) devices, which would allow them to manually upload any photos/videos, existing on their unsupported devices, to the shared photo/video album of the supported operating system.

By selecting this 'Manual' option, a photographer invitee takes the responsibility to try and upload any photos/videos before the event's 'Manual Upload Duration' is complete. By doing so, a photographer invitee's photos/videos would already be there on the event's album before any album notification is sent to the event guests.

In case if the photographer invitee isn't able to upload their photos/videos within the 'Manual Upload Duration', then they will still be allowed to upload those at a later time. The only problem with that is if any guests try to view the album before the new photos/videos are uploaded, then they would not be able to view those new photos/videos.

Here is an exception to the 'Manual' functionality—If the photographer invitee tries to manually upload a photo/video that has size more than the allowed/set limit for cellular data upload (for example: 100 Mb), then that photo/video would not be uploaded, and the following notification would be sent to the photographer invitee—

"Since [photo/video file name] is more than [MbLimit] Mb, which is above the cellular data upload limit, you will need to later upload this photo/video to the event album when your device is within the wifi range." (Note: Here [photo/video file name] would be replaced with the actual photo/video filename, and [MbLimit] would be replaced with the maximum value that's set for cellular data upload.)

'Assigned Photographers' 710—As seen in FIG. 7A, 'Assigned Photographers' option on the 'Share Event Photos/Videos' screen 700*a* would display the total count of the photographers assigned 712 by the event owner for that event. Thereafter, if the photographer invitees clicks on this 'Assigned Photographers' option, then a new screen 800*a* with the same title 'Assigned Photographers' 802 would open, listing all the assigned photographers 804 for the event individually. (Note: Unlike an event owner, a regular photographer invitee would just be able to see an existing list and wouldn't be able to add any new photographers using this 'Assigned Photographers' screen.)

As seen in FIG. 8A, a photo/video sharing response indicator 806 would be displayed next to each photographer invitee's name on the calendar event's photographer list 804 on the 'Assigned Photographers' screen 800*a*, which is visible to all the photographer invitees of the event. This response indicator would show if the photographer invitees have accepted (green circle), declined (red circle) or haven't yet responded (blank circle) to the event's photo/video sharing request.

As seen in FIG. 8A-8B, if the photographer invitee clicks on any of the photographer invitee's name 808 that are listed on the 'Assigned Photographers' screen 800*a*, then a new screen 'Photographer Info' 800*b* would open, containing the following fields (Note: Unlike an event owner, a regular photographer invitee wouldn't see the 'Remove Photographer' button on their 'Photographer Info' screen)—

'Name' field—This field would display the name of the photographer invitee, who was invited to act as one of the photographers for the event. Note: If the photographer invitee's name isn't available/known, then their email address or phone number would just be repeated on this 'Name' field. This would be a read-only field.

'Email' field—This field would display the photographer invitee's email address. (if available). This would be a read-only field.

'Phone' field—This field would display the photographer invitee's phone number. (if available). This would be a read-only field.

'Photo/Video Sharing Response' field—This field would display the latest response of the photographer invitee if they would share their photos/videos taken during the event or not. (Note: This field would only display the latest response even though a photographer invitee might have changed their response multiple times.) This would be a read-only field.

'Photo/Video Upload Preference' field. This field would only be visible if the above field 'Photo/Video Sharing Response' is 'Yes'. If the 'Photo/Video Upload Preference' field is visible, it would display the photographer invitee's latest selection for photos/videos upload preference. (Note: This field would only display the latest photo/video upload preference even though a photographer invitee might have changed their photos/videos upload preference multiple times.) If visible, this would be a read-only field.

'Back' button (An option to go back to the previous screen). When this 'Back' button is clicked, it would take the photographer invitee back to the 'Assigned Photographers' screen.

'Pre-event Duration (hours)' 714—As seen in FIG. 7A, photographer invitees would be able to view the value 716 for this 'Pre-event Duration (hours)' field 714 on their 'Share Event Photos/Videos' screen, however, they wouldn't be able to edit this field i.e. field would be grayed out (read-only) on their screens.

The following note/explanation will be added below the 'Pre-event Duration' field on the 'Share Event Photos/Videos' screen—"Assigned photographers are also requested to share photos/videos during 'Pre-event Duration'"

'Pre-event Duration' is the amount of time (in hours) before the start of the actual event. This field can only be set/updated by an event owner and allows requesting the photographer invitees to also share their photos/videos of the pre-event activities.

'Post Event Duration (hours)' 718—As seen in FIG. 7A, photographer invitees would be able to view the value 720 for this 'Post-event Duration (hours)' field 718 on their 'Share Event Photos/Videos' screen, however, they wouldn't be able to edit this field i.e. field would be grayed out (read-only) on their screens.

The following note/explanation will be added below the 'Post-event Duration' field on the 'Share Event Photos/Videos' screen—"Assigned photographers are also requested to share photos/videos during 'Post-event Duration'"

'Post-event Duration' is the amount of time (in hours) after an actual event has completed. This field can only be set/updated by an event owner and allows requesting the photographer invitees to also share their photos/videos of the post-event activities.

'Manual Upload Duration (hours)' 722—As seen in FIG. 7A, photographer invitees would be able to view the value 724 for this 'Manual Upload Duration (hours)' field 722 on their 'Share Event Photos/Videos' screen, however, they wouldn't be able to edit this field i.e. field would be grayed out (read-only) on their screens.

The following note/explanation will be added below the 'Manual Upload Duration' field on the 'Share Event Photos/Videos' screen—"This duration will begin once the Post-event Duration' is complete and will provide you an opportunity to manually upload any remaining photos/videos to the event album."

'Manual Upload Duration' is the amount of time (in hours) after the 'Post-event Duration' is complete for an event. This duration provides an opportunity for the photographer invitees to manually upload any of their remaining photos/videos to the event album. Note: This 'Manual Upload Duration' field can only be set/updated by an event owner.

'Go to Event Album' button 730—As seen in FIG. 7A-7B, this 'Go to Event Album' button won't be visible/enabled initially on the 'Share Event Photos/Videos' screen. However, as seen in FIG. 7C, it's only when a photographer invitee selects 'Yes' for 'Share Event Photos/Videos' field and saves the event, and thereafter, if that photographer invitee goes back to the 'Share Event Photos/Videos' screen of the calendar invite, then they would see the 'Go to Event Album' button 730 at the bottom of that screen.

A photographer invitee would be able to click on this 'Go to Event Album' button 730 and go directly to the associated photo/video album 1400 for that event.

Note: Suppose that the photographer invitee selects 'Yes' for 'Share Event Photos/Videos' field and saves the event, which adds the 'Go to Event Album' button at the bottom of the 'Share Event Photos/Videos' screen. Later if the photographer invitee again changes their selection for 'Share Event Photos/Videos' field to 'No' and saves the event, then the 'Go to Event Album' button would then no longer be visible/enabled on the 'Share Event Photos/Videos' screen.

'Back' button (An option to go back to the previous screen). When this 'Back' button is clicked, it would take the invitee back to the main screen of the calendar invite.

Potential Scenarios that can Take Place Once a Photographer Invitee Receives an Event Invite When the photographer invitees receive the event invite, here are the potential scenarios that can take place—Photographer invitee directly attempts to select 'Accept' or 'Maybe' for the event invitation response without first going to the 'Share Event Photos/Videos' screen to either accept or decline the photo/video sharing request for the event.

Under this scenario, if the invitee directly selects 'Accept' or 'Maybe' for the event invitation response, then a traditional appointment would first get added to their calendar, and the event owner would receive a notification about the invitee's response of 'Accept' or 'Maybe' for the event invitation. However, the invitee would then be automatically taken to the 'Share Event Photos/Videos' screen, which would act as a reminder and allow the invitee to either accept or decline the photo/video sharing request for the event.

If the invitee selects 'Yes' on the 'Share Event Photos/Videos' screen and saves the event, then the following would occur—

Invitee's selection of 'yes' for photo/video sharing would get saved on the calendar appointment.

Since the invitee had already selected 'Accept' or 'Maybe' for the invitation, their selection of 'yes' for the 'Share Event Photos/Videos' field on the 'Share Event Photos/Videos' screen would allow the invitee to be able to view, add or delete photos/videos on the event's photo/video album. (Note: A photographer invitee can only delete those photos/videos that they themselves uploaded and not the ones that someone else uploaded.) An event owner would receive a second notification with the invitee's response of 'yes' for the photo/video sharing request.

An indicator on the event album's participant list would display a green circle next to the photographer invitee's name to indicate that the photographer invitee has accepted the photo/video sharing request. Note: the photographer invitee's name on the album participant list (regardless of their photo/video sharing response) would be displayed in bold and would also have (P) next to their name in the suffix. This would help to distinguish between regular album participants and the assigned photographer participants on an album.

Similar to the event album participant list, a green circle indicator would also be displayed next to the photographer invitee's name on the calendar event's photographer lists i.e. on both the 'Assign Photographers' screen, which is visible to the event owner, as well as the 'Assigned Photographers' screen, which is visible to all the photographer invitees of the event. 'Go to Event Album' button would be available at the bottom of the 'Share Event Photos/Videos screen.

If the invitee selects 'No' on the 'Share Event Photos/Videos' screen and saves the event, then the following would occur—

Both the invitee's response of either 'Accept' or 'Maybe' for the calendar event invite and the photo/video sharing response of 'No' would get saved on the invitee's calendar.

The invitee would not be able to participate in the photo/video sharing activities of the event i.e. will not be able to view, add or delete photos/videos on the event's album even though the invitee has selected 'Accept' or 'Maybe' for the overall invitation response. In this case, the event owner would receive a second notification with the invitee's response of 'No' for the photo/video sharing request.

An indicator on the event album's participant list would display a red circle next to the photographer invitee's name to indicate that that the photographer invitee has declined the photo/video sharing request. Note: even though the photographer invitee declined the photo/video sharing request, their name would still be listed on the album participant list (regardless of their photo/video sharing response) in bold and would also have (P) next to their name in the suffix. This would help to distinguish between regular album participants and the requested photographer participants on an album.

Similar to the event album participant list, a red circle indicator would also be displayed next to the photographer invitee's name on the calendar event's photographer lists i.e. on both the 'Assign Photographers' screen, which is visible to the event owner, as well as the 'Assigned Photographers' screen, which is visible to all the photographer invitees of the event. In this case, 'Go to Event Album' button wouldn't be available at the bottom of the 'Share Event Photos/Videos' screen.

If the invitee doesn't select either 'Yes' or 'No' on the 'Share Event Photos/Videos' screen, and exits (either with or without saving) the event invite, then the following would occur—

Invitee will not be able to access the event's photo/video album until 'Yes' is selected on the 'Share Event Photos/Videos' field. In this case, since the invitee hasn't responded, the event owner won't receive the second notification about the photo/video sharing response of the photographer invitee.

Note: Even though the invitee might not have responded to the photo/video sharing request, their name would still be listed on the album participant list (regardless of their photo/video sharing response) in bold and would also have (P) next to their name in the suffix. This would help to distinguish between regular album participants and the assigned photographer participants. However, in this situation, the requested photographer invitee would be listed under the 'Not responded' category on the album participant list, and therefore, won't have access to the album at this point.

An indicator on the event album's participant list would display a blank circle next to the photographer invitee's name to indicate that that the photographer invitee has not yet responded to the photo/video sharing request.

Similar to the event album participant list, a blank circle indicator would also be displayed next to the photographer invitee's name on the calendar event's photographer lists i.e. on both the 'Assign Photographers' screen, which is visible to the event owner, as well as the 'Assigned Photographers' screen, which is visible to all the photographer invitees of the event. In this case, 'Go to Event Album' button wouldn't be available at the bottom of the 'Share Event Photos/Videos screen.

Note: An invitee can always go back to the appointment details on their calendar, and as long as the event hasn't ended, select 'Yes' or 'No' on the 'Share Event Photos/Videos' field on the 'Share Event Photos/Videos' screen, and thereafter, save that calendar event. Since the invitee had already selected 'Accept' or 'Maybe' for the overall invitation earlier, their selection of 'yes' or 'no' on the 'Share Event Photos/Videos' field would dictate if the invitee would have access to view or add photos/videos to the event's album or not. Also, upon such selection, an event owner would also receive a second notification with the invitee's photo/video sharing response of either 'yes' or 'no'.

Photographer invitee directly attempts to 'Decline' the event invitation without even going to the 'Share Event Photos/Videos' screen to either accept or decline the photo/video sharing request for the event.

Under this scenario, if the invitee directly selects 'Decline' on the event invitation (either before, during or up until the end of the meeting/event), then a new appointment would not be added to the invitee's calendar, and if the appointment already existed earlier, then it would be deleted.

Moreover, the invitee would no longer be able to select 'Yes' or 'No' on the 'Share Event Photos/Videos' screen because the event itself was declined/deleted. This would result in the invitee not being able to view, add or delete photos/videos on the event's centralized album.

In this case, the event owner would just receive one notification, and that's about the invitation decline by the invitee. (Note: It's assumed that once an invitation is 'declined' by an invitee, they can no longer 'Accept' that invitation unless and until an event owner resends that invitation to the invitee.)

Even though the invitee might have directly selected to 'Decline' the event invitation, their name would still be listed on the album participant list (regardless of their photo/video sharing response) in bold and would also have (P) next to their name in the suffix. This would help to distinguish between regular album participants and the assigned photographer participants. Note: In this situation, since the invitee directly selected to 'Decline' the event invitation, it indirectly means that the invitee wouldn't be taking photos/videos for the event. Therefore, an indicator on the event album's participant list would display a red circle next to the photographer invitee's name to indicate that the photographer invitee has declined the photo/video sharing request, and therefore, wouldn't have access to the event album.

Similar to the event album participant list, a red circle indicator would also be displayed next to the photographer invitee's name on the calendar event's photographer lists i.e. on both the 'Assign Photographers' screen, which is visible to the event owner, as well as the 'Assigned Photographers' screen, which is visible to all the photographer invitees of the event.

Photographer invitee first opens the 'Share Event Photos/Videos' screen from the event invitation to either accept or decline the photo/video sharing request and then later selects 'Accept' or 'Maybe' for the overall event invitation request.

Upon receiving the event invitation, if an invitee first goes to the 'Share Event Photos/Videos' screen and selects 'Yes' or 'No' for the photo/video sharing request but doesn't immediately make a selection for the overall event invitation, then the following rules will be applied until that invitee goes ahead and selects 'Accept' or 'Maybe' for the overall event invitation—

Even though 'Yes' or 'No' selection has been made on the 'Share Event Photos/Videos' screen by the photographer invitee, the event owner would not receive any notification regarding invitee's photo/video sharing response since the invitee has not yet selected 'Accept' or 'Maybe' for the overall event invitation.

Regardless of 'Yes' or 'No' selection on the 'Share Event Photos/Videos' screen, the invitee would not be able to view or add photos/videos to the event's centralized album because they haven't yet selected 'Accept' or 'Maybe' for the overall event invitation.

Note: Regardless of the photo/video sharing response, a photographer invitee's name would be listed on the event album participant list in bold and would also have (P) next to their name in the suffix. However, the indicator on the event album's participant list would still continue to display a blank circle next to the photographer invitee's name to indicate that the photographer invitee hasn't yet responded to the photo/video sharing request, and that's because the photographer invitee hasn't yet selected 'Accept' or 'Maybe' for the overall invitation.

Similar to the event album participant list, a blank circle indicator would continue to be displayed next to the photographer invitee's name on the calendar event's photographer lists i.e. on both the 'Assign Photographers' screen, which is visible to the event owner, as well as the 'Assigned Photographers' screen, which is visible to all the photographer invitees of the event. 'Go to Event Album' button wouldn't be available at the bottom of the 'Share Event Photos/Videos' screen until the photographer invitee selects 'Accept' or 'Maybe' for the overall invitation.

Once a photographer invitee selects their response ('Yes' or 'No') for photo/video sharing request, and thereafter, also goes ahead and selects either 'Accept' or 'Maybe' for the overall event invitation, then the following rules will be applied in this situation where both the selections for the photo/video sharing and the overall event invitation request have been made—

In this case, since the photographer invitee has already provided their response for photo/video sharing on the 'Share Event Photos/Videos' screen earlier, they wouldn't be re-prompted to select their photo/video sharing preference.

The event invite, including the invitee's selection of 'Yes' or 'No' for the photo/video sharing, would get saved on the invitee's calendar.

A notification will also be sent to the event owner informing them of not only the invitee's selection of 'Accept' or 'Maybe' for the event invitation, but also the invitee's photo/video sharing response of either 'Yes' or 'No'.

Depending upon the photographer invitee's previous selection of 'Yes' or 'No' on the 'Share Event Photos/Videos' screen, the following would occur—

If an invitee had previously selected 'Yes' on the 'Share Event Photos/Videos' screen, then they would now be able to view, add or delete photos/videos on the event's centralized album since they have now selected 'Accept' or 'Maybe' for the overall event invitation. In addition, an indicator on the event album's participant list as well as the calendar event's photographer lists would display a green circle next to photographer invitee's name to indicate that the photographer invitee has accepted the photo/video sharing request. Note: Regardless of the photo/video sharing response, such invitees would still be displayed on the event album's participant list as bold and would also have (P) next to their name in suffix. This would help to easily indicate the invitee's photographer invitee status for the album.

If an invitee had previously selected 'No' on the 'Share Event Photos/Videos' screen, then although they might select 'Accept' or 'Maybe' for the overall event invitation, they would still not be able to view or add photos/videos to the event's centralized album. In addition, an indicator on the event album's participant list as well as the calendar event's photographer lists would display a red circle next to the photographer invitee's name to indicate that the photographer invitee has declined the photo/video sharing request. Note: Regardless of the photo/video sharing response, such invitees would still be displayed on the event album's participant list as bold and would also have (P) next to their name in suffix. This would help to easily indicate the invitee's photographer invitee status for the album.

In this case, 'Go to Event Album' button would be available at the bottom of the 'Share Event Photos/Videos' screen since the photographer invitee would have selected either 'Accept' or 'Maybe' for the overall invitation.

Photographer invitee first opens the 'Share Event Photos/Videos' screen from the event invitation to either accept or decline the photo/video sharing request, however, later selects 'Decline' for the overall event invitation request.

Upon receiving the event invitation, if an invitee first goes to the 'Share Event Photos/Videos' screen and selects 'Yes' or 'No' for the photo/video sharing request, but doesn't immediately make a selection for the overall event invitation, then the following rules will be applied—

Even though 'Yes' or 'No' selection has been made on the 'Share Event Photos/Videos' screen by the photographer invitee, the event owner would not receive any notification regarding invitee's photo/video sharing response since the invitee has not yet responded (in this case—declined) to the overall event invitation.

Regardless of 'Yes' or 'No' selection on the 'Share Event Photos/Videos' screen, the invitee would not be able to view or add photos/videos to the event's centralized album because they haven't yet responded (in this case—declined) to the overall event invitation.

Note: Regardless of the photo/video sharing response, a photographer invitee's name would be listed on the event album participant list in bold and would also have (P) next to their name in the suffix. However, the indicator on the event album's participant list would still continue to display a blank circle next to the photographer invitee's name to indicate that the photographer invitee hasn't yet responded to the photo/video sharing request, and that's because the photographer invitee hasn't yet responded (in this case—has not yet declined) to the overall event invitation.

Similar to the event album participant list, a blank circle indicator would also continue to be displayed next to the photographer invitee's name on the calendar event's photographer lists i.e. on both the 'Assign Photographers' screen, which is visible to the event owner, as well as the 'Assigned Photographers' screen, which is visible to all the photographer invitees of the event.

In this case, 'Go to Event Album' button wouldn't be available at the bottom of the 'Share Event Photos/Videos' screen for the photographer invitee.

If a photographer invitee selects their response ('Yes' or 'No') for event's photo/video sharing request, however, later goes ahead and selects 'Decline' for the overall event invitation, then the following rules will be applied in this situation where both the selections for the photo/video sharing and the overall event invitation request have been made. (Note: In this case, 'Decline' response for the overall event invite is assumed to be selected either before, during or up until the end of the event.) Since the invitee has selected 'Decline' for the overall event invitation, the following will occur—

In this case, since the photographer invitee has already provided their response for photo/video sharing on the 'Share Event Photos/Videos' screen earlier, they wouldn't be re-prompted to select their photo/video sharing preference.

If an invitee had previously selected 'Yes' on the 'Share Event Photos/Videos' field available on the 'Share Event Photos/Videos' screen, then the invitee will be prompted with the following message when they select 'Decline' for the overall event invitation—"You have agreed to share photos/videos for this event, however, you can only do that if you either select 'Accept' or 'Maybe' option for the event invitation. Are you sure you want to decline this invitation and not participate in any photo/video sharing activities for this event?"

If the invitee selects 'Yes' on the message prompt, then the following would occur—Event would be declined, and therefore, the event won't be added to the invitee's calendar. Only one notification about the event decline will be sent to the event owner i.e. event owner will not receive second notification about their photo/video sharing decision since the event invitation itself was declined by the invitee. Invitee will not have access to view or add photos/videos to the event's centralized album Even though the invitee might have selected to 'Decline' the event invitation, their name would still be listed on the event album's participant list (regardless of their photo/video sharing response) in bold and would also have (P) next to their name in the suffix. This would help to distinguish between regular album participants and the assigned photographer participants. Note: In this situation, since the invitee has selected to 'Decline' the event invitation, it indirectly means that the invitee wouldn't be taking photos/videos for the event (regardless of their previous selection/response for photo/video sharing request). Therefore, an indicator on the event album's participant list would display a red circle next to the photographer invitee's name to indicate that that the photographer invitee has declined the photo/video sharing request, and therefore, wouldn't have access to the event album.

Similar to the event album participant list, a red circle indicator would also be displayed next to the photographer invitee's name on the calendar event's photographer lists i.e. on both the 'Assign Photographers' screen, which is visible to the event owner, as well as the 'Assigned Photographers' screen, which is visible to all the photographer invitees of the event.

If the invitee selects 'No' on the message prompt, then the following would occur—Photographer invitee would be taken back to the calendar event main screen and would have the option to reselect either 'Accept', 'Decline' or 'Maybe' for the event invitation. Nothing would be added to the invitee's calendar. Also, no notification will be sent to the event owner until the invitee reselects their invitation response. Invitee will not have access at this point to either view or add photos/videos to the event's centralized album.

Note: Regardless of the photo/video sharing response, a photographer invitee's name would be listed on the event album participant list in bold and would also have (P) next to their name in the suffix. However, the indicator on the event album's participant list would still continue to display a blank circle next to the photographer invitee's name to indicate that the photographer invitee hasn't yet responded to the photo/video sharing request, and that's because the photographer invitee hasn't yet sent their final response for the overall event invitation.

Similar to the event album participant list, a blank circle indicator would also continue to be displayed next to the photographer invitee's name on the calendar event's photographer lists i.e. on both the 'Assign Photographers' screen, which is visible to the event owner, as well as the 'Assigned Photographers' screen, which is visible to all the photographer invitees of the event. In this case, 'Go to Event Album' button wouldn't be available at the bottom of the 'Share Event Photos/Videos' screen of the event invitation.

If an invitee had previously selected 'No' on the 'Share Event Photos/Videos' screen, and thereafter, if that invitee selects 'Decline' for the overall invitation, then the following will occur—Invitee will not be prompted with any confirmation screen, and the event would simply be declined i.e. would not be added to the invitee's calendar.

Only one notification about the event decline would be sent to the event owner. In other words, event owner would not receive the second notification about the photo/video sharing response from the invitee since the overall invitation itself was declined by the invitee. Invitee won't have access to either view or add photos/videos to the event's centralized album.

Even though the invitee might have selected to 'Decline' the event invitation, their name would still be listed on the event album's participant list (regardless of their photo/video sharing response) in bold and would also have (P) next to their name in the suffix. This would help to distinguish between regular album participants and the assigned photographer participants. Note: In this situation, since the invitee has selected to 'Decline' the event invitation, it indirectly means that the invitee wouldn't be taking photos/videos for the event (regardless of their previous selection/response for photo/video sharing request). Therefore, an indicator on the event album's participant list would display a red circle next to the photographer invitee's name to indicate that the photographer invitee declined the photo/video sharing request, and therefore, wouldn't have access to the event album.

Similar to the event album participant list, a red circle indicator would also be displayed next to the photographer invitee's name on the calendar event's photographer lists i.e. on both the 'Assign Photographers' screen, which is visible to the event owner, as well as the 'Assigned Photographers' screen, which is visible to all the photographer invitees of the event.

Photographer invitee first opens the 'Share Event Photos/Videos' screen from the event invitation to either accept or decline the photo/video sharing request, however, later doesn't select a response (Accept', 'Decline' or 'Maybe') for the overall event invitation. Under this scenario, since the invitee doesn't select a response (Accept', 'Decline' or 'Maybe') for the overall event invitation, the following will occur—

1. Event appointment wouldn't be saved on the invitee's calendar.
2. Event owner will not receive any notification from the invitee either for the overall event response or for the event's photo/video sharing response. (Note: In this case, even though the invitee had selected the event's photo/video sharing response, but that isn't notified to the event owner because the invitee hasn't responded to the overall event invitation.)
3. Invitee wouldn't be allowed to view or add photos/videos to the event's centralized album.
4. In this case, 'Go to Event Album' button wouldn't be available at the bottom of the 'Share Event Photos/Videos' screen of the event invitation.

Note: Regardless of the photo/video sharing response, a photographer invitee's name would be listed on the event album's participant list in bold and would also have (P) next to their name in the suffix. However, the indicator on the event album's participant list would still continue to display a blank circle next to the photographer invitee's name to indicate that the photographer invitee hasn't yet responded to the photo/video sharing request, and that's because the photographer invitee hasn't yet provided their response for the overall event invitation request.

Similar to the event album participant list, a blank circle indicator would continue to be displayed next to the photographer invitee's name on the calendar event's photographer lists i.e. on both the 'Assign Photographers' screen, which is visible to the event owner, as well as the 'Assigned Photographers' screen, which is visible to all the photographer invitees of the event.

Photographer invitee does nothing with the invitation i.e. neither accepts/declines the photo/video sharing request nor accepts/declines the event invitation request. Under this scenario, the following will occur—

1. Event appointment wouldn't be saved on the invitee's calendar.
2. Event owner will not receive any notification from the invitee either for the overall event response or for the event's photo/video sharing response.
3. Invitee wouldn't be allowed to view or add photos/videos to the event's centralized album.
4. In this case, 'Go to Event Album' button wouldn't be available at the bottom of the 'Share Event Photos/Videos' screen of the event invitation.

Note: Regardless of the photo/video sharing response, a photographer invitee's name would be listed on the event album's participant list in bold and would also have (P) next to their name in the suffix. However, the indicator on the event album's participant list would still continue to display a blank circle next to the photographer invitee's name to indicate that the photographer invitee hasn't yet responded to the photo/video sharing request.

Similar to the event album participant list, a blank circle indicator would continue to be displayed next to the photographer invitee's name on the calendar event's photoglists i.e. on both the 'Assign Photographers' screen, which is visible to the event owner, as well as the 'Assigned Photographers' screen, which is visible to all the photographer invitees of the event.

Suppose that a photographer invitee accepts both the photo/video sharing request as well as the overall event invitation, which gives them access to the event's photo/video album. Later, if the photographer invitee goes to the event's centralized album and clicks on 'Album Settings' button 1404, then the album settings screen 1600*a* would open up with the below listed options enabled/visible on it (Please note that in order to explain the new functionality related to event's photo/video sharing, some of the currently existing options on a photo/video albums' settings screen are also described below.)—

'Album Participants'—As seen in FIG. 16A, this 'Album Participants' option on the album's settings screen would display the total count of the regular album participants as well as the photographer album participants for an event album. If the photographer invitee clicks on this 'Album Participants' option, then a new screen 1600*b* with the same title 'Album Participants' would open listing all the assigned regular as well as the photographer album participants (Note: this 'Album Participants' screen 1600*b* is similar to what's displayed to an event owner on 1500*b* screen, however the available options are slightly different for both an event owner and the photographer invitees)—Photographer invitees wouldn't have the options available to add any new regular album participant to the event album. Also, they wouldn't be able to go to the event's calendar invite and add any photographer album participant.

However, as seen in FIG. 16B, photographer invitees would be able to view all the assigned album participants including the regular as well as the photographer album participants. (Note: the photographer album participant's name on the participant list (regardless of the photo/video sharing response) would be displayed in bold and would also have (P) next to their name in the suffix. This would help to distinguish between regular album participants and the photographer album participants.) If a photographer invitee clicks on any of those album participants, then as seen in FIG. 16C, a new screen 'Participant Info' 1600*c* would open, containing the following fields (Note: this 'Participant Info' screen 1600*c* is similar to what's displayed to an event owner on 1500*c* screen, however the 'Remove Album Participant' option wouldn't be available to the photographer invitees.)—

'Name' field—This field would display the name of the album participant. Note: If the album participant's name isn't available/known, then their email address or phone number would just be repeated on this 'Name' field. This would be a read-only field.

'Email' field—This field would display the album participant's email address. (if available). This would be a read-only field.

'Phone' field—This field would display the album participant's phone number. (if available). This would be a read-only field.

'Photo/Video Sharing Response' field—This field would only be visible when looking at a photographer album participant's profile. In other words, for regular album participants, this field wouldn't display.

This field would display the latest response of the photographer invitee i.e. the photographer album participant to indicate if they would share their photos/videos taken during the event or not. (Note: This field would only display the latest response even though a photographer invitee might have changed their response multiple times.) This would be a read-only field.

'Photo/Video Upload Preference' field—This field would only be visible when looking at a photographer album participant's profile. In other words, for regular album participants, this field wouldn't display.

Even when the profile is of a photographer album participant, this field would only be visible only if the above field 'Photo/Video Sharing Response' is 'Yes'.

If the 'Photo/Video Upload Preference' field is visible, it would display the photographer album participant's latest selection for photos/videos upload preference. (Note: This field would only display the latest photo/video upload preference even though a photographer invitee might have changed their photos/videos upload preference multiple times.) If visible, this would be a read-only field.

'Back' button (An option to go back to the previous screen) When this 'Back' button is clicked, it would take the photographer invitee back to the 'Album Participants' screen.

'Send Album Website Link via Email' button (FIG. 16A)—When this button is clicked, it would allow the photographer invitee to send the event album's website link via an email to anyone they want. (Note: This button would only be enabled on the photographer invitee's album settings screen as long as the "Album's Public Website" option is set to 'Yes' by the event owner.) In other words, as shown in FIG. 17A-17B, this 'Send Album Website Link via Email' button would no longer be enabled on the photographer invitee's album settings screen 1700*b* if the "Album's Public Website" field on the event owner's album settings screen 1700*a* is changed from 'Yes' to 'No' 1702 by the event owner.

As seen in FIG. 16A, if the "Send Album Website Link via Email" button is enabled on the photographer invitee's album settings screen, then the following note 1602 would be added right below that button—"Since the album's public website is turned on, this album can be accessed via the browser and can be shared with other people using different operating systems on their devices."

As seen in FIG. 17B, if the "Send Album Website Link via Email" button is no longer enabled on the photographer invitee's album settings screen, then the following note 1704 would be added on that screen—"Note: This album can't be shared via email as the event album's public website is turned off by the event owner."

'Go to Associated Calendar Event' button (FIG. 16A)—When this button is clicked, it would take the photographer invitee from the event album's settings screen to the associated calendar event. (Note: This button would be automatically disabled (not visible) if the associated calendar event no longer exists on the photographer invitee's calendar application.)

'Remove My Photographer/Album Access' button (FIG. 16A)—When this 'Remove My Photographer/Album Access' button 1604 is clicked by a photographer invitee, it would not only remove their access for the event's photo/video album (mark as 'Declined' on the album participant list) but also since this album was associated with a calendar event, photo/video sharing related options would also be automatically declined ('No') for that photographer invitee on the event's photographer list. (Note: Such photographer invitee would still continue to remain on the calendar event's invitee list.)

Photographer invitee initially responds to both the photo/video sharing request as well as the overall event invitation, however, later decides to change either of their responses as long as the event hasn't ended, including its 'post event duration' and the 'Manual Upload Duration' of the event.

Under this scenario, an invitee can either change their response of 'Yes' or 'No' on the 'Share Event Photos/Videos' screen (photo/video sharing response) or they can also change their response of 'Accept', 'Maybe' or 'Decline' on the overall event invitation. In either of those situations, the following would occur—

Any of the changes made by the photographer invitee would be saved on the event appointment on the invitee's calendar.

Event owner would receive an additional notification informing them of the invitee's change of response for either photo/video sharing or for the overall event invitation.

Depending upon the changes made, a photographer invitee might or might not be able to view or add photos/videos to the event's centralized photo/video album. (For example, if the photographer invitee changes their response on the 'Share Event Photos/Videos' screen to 'No', or selects 'Decline' for the overall event invitation, then the invitee would no longer have access to the event album, however, any photos/videos that might have been previously uploaded by that invitee on the event's album would still continue to remain on that album. In this situation, an event owner would still be able to go to the event album and delete any of the photos/videos that they don't like.) Therefore, depending upon the changes made by an invitee, it would impact their access to the event album.

Depending upon the changes made by the photographer invitee, 'Go to Event Album' button might or might not be available at the bottom of the 'Share Event Photos/Videos' screen.

An indicator next to the photographer invitee's name on the event album participant list would display their latest response for the event's photo/video sharing request i.e. indicator would display if the photographer invitee has accepted (green circle), declined (red circle) or hasn't yet responded (blank circle) to the event's photo/video sharing request.

An indicator next to the photographer invitee's name on the calendar event's photographer list i.e. on both the 'Assign Photographers' screen, which is visible to the event owner, and the 'Assigned Photographers' screen, which is visible to all the photographer invitees of the event, would display the photographer invitee's latest response for the event's photo/video sharing request. In other words, this indicator would display if the photographer invitee has accepted (green circle), declined (red circle) or hasn't yet responded (blank circle) to the event's photo/video sharing request.

Here is an example of how a photographer invitee might originally choose their response for both the photo/video sharing and the overall event invitation, however, they might decide to change their response before the event is over.

Suppose an invitee had previously selected 'Yes' for the photo/video sharing response and 'Accept' for the overall event response, however, before the event ends, invitee might decide to go back to the 'Share Event Photos/Videos' screen for the event (on their calendar) and change their photo/video sharing response to 'No.' In this situation where a photographer invitee wants to remove themselves from being a photographer for the event, the following would occur—

Both the invitee's response of 'Accept' for the overall calendar invite and the latest photo/video sharing response of 'No' would get saved on the invitee's calendar.

In this case, the event owner would also receive a notification with the invitee's latest response of 'no' for the photo/video sharing request.

On the event's calendar invite, the photographer invitee would continue to remain on the photographer list i.e. on the 'Assign Photographers' screen, which is visible to the event owner, and the 'Assigned Photographers' screen, which is visible to all the photographer invitees of the event. However, it would be noted that the photographer invitee has declined the photo/video sharing request for the event by displaying a red circle indicator next to the photographer invitee's name.

An indicator on the event album's participant list would display a red circle next to the photographer invitee's name to indicate that the photographer invitee declined the photo/video sharing request. Note: even though the photographer invitee declined the photo/video sharing request, their name would still be listed on the album participant list (regardless of their photo/video sharing response) in bold and would also have (P) next to their name in the suffix. This would help to distinguish between regular album participants and the assigned photographer participants.

The photographer invitee would no longer be able to participate in the photo/video sharing activities of the event i.e. they would no longer be able to view or add new photos/videos or even delete any previously uploaded photos/videos on the event's album. (Note: Any of the photos/videos that were previously uploaded by such photographer invitee would still remain on the event's photo/video album. If needed, the event owner would be able to go to the event album and delete any of those photos/videos that they don't like.)

'Go to Event Album' button would no longer be available at the bottom of the 'Share Event Photos/Videos' screen for the photographer invitee.

'Upload Preference' field on the 'Share Event Photos/Videos' field would be immediately disabled without even requiring the save of the calendar event invite.

Note: Such photographer invitees that decline the photo/video sharing for the event would still remain on the event invitee list, and therefore, if the event owner shares the event album in future, then those invitees would still be able to view that event album.

For reference, here are some other examples that demonstrate how an invitee might decide to change their initial response (Note: Purpose of these examples is to show the kind of changes that an invitee might make, however, these are just few examples and do not include all the potential change scenarios)—

Suppose an invitee had previously selected 'Maybe' for the overall event response, however, as the event date comes near, an invitee might decide to go back to the event details screen on their calendar and change their invitation response to 'Accept.'

Suppose an invitee had previously selected 'Maybe' or 'Accept' for the overall event response, however, due to some other conflict, an invitee might decide to go back to the event details screen on their calendar and change their invitation response to 'Decline.'

Suppose an invitee had previously selected 'No' for the photo/video sharing response and 'Accept' for the overall event response, however, as the event date comes near, an invitee might decide to go back to the 'Share Event Photos/Videos' screen for the event (on their calendar) and change their photo/video sharing response to 'Yes.'

Suppose an invitee had previously selected 'No' for the photo/video sharing response and selected 'Accept' for the overall event invitation response. Hence, the event album's participant list would display the photographer invitee on its list, but the photographer invitee's photo/video sharing response would be listed as 'Declined'. Thereafter, suppose that the event owner decides to manually share the event album with that photographer invitee. In this case, there would be another record added for the photographer invitee on the event album's participant list as a regular album participant. Now suppose that before the event ends, invitee decides to go back to the 'Share Event Photos/Videos' screen and changes their photo/video sharing response to 'Yes', then the following would occur—

Photographer invitee would first be removed of their regular album participant role from the event album, and then for their photographer participant role, it would be displayed that the photographer album participant has accepted photo/video sharing for the event. By doing so, it would help to avoid creating two instances of the same event album for a single invitee.

Photographer invitee initially accepts both the photo/video sharing request as well as the overall event invitation, and also selects their photos/videos upload preference on the 'Share Event Photos/Videos' screen. However, later the photographer invitee decides to change their photos/video upload preference. Under this scenario, the following would occur—

Depending upon the change made by the photographer invitee on the 'Upload Preference' field (either 'Auto', 'Double-check' or 'Manual'), their photo/videos upload preference will be changed on their calendar invite.

Depending upon the selection (either 'Auto', 'Double-check' or 'Manual'), here is a quick summary of what would happen—

'Auto'—When 'Auto' is selected, all photos/videos taken using the 'Camera' application of the photographer invitee's device during the event, including the 'Pre-event Duration' and 'Post-event Duration', will be instantly uploaded to the event's photo/video album.

'Double-check'—When 'Double-check' is selected, after each photo or video is taken using the 'Camera' application of the photographer invitee's device during the event, including the 'Pre-event Duration' and 'Post-event Duration', the photographer invitee will be prompted with a question to either upload or not to upload them to the event's photo/video album.

If the photographer invitee selects 'yes' to upload the photo/video, then it would be instantly uploaded to the event's photo/video album.

If the photographer invitee selects 'no' for uploading a photo/video, then no additional action would be taken for that photo/video rather than just storing it on the device's photo library i.e. that photo/video would not be uploaded to event's centralized photo/video album.

'Manual'—When 'Manual' is selected, Photos/videos aren't uploaded automatically, rather the invitee agrees to manually select and upload photos/videos to the event's centralized photo/video album before the 'Manual Upload Duration' is complete. Note: In case if the photographer invitee isn't able to upload their photos/videos within the 'Manual Upload Duration', then they would still be allowed to upload those at a later time. The only problem with that is if any guests view the album before the new photos/videos are uploaded, then they would not see the newly uploaded photos/videos.

Note: When a photographer invitee makes a change to the 'Upload Preference' field before an event ends, including its 'Post-event Duration', then any of those changes would be notified to the event owner and would only be applicable to any future photos/videos taken by that invitee.

Note: If a change is made to 'Upload Preference' field after an event ends, including its 'Post-event Duration', then the photographer invitee would be prompted with the following message along with the 'Yes' and 'No' buttons—"The event has already ended and its associated event album might have already been shared with the event guests. Would you still like to make these updates and notify the event owner?" If the photographer invitee selects 'Yes', then the changes would be saved and the event owner would be notified about the changes. However, if the photographer invitee selects 'No', then any of those changes wouldn't be saved.

Note: During an event, including its 'Pre-event Duration' and the 'Post-event Duration', the 'Camera' application of the invitee's device would display a thin, colored border frame, and in addition, it would also display the event's name and the invitee's latest photo/video upload preference ('Auto', 'Double-check' or 'Manual').

Note: Even if an event owner goes to the calendar event and looks for the photos/videos upload preference selected by its event's photographer invitees, then they would be able to see the latest selections made by those invitees.

Note: Regardless of the selection made on the 'Upload Preference' field, if the photographer invitee takes any photos/videos that have size more than the allowed/set limit for cellular data upload (for example: 100 Mb), then those photos/videos would not be uploaded at that time. In such a situation, a photographer invitee would need to later upload those photos/videos when their device is within the wifi range.

Suppose an event is already complete, including its 'Post-event Duration', and thereafter, a photographer invitee decides to update their photo/video sharing response or the overall event invitation response. In this situation, the following would occur—

Photographer invitee would be prompted with the following message along with the 'Yes' and 'No' buttons—"The event has already ended and its associated event album might have already been shared with the event guests. Would you still like to make these updates and notify the event owner?" If the photographer invitee selects 'Yes' on the change confirmation screen, then the following would occur—

Photographer invitee's calendar event would be updated based on their latest selections. In addition, photographer invitee's access to the event's album would also be updated based on their latest selections on the event invite. An event owner would be notified about the changes made by the photographer invitee.

The rules that are applicable for any changes made by a photographer invitee before an event ends, all those same rules would also be applicable for any changes made after an event is complete. The following situation can occur both before and after an event is complete, however, it has more chances of occurring after an event ends—

In case if a situation occurs where the photographer invitee accepts their photo/video sharing invitation after an event album is already shared (event album is shared with the photographer invitee as a regular album participant), then the following would occur—photographer invitee would first be removed of their regular album participant role from the event album, and thereafter, on their photographer participant role of the event album, it would be displayed that the photographer invitee has accepted photo/video sharing for the event. By doing so, it would help to avoid creating two instances of the same event album for a single invitee. (Note: As long as the photographer invitee accepts their photo/video sharing request for an event after they have already had access to that event's album as a regular album participant, then the above mentioned rule would be applicable either before or even after an event is complete.)

Note: When the photographer invitee confirms to apply their changes made on the event invite, after an event is complete, it verifies that the event owner really wants to pursue those changes regardless of the consequences. For example: if the photographer invitee declines photos/video sharing request after an event is complete, then they would lose their access to the event's album, however, it's possible that all other guests might continue to have access to the event album as a regular album participants (since an album might have been shared with them after an event was complete). Therefore, in this situation, the photographer invitee wouldn't have access to the album until an event owner manually shares the album with them again, whereas, all the other guests might continue to maintain their access to the event album. In short, by confirming the update request, a photographer invitee takes full responsibility for their actions.

If the photographer invitee selects 'No' on the change confirmation screen, then the following would occur—No changes would be saved and the photographer invitee would be taken back to the calendar event's main screen.

Suppose that all the requested photographer invitees decline their photo/video sharing request for an event or simply decline their event invitations altogether. In either of those situations, the following would occur—An event owner would still be able to act as one of the event photographers, upload their photos/videos taken during the event to the centralized photo/video album, and thereafter, share that event's album with the event guests.

Suppose that a photographer invitee receives an invitation for an event that's recurring. In this situation, all of the above/previously mentioned scenarios for a regular invitation would also apply to a recurring event. However, here are some additional things that would apply specifically for a recurring event—When a photographer invitee initially responds to the photo/video sharing request along with the overall invitation, then the following would occur—

The photographer invitee's response for the invitation as well as photo/video sharing response would apply to all of the recurring events.

Note: Even though a photographer invitee might accept the overall recurring invitation and select 'Yes' for photo/video sharing, initially they would only get access to view/update the first event's photo/video album. In fact, an event owner would also initially just have access to the first event's photo/video album. Any of the future recurring events' albums would only be created/shared with the photographer invitees, including the event owner, on the same day (at 12:00 am) when the next event is actually supposed to start. For example: If the event owner sets up a recurring event that repeats every Tuesday for 3 weeks. In this case, an event owner or any photographer invitees, who accept the photo/video sharing request, would initially only get access to view/update the album for the first week's event. Now suppose the second week's event, including its 'Pre-event Duration', was suppose to occur on November $17^{th}$, then on November $17^{th}$ at 12:00 am, second week's album would be auto-created, and shared with not only the event owner but also all photographer invitees that had accepted the photo/video sharing request for the second week's event. Similarly, on November $24^{th}$ at 12:00 am, the third week's album would be created and shared with the event owner as well as the eligible photographer invitees (the ones who accepted photo/video sharing for that week's event)

Note: When a photographer invitee accepts a recurring invitation, 'Go to Even Album' button would initially only be available on the first event's 'Share Event Photos/Videos' screen. However, as the future recurring events' albums are created/shared with the photographer invitee, then the 'Go to Event Album' button would also be added to those future recurring events accordingly.

Note: Photo/video album that gets created for each recurring event would be named as the event title along with the event start date/time (including the hours and minutes) in the suffix of the name. (Note: Event start date/time in the photo/video album name will help to distinguish between different recurring events.)

Note: the feature of creating an event album for just the upcoming recurring event and not all the events in advance (during the initial set up itself) is a special feature for recurring events and doesn't apply to the regular events. And therefore, just for recurring events, the photographer invitees can exist on the future calendar invite even though that event's album itself might not be present/created until later. On the contrary, if an event album is once created for a recurring event and thereafter if it's manually deleted by the event owner, then in that case, all event photographers would be removed from the calendar invite similar to the deletion of a regular event album. In short, it's only until a recurring event's album is created, that the photographer invitees can exist on that event without being applied the rules of a regular invite, where the photographer invitees are automatically removed from the event when its photo/video album doesn't exist.

After accepting the recurring events invitation, if a photographer invitee tries to make some updates/changes on one of the recurring calendar events, then they would be prompted to select one of the below—

1. 'Apply changes to just this event'
2. 'Apply changes to all future events'

Therefore, if a photographer invitee wants to make some photo/video sharing related updates to just one of the recurring events i.e. not apply those changes to all recurring events, then they can do so by directly going to that particular event, make their necessary changes and upon save, select to apply those changes just to that particular event. (For example: A photographer invitee might be out of town for one of the recurring events, and therefore, might decide to go to that particular event and decline the event for that day, and indirectly also decline the photo/video sharing request for that day. In this case, upon save, the photographer invitee would select to just apply the changes to that particular event, and therefore, any of their previous selections made for other recurring events would still remain the same as earlier. Similar to this example, a photographer invitee would also be able to make other changes, like photo/video upload preference, etc for a particular event or apply those changes to all recurring events.)

Suppose one of the photographer invitees, excluding an event owner, opens their event invitation, which also has the photo/video sharing request, and forwards it to some other person who wasn't originally on the invite list, then in this situation, the following would occur—

The photographer invitee, who was trying to forward the invite, will receive the following notification along with the 'Yes' and 'No' buttons—"When this event invite is forwarded, it wouldn't include the photo/video sharing request for the event since that request can only be made by an event owner. Would you still like to go ahead and forward this invite?" If the photographer invitee selects 'Yes' as their response to the above message, then the event invitation would be forwarded but would not include the photo/video sharing request. If the photographer invitee selects 'No' as their response to the above message, then the event invitation would not be forwarded.

The individual receiving the forwarded invite would be able to view the invitation and accept/decline the invite. However, they would not see any photo/video sharing related options on their invitation.

Suppose that an invitee receives two calendar event invitations that are either for exact same time or partially overlapping timeframes. However, both of those event invites request the invitee to take photos/videos during those individual events and upload them to their respective photo/video albums. In such a situation, the following would occur—

Once an invitee goes ahead and accepts one of the event invitations along with the photo/video sharing request for that invite, then for any time between that event's 'Pre-event Duration' to the end of its 'Post-event Duration', that invitee would no longer be able to accept photographer request for any other event invites. This would essentially restrict the invitee from committing to take photos/videos for two events at the same time.

In fact, once an invitee accepts a photo/video sharing request for an event, then if any other photo/video sharing requests come in for another event, either at the exact same time or partially overlapping time, then those latter events would automatically have the photo/video sharing options disabled (grayed out). For such latter events, the photographer invitee would be notified that the event owner did request photo/video sharing for those events, however, since another photo/video sharing request was already accepted by the invitee, therefore, the photo/video sharing related options were disabled for those new events. Note: No other reminders or notifications would be sent to the invitee to accept/decline the photo/video sharing request for those latter events.

Note: Even if the second event just had a short amount of time overlapping with the first event, where the invitee had accepted the photo/video sharing request, then the invitee would no longer have the option available to accept the photographer request for the second event. The only exception possible is that if the photographer invitee goes back and declines the photo/video sharing request on their first invite, then the photo/video sharing options would be automatically enabled (no longer grayed out) on the second invite, and the invitee would be able to go back and accept that second event's photo/video sharing request.

Display of the Reminder Message to the Photographers about the Start of the Event and an Opportunity to Change any of the Previous Selections for Event's Photo/Video Sharing Photographer invitees, who select 'Yes' on the 'Share Event Photos/Videos' screen and also select 'Accept' or 'Maybe' on the overall event invitation, will receive the below reminder message at the beginning of the 'Pre-event Duration' of an event. (Note: Pre-Event start time is the event's start time minus the 'Pre-event Duration', which are both specified by the event owner while setting up the event. For example: If the event was going to start at 4:00 pm, and 'Pre-event Duration' was specified by the event owner as 1 hour, then the Pre-Event start time would be 3:00 pm.) Therefore, regardless if it's one of the recurring events or a regular event, an automated reminder message would be displayed to the photographer invitee at the start of the pre-event duration. (Note: An event owner would also be displayed with a similar message/options since they are also one of the event's mandatory photographers)—

As seen in FIG. 9, as long as the 'Pre-event Duration' field was set to a value greater than 0 hours on the event's calendar invite, then the following reminder message 902 would be sent to the photographer invitee at the beginning of the pre-event duration—"Pre-event duration for [EventName] has started. You had previously agreed to share photos/videos for this event with a photo/video upload preference of [UploadPreference]. If you would like to change your previous selections, please click 'Edit'." (Note: [EventName] would be replaced with the actual name of the event and [UploadPreference] would be replaced with the photographer invitee's previously selected photo/video upload preference of 'Auto', 'Double-check', or 'Manual')

If the 'Pre-event Duration' field was set to 0 hours on the event's calendar invite, then rather than the above reminder, the following reminder message would be sent to the photographer invitee at the beginning of the event—"Event—[EventName] has started. You had previously agreed to share photos/videos for this event with a photo/video upload preference of [UploadPreference]. If you would like to change your previous selections, please click 'Edit'." (Note: [EventName] would be replaced with the actual name of the event and [UploadPreference] would be replaced with the photographer invitee's previously selected photo/video upload preference of 'Auto', 'Double-check', or 'Manual'.)

As mentioned above, photographer invitees would be given an option on the reminder screen to either acknowledge the message using the 'Close' button 906 or edit their photo/video sharing preference for the event using an 'Edit' button 904.

If a photographer invitee selects the 'Close' button 906, they would simply acknowledge the automated message, and based on their previously selected photo/video upload preference, they would begin to start sharing their photos/videos accordingly.

If a photographer invitee selects the 'Edit' button 904, they would be taken to the 'Share Event Photos/Videos' screen 700c and would be allowed to do either of the following—Be able to change the photo/video sharing preference from 'Yes' to 'No'; Be able to change the photos/videos upload preference from their previous selection to a new selection (Here is the list of possible values that can be selected—'Auto', 'Double-check', 'Manual').

Note: If an event owner, who is also one of the photographer invitees for the event, clicks 'Edit' button 904 on their reminder message, then they would be taken to the 'Event Photos/Videos' screen 200c, and not the 'Share Event Photos/Videos' screen (other photographer invitees would be taken here). Also note that an event owner would not be able to remove themselves from the photographer list of an event.

Note: Even if a photographer invitee doesn't select neither 'Close' button 906 nor 'Edit' button 904 on the photo/video sharing reminder screen 900a, their photo/video sharing features (based on their previous selection of photo/video upload preference) would still be turned on as soon as they receive the reminder about the start of the pre-event or the event itself.

Upload of event's photos/videos to an event album, and in addition, details about the reminder messages displayed at the completion of an event Once the photo/video sharing reminder is received by the invitee or an event owner (who is also one of the photographers for the event), the following will occur (Note: for recurring events, all the below listed steps would remain the same for each event)—

As seen in FIG. 10A, on the 'Camera' application 1000a of the invitee's device, a thin, colored border frame 1002 and also the event's name 1004 and the invitee's photo/video upload preference ('Auto', 'Double-check' or 'Manual') 1006 would be constantly displayed for the duration of the event, including the 'Pre-event Duration' and the 'Post-event Duration'. This would act as a reminder for the photographer invitee that the event is currently going on and that they had previously agreed to share photos/videos for this event.

Here is an example of how the event's name 1004 and the invitee's photo/video upload preference 1006 would be displayed on the 'Camera' application—"John's Birthday (Upload→Auto)." Note: If the event's name is much longer than the allowed space, then just a part of the event's name would be displayed on the 'Camera' application along with '...' in the suffix.

Note: Once the event, including the post event duration, is complete, then that thin, colored border frame 1002 along with the event's name 1004 and the invitee's photo/video upload preference 1006 would be automatically removed from the 'Camera' application 1000*a* of the photographer invitee's device.

When an invitee takes any photos/videos using their device's camera application, then based on the upload preferences selected by the invitee ('Auto', 'Double-check' or 'Manual'), the following will occur—

Photo/Video upload preference—'Auto' 1006—All photos/videos taken by the invitee during the event, including the 'Pre-event Duration' and 'Post-event Duration', will be instantly uploaded to the event's centralized photo/video album.

Note: Only the photos/videos that were taken using 'Camera' application of invitee's device will be automatically considered for upload to the event's photo/video album. However, if there were other photos/videos that were saved to device's photo library via another application, then they would not be considered for automatic upload to the event's photo/video album.

Even though an invitee's photo/video upload preference might have been 'auto' 1006, please note that they can still go directly to the event's shared photo/video album 1400 and upload any additional photos/videos manually. This will provide invitee an opportunity to even upload those photos/videos that were initially saved to their device's photo library by possibly a third-party application existing on their device.

An invitee would also get an option to upload any photos/videos that were taken by a different operating-system device or even a traditional camera by using one of the following methods—

Method 1: An invitee can first copy other devices' photos/videos on their operating system supported device, and then manually upload them to the event's shared photo/video album. (note: copying the photos/videos from an unsupported device to a supported device would be done by the invitees using their own tools.)

Method 2: An invitee can install an app or client software on their unsupported (different operating system) devices, which would allow them to upload any photos/videos existing on their unsupported devices to the shared photo/video album of the supported operating system device. (Note: only the photographer invitee that has an account with the proprietary operating system device would be able to authenticate and connect with the shared photo/video album, and upload their photos/videos using the app/client software.)

Note: An invitee must try to upload their manual photos/videos within the 'Manual Upload Duration' set by the event owner. By doing so, invitee's photos/videos will already be there on the event's centralized album when that album's notification/link is sent to the event guests. In case if the invitee isn't able to upload their photos/videos within the 'Manual Upload Duration', then they will still be allowed to upload those at a later time. However, since the 'Manual Upload Duration' is complete, an event owner might decide to go ahead and send the album notification/link to the event guests and anyone who views the album at that time might not see the photos/videos that weren't uploaded yet.

Photo/Video upload preference—'Double-check' 1008—As seen in FIG. 10B, for each photo/video taken by the invitee during the event, including the 'Pre-event Duration' and 'Post-event Duration', they will be prompted with a question 1010 to either upload or not to upload those photos/videos to the event's centralized photo/video album. (Note: Invitees will be prompted with the question after each photo/video is taken.)

If the invitee selects 'yes' 1012 to upload the photo/video, then it would be instantly uploaded to the event's photo/video album. If the invitee selects 'no' 1014 for uploading a photo/video, then no additional action would be taken for that photo/video rather than just storing it on the device's photo library i.e. that photo/video would not be uploaded to event's centralized photo/video album.

Note: Only the photos/videos that were taken using 'Camera' application of the invitee's device will be prompted for upload to the event's photo/video album. However, if there were other photos/videos that were saved to device's photo library via another application, then they would not be prompted for upload to the event's photo/video album.

Even though an invitee's photo/video upload preference might have been 'Double-check' 1008, please note that they can still go to the event's photo/video album 1400 and upload any additional photos/videos manually. This will provide invitee an opportunity to even upload those photos/videos that were initially saved to their device's photo library by possibly a third-party application existing on their device.

An invitee would also get an option to upload any photos/videos that were taken by a different operating-system device or even a traditional camera by using one of the following methods—

Method 1: An invitee can first copy other devices' photos/videos on their operating system supported device, and then manually upload them to the event's shared photo/video album. (note: copying the photos/videos from an unsupported device to a supported device would be done by the invitees using their own tools.)

Method 2: An invitee can install an app or client software on their unsupported (different operating system) devices, which would allow them to upload any photos/videos existing on their unsupported devices to the shared photo/video album of the supported operating system device. (Note: only the photographer invitee that has an account with the proprietary operating system device would be able to authenticate and connect with the shared photo/video album, and upload their photos/videos using the app/client software.)

Note: An invitee must try to upload their manual photos/videos within the 'Manual Upload Duration' set by the event owner. By doing so, invitee's photos/videos will already be there on the event's centralized photo/video album when that album's notification/link is sent to the event guests. In case if the invitee isn't able to upload their photos/videos within the 'Manual Upload Duration', then they will still be allowed to upload those at a later time. However, since the 'Manual Upload Duration' is complete, an event owner might decide to go ahead and send the album notification/link to the event guests and anyone who views the album at that time might not see the photos/videos that weren't uploaded yet.

Photo/Video upload preference—'Manual' 1016—As seen in FIG. 10C, when invitee's photo/video upload preference is 'Manual' 1016, it means that the invitee doesn't wish to automatically/instantly upload their photos/videos that are taken during the event, including the 'Pre-event Duration' and 'Post-event Duration', to the event's photo/video album. Rather, the invitee agrees to manually select and upload photos/videos to the event's centralized photo/video album 1400 sometime before the 'Manual Upload Duration' is complete for the event.

When 'Manual' option is selected for 'Photo/Video Upload preference', it provides the following—Gives invitee an opportunity to even upload those photos/videos that were initially saved to their device's photo library by possibly a third-party application existing on their device.

An invitee would also get an option to upload any photos/videos that were taken by a different operating-system device or even a traditional camera by using one of the following methods—

Method 1: An invitee can first copy other devices' photos/videos on their operating system supported device, and then manually upload them to the event's shared photo/video album. (note: copying the photos/videos from an unsupported device to a supported device would be done by the invitees using their own tools.)

Method 2: An invitee can install an app or client software on their unsupported (different operating system) devices, which would allow them to upload any photos/videos existing on their unsupported devices to the shared photo/video album of the supported operating system device. (Note: only the photographer invitee that has an account with the proprietary operating system device would be able to authenticate and connect with the shared photo/video album, and upload their photos/videos using the app/client software.)

Note: An invitee must try to upload their manual photos/videos within the 'Manual Upload Duration' set by the event owner. By doing so, invitee's photos/videos will already be there on the event's photo/video album when that album's notification/link is sent to the event guests. In case if the invitee isn't able to upload their photos/videos within the 'Manual Upload Duration', then they will still be allowed to upload those at a later time. However, since the 'Manual Upload Duration' is complete, an event owner might decide to go ahead and send the album notification/link to the event guests and anyone who views the album at that time might not see the photos/videos that weren't uploaded yet.

Suppose that a photographer invitee wants to fix/edit the photos/videos that they took during an event, then in this situation, depending upon the photographer invitee's earlier selection on the 'Upload Preference' field 708, the following options would be available—

If the photographer invitee had previously selected 'Auto' on the 'Upload Preference' field 708, then they would have the following options—Since the photos/videos are automatically uploaded under the 'Auto' selection, photographer invitee wouldn't get an opportunity to fix/edit the photos/videos before they are uploaded on the event album. However, once the photos/videos are uploaded on the event album, a photographer invitee would be able to go directly to the event album and make any fixes/edits and save the changes.

If the photographer invitee had previously selected 'Double-check' on the 'Upload Preference' field 708, then they would have the following options—Similar to the 'Auto' selection, a 'Double-check' selection also wouldn't allow a photographer invitee to make any fixes/edits to the photos/videos before those are uploaded to the event's album (Note: the only exception is that if the photographer invitee chooses not to upload a particular photo/video immediately, then they would be able to make fixes/edits on such photo/video, and thereafter, manually upload it to the event album.)

On the other hand, once the photos/videos are uploaded on the event album, a photographer invitee would be able to go directly to the event album and make any fixes/edits and save the changes.

If the photographer invitee had previously selected 'Manual' on the 'Upload Preference' field 708, then they would have the following options—Under the 'Manual' selection, a photographer invitee would get an opportunity to make any fixes/edits both before and after the photos/videos are uploaded to the event's album i.e. before uploading the photos/videos, a photographer invitee would be able to make any fixes/edits on those photos/videos in their local photo library, and also once they are uploaded on the event's album, a photographer invitee would still be able to go directly to the event album and make any fixes/edits and save the changes.

Either during an event or after an event is complete, if a photographer invitee wanted to delete a photo/video that they previously uploaded on the event's centralized photo/video album, then they would be able to do so as long as the following conditions are met—Photographer invitee must still have the permission to view, add or delete photos/videos from the event's centralized photo/video album i.e. either the event owner or the invitee themselves must not have removed the invitee's photo/video sharing permissions for the event.

A regular photographer invitee would only be able to delete those photos/videos that they themselves uploaded previously on the event's photo/video album. Note: In case of an event owner (who is also one of the photographers for the event), they would be able to delete any photos/videos, either uploaded by them or by others, at any time as long as the event's photo/video album exists.

Once an event, including its 'Post-event Duration', is complete, then the following reminder message would be displayed to the photographer invitees depending upon the value 226 set for the 'Manual Upload Duration' field 214 by the event owner. (Note: An event owner would also be displayed with a similar message since they are also one of the event's mandatory photographers)—

As seen in FIG. 11, as long as the 'Manual Upload Duration' field was set to a value greater than 0 hours on the event's calendar invite, then the following reminder message 1102 would be sent to the photographer invitees at the completion of the 'Post-event Duration' of an event—"Event—[EventName] has completed. Manual Upload Duration for this event has been set to [ManualUploadDurationHours] hours, so you can manually upload any remaining photos/videos to the event's album during this time. Thanks for sharing your photos/videos for the event." (Note: [EventName] would be replaced with the actual name of the event and [ManualUploadDurationHours] would be replaced with the value that was set on the 'Manual Upload Duration' field of the event's calendar invite.)

If the 'Manual Upload Duration' field was set to 0 hours on the event's calendar invite, then rather than sending the above reminder, the following reminder message would be sent to the photographer invitees at the completion of the 'Post-event Duration' of an event—"Event—[EventName] has completed. For your reference, there is no 'Manual Upload Duration' time set for this event. Thanks for sharing your photos/videos." (Note: [EventName] would be replaced with the actual name of the event)

If the 'Manual Upload Duration' field 214 was set to a value 226 greater than 0 hours on the event's calendar invite, then the following message would also be sent to the photographer invitees at the completion of such 'Manual Upload Duration'. (Note: An event owner would also be displayed with a similar message since they are also one of the event's mandatory photographers)—

As seen in FIG. 12, the following reminder message 1202 would be sent to the photographer invitees at the completion of the 'Manual Upload Duration' of an event—"'Manual Upload Duration' of the event—[EventName] has completed. Thanks for sharing your photos/videos for the event." (Note: [EventName] would be replaced with the actual name of the event.)

Note: In case if the 'Manual Upload Duration' field was set to 0 hours on the event's calendar invite, then a message would have already been sent to the photographer invitees previously that the event has completed, so there would be no need to send an additional message (like the one mentioned above) again.

Sharing of an Event Album with the Invitees after an Event is Complete

Once an event, including its 'Post-event Duration' and the 'Manual Upload Duration' is complete, then depending upon the event owner's selection of either 'Auto', 'Manual' or 'Off' on the event invite's "Share Album after Event" field 404, the following would occur—

If 'Auto' 414 was selected on the 'Share Album after Event' field 404, the following would occur—When the event's total duration including the 'Post-event Duration' and the 'Manual Upload Duration' is complete, then the invitees selected 416 by the event owner in the 'Share Album With' field 408 would automatically receive a notification about the event's centralized photo/video album i.e. as seen in FIG. 13A, selected invitees that use the same operating system as the event owner would be directly sent the album sharing notification on their devices. On the other hand, as seen in FIG. 13B, selected invitees that don't use the same operating system as the event owner would be sent the album link via an email. Here are the details—

If the invitee has a device with the same operating system as the event owner, then the following would occur—They would automatically receive a request 1302 after the 'Manual Upload Duration' that the event owner would like to share [EventName] photo/video album with them. If the guest selects 'Accept' 1304 for the request, then they would be able to view the event album, and depending upon the permissions granted by the event owner, they might even be able to add any additional photos/videos to that album. However, if the guest selects 'Decline' 1306, then they wouldn't get access to the event's album.

Note: When the album is about to be shared with the invitees, at that time if there were any photographer invitees that already had the photo/video sharing request accepted, then those photographer invitees would not receive the event's album sharing request again. This is because the event photographers anyways would have access to the event's photo/video album, and therefore, do not need to be notified again. (In other words, when the album is about to be shared with the invitees, only those invitees that don't have the photo/video sharing request accepted at that time would receive the event's album sharing request.)

If the invitee has a device with a different operating system than the event owner, then the following would occur—Invitees would automatically receive an email 1300b after the 'Manual Upload Duration' that the event owner would like to share [EventName] photo/video album with them.

When the invitees click on the album link in the email, they would be able to view the event's photo/video album in the browser, but they would not be able to add any additional photos/videos or comments to that album until they login using the proprietary operating system's account. Any of those updates would be automatically published to all participants of the shared event album.)

Note: In case if there were no photos/videos in the event's centralized album at the end of the event, the album would still be shared automatically with the recipients either via the device or via an email, and that would depend upon their recipients' device operating system.

As seen in FIG. 13B, when an event album link is shared via email, all recipients' email addresses would be put in the bcc section of the email such that one recipient isn't able to view another recipient's email address.

Note: Even though 'Auto' might be selected on the 'Share Album after Event' field, an event owner would still be able to do the following—As seen in FIG. 4C, an event owner would be able to manually share the album directly with 'All Guests' or just the 'Event Attendees' using the 'Share Album Now' button 420 available on the 'Share Event Album' screen 400c of the event's calendar invite. Note: 'Share Album Now' button 420 would be enabled/visible on the screen only once the 'Manual Upload Duration' is complete for an event. In addition, this button is available only when 'Auto' or 'Manual' is selected on the 'Share Album after Event' field on the 'Share Event Album' screen.

As seen in FIG. 15A, an event owner would also be able to manually share 1514 the album individually with any people that they want and at any time, regardless if that person is an event invitee or not, by using the options available on the event album's properties/settings screen 1500a. (Note: this feature of being able to manually sharing an event album with any individuals would be available regardless if 'Auto', 'Manual' or 'Off' is selected on the 'Share Album after Event' field on the 'Share Event Album' screen. More details about this feature is provided in the below sections as it's mainly used when 'Manual' or 'Off' might be selected on the 'Share Album after Event' field.)

If 'Manual' was selected on the 'Share Album after Event' field 404, the following would occur—When the event's total duration including the 'Post-event Duration' and the 'Manual Upload Duration' is complete, then the event owner would be informed that they can go ahead and review (edit/delete) the event's photos/videos and can also manually share the event album with people that they want.

An event owner would be able to manually share the album directly with 'All Guests' or just the 'Event Attendees' using the 'Share Album Now' button 420 available on the 'Share Event Album' screen of the event's calendar invite. Note: 'Share Album Now' button would be enabled/visible on the screen only once the 'Manual Upload Duration' is complete for an event.

As seen in FIG. 15A, an event owner would also be able to manually share 1514 the album individually with any people that they want and at any time, regardless if that person is an event invitee or not, by using the options available on the event album's properties/settings screen 1500a.

Note: 'Share Album Now' button would be enabled on the 'Share Event Album' screen only when 'Manual' or 'Auto' was selected on the 'Share Album after Event' field. This 'Share Album Now' button would provide an easy option for the event owner to share the event album with either 'All guests' or just the 'Event attendees'.

As mentioned above, when 'Manual' is selected for the 'Share Album after Event' field, an event owner would still be able to go to the event's photo/video album and do the following using the options available on the album's properties/settings screen—

As seen in FIG. 15A-15B, using the options available on an event album 1504, 1520, an event owner would be able to share the album with any individuals that have the same proprietary operating system on their devices as the event owner's device (Note: such individuals also don't need to be an event invitee to be shared the album with them). Here is what would occur in this situation—

Album recipient invitees would receive a request that the event owner would like to share [EventName] photo/video album with them. If the invitee accepts the request, then they would be able to view the event album, and depending upon the permissions granted by the event owner, they might even be able to add any additional photos/videos to that album.

Note: When the album is about to be shared with the invitees, at that time if there were any photographer invitees that already had the photo/video sharing request accepted, then those photographer invitees would not receive the event's album sharing request again. This is because the event photographers anyways would have access to the event's photo/video album, and therefore, do not need to be notified again. (In other words, when the album is about to be shared with the invitees, only those invitees that don't have the photo/video sharing request accepted at that time would receive the event's album sharing request.)

Note: Even if there were no photos/videos in the event's album, the album would still be shared with the recipients that have the same operating system. (This is allowed because even though there are currently no photos/videos on the album, an event owner might have planned to add photos/videos later or the recipients themselves might want to add some new photos/videos to that album.)

As seen in FIG. 15A, using the options available on an event album, an event owner would also be able to send the album link via email 1514 (either in advance or after the event is complete) to anyone that doesn't have the same proprietary operating system on their devices as the event owner's device. Here is what will happen when the album link is shared with any individuals—

Album recipient invitees would receive an email that the event owner would like to share the [EventName] photo/video album link with them.

When the invitees click on the album link in the email, they would be able to view the event's photo/video album in the browser, but they wouldn't be able to add any additional photos/videos or comments on that album until they login using the proprietary operating system's account.)

Note: even if there were no photos/videos in the event's album, it would not restrict the event owner to be able to send the album link via email and also won't restrict the recipient to pull up the blank album. This is allowed because the event owner might want to send the album link in advance and later upload the photos.

As seen in FIG. 15A and FIG. 13B, when an event album's website link is shared via email 1514, all recipients' email addresses would be put in the bcc section of the email 1300b such that one recipient isn't able to view another recipient's email address.

If 'Off' 406 was selected on the 'Share Album after Event' field 404, the following would occur—It would mean that the event owner doesn't intend to share the event's photo/video album with any of the guests after an event is complete. Therefore, once an event is complete, including its 'post event duration' and the 'Manual Upload Duration', then the event owner would just be informed that all event's photos/videos have been uploaded to the event's album. However, they would not be asked to either review those photos/videos or to share the event album with any of the guests. As seen in FIG. 4A, in this case, 'Share Album Now' button wouldn't be enabled since 'Off' was selected for the 'Share Album after Event' field.

Note: Even though 'Off' might be selected for the 'Share Album after Event' field, an event owner can still go directly to the event's photo/video album 1400 at any time and either review (edit/delete) photos/videos or share the album with anyone using the options available on the album's properties/settings screen 1500a, 1500b. (In short, this feature would be available regardless if an event owner selects 'Auto', 'Manual' or 'Off' for the 'Share Album after Event' field.)

Depending upon whether the album recipients, with whom the album was shared, have the same operating system on their devices as the event owner's device or not, the following would occur—

As seen in FIG. 15A-15B, using the options available on an event album 1504, 1520, an event owner would be able to share the album with any individuals that have the same proprietary operating system on their devices as the event owner's device (Note: such individuals also don't need to be an event invitee to be shared the album with them). Here is what would occur in this situation—

Album recipient invitees would receive a request that the event owner would like to share [EventName] photo/video album with them. If the invitee accepts the request, then they would be able to view the event album, and depending upon the permissions granted by the event owner, they might even be able to add any additional photos/videos to that album.

Note: When the album is about to be shared with the invitees, at that time if there were any photographer invitees that already had the photo/video sharing request accepted, then those photographer invitees would not receive the event's album sharing request again. This is because the event photographers anyways would have access to the event's photo/video album, and therefore, do not need to be notified again. (In other words, when the album is about to be shared with the invitees, only those invitees that don't have the photo/video sharing request accepted at that time would receive the event's album sharing request.)

Note: Even if there were no photos/videos in the event's album, the album would still be shared with the recipients that have the same operating system. (This is allowed because even though there are currently no photos/videos on the album, an event owner might have planned to add photos/videos later or the recipients themselves might want to add some new photos/videos to that album.)

As seen in FIG. 15A, using the options available on an event album, an event owner would also be able to send the album link via email 1514 (either in advance or after the event is complete) to anyone that doesn't have the same proprietary operating system on their devices as the event owner's device. Here is what will happen when the album link is shared with any individuals—

Album recipient invitees would receive an email that the event owner would like to share the [EventName] photo/video album link with them. When the invitees click on the album link in the email, they would be able to view the event's photo/video album in the browser, but they wouldn't be able to add any additional photos/videos or comments on that album until they login using the proprietary operating system's account.)

Note: even if there were no photos/videos in the event's album, it would not restrict the event owner to be able to send the album link via email and also won't restrict the recipient to pull up the blank album. This is allowed because the event owner might want to send the album link in advance and later upload the photos.

As seen in FIG. 15A and FIG. 13B, when an event album's website link is shared via email 1514, all recipients' email addresses would be put in the bcc section of the email such that one recipient isn't able to view another recipient's email address.

Regardless if the event owner had 'Auto', 'Manual' or 'Off' selected on the 'Share Album after Event' field 404, when the album is actually shared (using the automated album sharing, or using the 'Share Album Now' option available on the calendar event, or the sharing options available on the album settings screen), the following scenarios could potentially take place—

When sharing an event album, depending upon whether the recipients are already on the event album's participant list or not, the following would occur—If the new album recipient didn't exist previously on the event album's participant list, then the following would occur—

Album recipients that don't currently exist on an even album's participant list, however use same operating system on their device as the event owner's device, those people would be added as regular album participant on the event album's participant list 1532, and would receive an album sharing message directly on their devices.

Album recipients that don't currently exist on an even album's participant list and also don't have same operating system on their devices as the event owner's device, those people would be sent the album's browser website link via email 1300b in order to share that album with those album recipients.

If the new album recipient already existed on the event album's participant list, then the following would occur—

| New album recipient already exists on the event album as - | New album recipient's previous/last response for event album subscribe | Action to take when the same participant is requested to be added again as regular album participant |
|---|---|---|
| Photographer Album Participant | Yes | Don't add them again and let the event owner know that the participant already has access to event album |
| Photographer Album Participant | No | Add them again on the event album, however, this time as a regular album participant (So, there would be two entries for that individual on the album's participant list, one as a photographer album participant and another as a regular album participant) |
| Photographer Album Participant | No Response | Add them again on the event album, however, this time as a regular album participant (So, there would be two entries for that individual on the album's participant list, one as a photographer album participant and another as a regular album participant) |
| Regular Album Participant | Yes | Don't add them again and let the event owner know that the participant already has access to event album |
| Regular Album Participant | No | Change the album participant's last subscribe response to blank and inform the participant to respond again. |
| Regular Album Participant | No Response | Change the album participant's last subscribe response to blank and inform the participant to respond again. |

Potential Scenarios that can Take Place if an Event Owner Decides to Modify Some Settings of an Event Invite or an Associated Event Album Once an event owner sets up the initial event invite, they might later decide to modify some settings. Here are some of those potential scenarios that can take place (Note: Most of the scenarios and their outcomes mentioned below would also apply to the recurring events, however, at the end of this section, specific recurring event scenarios, especially those without an associated album initially, would be discussed since they are handled a little differently)—

An event's photo/video album is created if an event owner, while setting up the event invite, selects 'Yes' on the 'Request Photos/Videos' field on the 'Event Photos/Videos' screen, and thereafter, saves the event. However, an event owner might later decide to change the 'Request Photos/Videos' field to 'No' on the 'Event Photos/Videos' screen before the event ends, including its Post-event Duration' and the 'Manual Upload Duration'. In this situation, the following would occur—

An event owner will be allowed to change the value for 'Request Photos/Videos' field by editing the calendar event. However, keep in mind that any changes will only take effect when the event owner saves (selects 'Done') the entire event. In this case, the event's photo/video album would still continue to remain/exist. As long as the associated event album still exists, the 'Go to Event Album' button would also continue to be available at the bottom of the 'Event Photos/Videos' screen for the event owner.

In this situation, an event owner would still continue to have full access over the event's photo/video album to either view, add, or delete any of the photos/videos. However, an event owner would no longer have access to auto upload any photos/videos to the event album i.e. they would only be able to upload any photos/videos to the event album manually.

All invitees that were previously assigned as the photographers for the event, excluding the event owner, would receive the following notification—"Event owner is no longer requesting photos/videos for the event—[EventName]. Hence, you would lose your permission to view or upload any photos/videos to the event's album."

All invitees that were previously assigned as the photographers for the event, excluding the event owner, would no longer remain on the photographer list of the event. In addition, those photographer invitees would also lose their access to the event's album i.e. they would no longer remain on the event album's participant list.

All invitees that were previously assigned as the photographers for the event, excluding the event owner, would no longer see the 'Share Event Photos/Videos' option on the main screen of their calendar invite for the event.

If this change was made while the event was going on, then any photo/video upload or sharing related functions (like border frame on camera application, event's name and photographer invitee's upload preference on camera application, alerts for start of 'Manual Upload Duration', etc) would no longer be active/enabled for the photographer invitees.

Note: even though the previously assigned photographer invitees would be deleted from the photographer list of the event, however, such invitees would still continue to remain on the event's invitee list.

For an event owner, the 'Share Event Album' option and its sub-options would be disabled (grayed out) on the main screen of the calendar invite. However, note that an event owner would still be able to go directly to the event album's settings screen and manually share the album with anyone that they want.

Suppose that an event owner, while setting up the event invite, selects the invitees that they wish to be the photographers (share photos/videos) for the event. However, an event owner might later decide to add some more invitees as photographers as long as the event, including its 'post event duration' and the 'Manual Upload Duration' isn't over. In this situation, the following will occur—

An event owner will be allowed to add new photographers to the event invite by editing the calendar event. However, keep in mind that any changes will only take effect when the event owner saves (selects 'Done') the entire event.

In order to add a photographer, an event owner would first go to the 'Assign Photographers' screen by clicking on the 'Assign Photographers' option on the 'Event Photos/Videos' screen. Thereafter, the event owner would click on the 'Add' button to assign a new photographer for the event.

Newly added photographers will receive a notification to either accept or decline the event's photo/video sharing request. Just like the photographers that were initially added while setting up the event invite, the newly added photographers will also be treated in the same manner.

Newly assigned photographer invitee would be added to the 'Assign Photographers' screen, which is visible to the event owner. In addition, the newly assigned photographer invitee would also be added to the 'Assigned Photographers' screen, which is visible to the other active photographer invitees of an event. In addition, an indicator next to the photographer invitee's name would indicate if the photographer invitee accepted, declined or hasn't yet responded to the photo/video sharing invitation.

If the event owner went to the event album and looked for the participants with whom the event album has been shared, then all the photographer invitees (both old and new) would be displayed in bold and would also have (P) next to their name in the suffix. This will make it easy to identify which people have been pre-assigned as the photographers for the event as compared to the regular participants of an album. In addition, an indicator next to the photographer invitee's name would indicate if the photographer invitee accepted, declined or hasn't yet responded to the photo/video sharing invitation.

An event owner as well as the existing photographers would continue to maintain their permissions to the event album as they previously did before adding the new photographers. If the new photographer being added already existed on the event's photographer list, then that person would not be added twice on the list. Also, no new notification would be sent out to such photographer invitees that already existed on the list previously.

Suppose that the new photographer being added doesn't exist on the event's photographer list but they already exist on the event album's participant list as a regular participant (probably the event owner had previously shared the event album with them), then in that case the photographer being added wouldn't be added twice on the album's participant list. Instead, the photographer invitee would first be removed of their regular album participant role from the event album, and then for their photographer participant role, a new record would be added to the event album's participant list in bold and with (P) next to the name in suffix. In addition, the photographer invitee would also be added on the photographer list of the calendar event. (Note: Initially, a blank circle indicator would be displayed next to the photographer invitee's name on the event album participant list as well as the calendar event's photographer list in order to indicate that they haven't yet responded to the event's photo/video sharing request.)

Added photographer invitees would now have the 'Share Event Photos/Videos' option/sub-options available on their event's calendar invite. Any of the previous selections made on the 'Share Event Album' screen would remain the same unless and until an event owner updates any of those previous selections for 'Request Photos/Videos' field on the 'Event Photos/Videos' screen.

Suppose that an event owner, while setting up the event invite, selects the invitees that they wish to be the photographers (share photos/videos) for the event. However, an event owner might later decide to delete some invitees/photographers before the event ends, including its 'Post-event Duration' and the 'Manual Upload Duration'. In this situation, the following will occur—

An event owner will be allowed to delete any photographers from the event invite by editing the calendar event. However, keep in mind that any changes will only take effect when the event owner saves (selects 'Done') the entire event. (Note: An exception is that even though an event owner is also one of the photographers, they can never delete themselves from the photographer list of an event.)

In order to delete a photographer, an event owner would first go to the 'Assign Photographers' screen by clicking on the 'Assign Photographers' option on the 'Event Photos/Videos' screen. Thereafter, the event owner would click on the photographer's name on the 'Assign Photographers' screen, which would open a new screen named 'Photographer Info'. On this new screen, the following button (Remove Photographer') would be available at the bottom of that screen. If an event owner clicks the 'Remove Photographer' button on the 'Photographer Info' screen, then regardless of the photographer invitee's current response for the photo/video sharing request, the following would occur—

Deleted photographer invitee would no longer remain on the photographer list of the event's calendar invite i.e. the deleted photographer invitee would be removed from the 'Assign Photographers' screen, which is visible to the event owner. In addition, the deleted photographer invitee would also be removed from the 'Assigned Photographers' screen, which is visible to the other active photographer invitees of an event.

Regardless of the deleted photographer invitee's previous response (Accepted, Declined, No Response) for photo/video sharing request for the event, they would be removed from the participant list of the event album. In other words, photographer invitee would lose their access to view, add, or delete any photo/videos on the event's album. A notification would be sent to the deleted photographer invitee that the event owner has removed their photographer (photo/video sharing) permissions for the event—[EventName].

Deleted photographer invitee would no longer see the 'Share Event Photos/Videos' option or any of its sub-options on their calendar invite. Note: Any deleted photographer invitees would still remain on the event's invitee list as regular event invitees. Note: An event owner as well as the photographer invitees, who weren't deleted, would continue to maintain their permissions/access to the event album as they previously did before any of the recent deletions of the photographer invitees. Note: Any of the previous selections made on the 'Share Event Album' screen would remain the same unless and until an event owner updates any of those previous selections.

Suppose that an event owner, while setting up the event invite and requesting photos/videos from certain invitees, selects their preferred values for 'Pre-event Duration,' Post-event Duration' and 'Manual Upload Duration' on the 'Event Photos/Videos' screen. However, the event owner later decides to edit the event and change either all or some of the above mentioned fields before an event ends, including its 'Post-event Duration' and the 'Manual Upload Duration'. In any of those scenarios, the following would occur—

Event owner will be allowed to change the values for 'Pre-event Duration,' Post-event Duration' as well as the 'Manual Upload Duration' by editing the calendar event. However, keep in mind that any changes would only take effect when an event owner saves (selects 'Done') the entire event. Therefore, if an event owner tries to save their changes for any of the 'Pre-event Duration,' Post-event Duration' or 'Manual Upload Duration' fields, then they would be prompted with the following message along with the 'Yes', 'No' buttons (Note: Even if an event owner makes multiple changes on the 'Event Photos/Videos' screen, still only a single message prompt would be displayed to the event owner, either aggregated for all changes or just the message associated with the highest priority change would be displayed.)—"Since there were changes to the photo/video sharing request, all photographer invitees would be required to re-accept the photo/video sharing request. Are you sure you would like to proceed with these changes?"

If the event owner selects 'Yes' to proceed with the photo/video sharing request changes, Any values that were changed for 'Pre-event Duration', 'Post-event Duration' or 'Manual Upload Duration' would be applied on the event. Event's photo/video album would continue to remain/exist.

All photographer invitees, who had previously accepted to share their photos/videos for the event, would no longer have access to view, add, edit, or delete any photos/videos on the event's album i.e. the photographer invitees, who had previously accepted photo/video sharing, would still remain on the event album's participant list, but their photo/video sharing response would be automatically changed to 'No Response' on both the event album as well as the calendar event. Those photographer invitees would also receive the following notification—"For the event—[EventName], event owner has modified the photo/video sharing request. Please re-accept this request, so you can continue to share your photos/videos for the event." Right below the notification, there would be a button that would take the photographer invitees directly to the 'Share Event Photos/Videos' screen to be able to review the changes, and accept or decline the photos/videos sharing request. (Note: If the photographer invitee receives the change notification right at the time when they were in middle of uploading some photo/video, then at least that photo/video would be uploaded to the event's centralized photo/video album before the photographer invitee's access is revoked from the event album.)

If the above mentioned change was made by the event owner while the event was going on, then any photo/video upload or sharing related functions (for example: border frame on camera application, event's name and photographer invitee's upload preference on camera application, alerts for start of 'Manual Upload Duration', etc) would no longer be active/enabled for the photographer invitees.

Upon going to the 'Share Event Photos/Videos' screen, photographer invitees would find that they need to reselect 'Yes' or 'No' to indicate their current photo/video sharing preference. Note: Until the photographer invitees, excluding the event owner, reselect 'Yes' for the photo/video sharing request, they would no longer be allowed to view, add, edit or delete any photo/videos on the shared event album even if they used to have those permissions earlier. Also, the 'Go to Event Album' button at the bottom of the 'Share Event Photos/Videos' screen would no longer be enabled for the photographer invitee unless and until they reselect 'Yes' for the photo/video sharing request and save the event.

Note: If the photographer invitee reselects 'Yes' for their photo/video sharing preference, then they also would need to reselect their photo/video upload preference for the event. In case if they don't, then the default selection/value for photo/video upload preference would be applied. Note: If a photographer invitee doesn't reselect 'Yes' or 'No' for the photo/video sharing request, then they would continue to no longer have view, add, edit or delete permissions for the event's photo/video album.

Even when any of the above mentioned changes are made, an event owner would still continue to maintain full access over the event's shared album to either view, add, edit or delete any photos/videos. (Note: An event owner would also continue to maintain their photographer status for the event and would not be prompted with any messages for re-accepting the photo/video sharing request due to any changes.) Any of the previous selections made on 'Share Event Album' screen by an event owner would remain the same unless and until an event owner updates any of their previous selections.

Note: It's possible that an event owner might mistakenly select such a value for 'Pre-event Duration', 'Post-event Duration' or 'Manual Upload Duration' that might have already occurred in the past i.e. no longer valid for the current event. In that case, only the fields/values that are still valid as well as their associated notifications would be considered/applied by the system. However, any invalid fields or their associated notifications would just be ignored.

If the event owner selects 'No' for proceeding with the photo/video sharing request changes, Any values that were changed for 'Pre-event Duration', 'Post-event Duration' or 'Manual Upload Duration' would not be changed i.e. remain same as earlier. Neither any notifications nor any permission changes or screen changes would be made.

Suppose that an event owner, while setting up the event invite and requesting photos/videos from other invitees, also makes their own selection for their personal photos/videos upload preference on the 'Owner's Upload Preference' field, which is available on the 'Event Photos/Videos' screen. Note: This "Owner's Upload Preference" field just applies to the event owner and not all photographer invitees. An event owner can select either 'Auto', 'Double-check' or 'Manual' as their personal photo/video upload preference. However, if the event owner later decides to change their previously selected photos/videos upload preference before an event ends, including its 'Post-event Duration' and the 'Manual Upload Duration', then the following would occur—Event owner will be allowed to change the value for 'Owner's Upload Preference' field by editing the calendar event. However, keep in mind that any changes will only take effect when the event owner saves (selects 'Done') the entire event. The event's photo/video album would still continue to remain/exist. An event owner would also continue to maintain full access over that event's album to either view, add, edit or delete any photos/videos.

During the event, including its 'Pre-event Duration' and the 'Post-event Duration', the 'Camera' application of the event owner's device would display a thin, colored border frame, and in addition, it would also display the event's name and the invitee's latest photo/video upload preference ('Auto', 'Double-check' or 'Manual').

Any change to the 'Owner's Upload Preference' field would only be applicable to the future photos/videos taken by the event owner and that too just during the event, including its 'Pre-event Duration' and the 'Post-event Duration'.

Depending upon the selection made on the 'Owner's Upload Preference' field (either 'Auto', 'Double-check' or 'Manual), here is a quick summary of what will happen—

'Auto'—When 'Auto' is selected, All photos/videos taken using the 'Camera' application of the event owner's device during the event, including the 'Pre-event Duration' and 'Post-event Duration', will be instantly uploaded to the event's photo/video album.

'Double-check'—When 'Double-check' option is selected, After each photo or video is taken using the 'Camera' application of the event owner's device during the event, including its 'Pre-event Duration' and 'Post-event Duration', then the event owner will be prompted with a question to either upload or not to upload those photos/videos to the event's centralized album.

If the event owner selects 'yes' to upload the photo/video, then it would be instantly uploaded to the event's photo/video album. If the event owner selects 'no' for uploading a photo/video, then no additional action would be taken for that photo/video rather than just storing it on the device's photo library i.e. that photo/video would not be uploaded to event's centralized album.

'Manual'—When 'Manual' is selected, An event owner agrees to manually select and upload photos/videos to the event's centralized album. In other words, rather than automatically/instantly uploading their photos/videos that are taken during the event, an event owner prefers to manually upload those photos/videos.

By selecting this 'Manual' option, an event owner takes the responsibility to try and upload any photos/videos before the event's 'Manual Upload Duration' is complete. By doing so, an event owner's photos/videos would already be there on the event's album when that album notification is sent to the event guests. Note: In case if the event owner isn't able to upload their photos/videos within the 'Manual Upload Duration', then they would still be allowed to upload those at a later time. The only problem with that is if any guests try to view the album before the new photos/videos are uploaded, then they would not be able to view the new photos/videos.

Note: In case if the event owner changes their selection on the 'Owner's Upload Preference' field after the 'Post-event Duration' of the event, then any future photos/videos taken by the event owner will not be impacted by that change. In other words, only those photos/videos that were taken during the event, including its 'Pre-event Duration' and the 'Post-event Duration', fall under the rules for the 'Owner's Upload Preference', but since the 'Post-event Duration' is already complete, it would not matter.

When an event owner changes their selection for the 'Owner's Upload Preference' field, then the photographer invitees would not receive any notification related to those changes.

When an event owner changes their selection for the 'Owner's Upload Preference' field, all photographer invitees would continue to maintain their previous permissions on the event album as they did earlier. Note: Regardless of the new selection made on the 'Upload Preference' field, if the event owner takes any photos/videos that have size more than the allowed/set limit for cellular data upload (for example: 100 Mb), then those photos/videos would not be uploaded at that time. In such a situation, an event owner would need to later upload those photos/videos when their device is within the wifi range.

An event owner, while setting up the event invite, might have selected an initial value for the 'Share Album after Event' field, which is available on the 'Share Event Album' screen. However, an event owner might later decide to change the 'Share Album after Event' field to a different value before the event, including its 'Post-event Duration' and the 'Manual Upload Duration' ends. In this situation, the following would occur—

Event owner will be allowed to change the value for 'Share Album after Event' field by editing the calendar event. However, keep in mind that any changes would only take effect when the event owner saves (selects 'Done') the entire event.

Depending upon the new selection made on the 'Share Album after Event' field (either 'Auto', 'Manual' or 'Off'), here is a summary of what would happen (Note: this is just a quick summary of what would happen, so if you wish to get more details, please look at the section above that describes all the steps/actions associated with the selection of 'Auto', 'Manual' or 'Off' options)—

'Auto'—If 'Auto' is selected, It means that when the event's total duration including the 'Post-event Duration' as well as the 'Manual Upload Duration' is complete, then the invitees selected by the event owner in the 'Share Album With' field would automatically receive a notification about the event's centralized photo/video album i.e. the invitees that use the same operating system as the event owner would be directly sent the album sharing notification on their devices. On the other hand, invitees that don't use the same operating system as the event owner would be sent the album link via an email.

When 'Auto' is selected for the 'Share Album after Event' field, then the next field 'Share Album With' would automatically/immediately get enabled (without requiring save of the event) and allow the event owner to make their appropriate selection for the guests that must receive the event's photo/video album after the event is complete.

'Share Album Now' button wouldn't be enabled on the 'Share Event Album' screen before an event ends, including its 'Post-event Duration' and the 'Manual Upload Duration'. However, after the 'Manual Upload Duration' is complete for an event, the 'Share Album Now' button would be automatically enabled/visible at the bottom of the 'Share Event Album' screen.

'Manual'—If 'Manual' is selected, It means that when the event's total duration including the 'Post-event Duration' and the 'Manual Upload Duration' is complete, then the event owner would be informed that they can go ahead and review (edit/delete) the event's photos/videos and can also manually share the event album with people that they want. An event owner would be able to manually share the album directly with 'All Guests' or just the 'Event Attendees' using the 'Share Album Now' button available on the 'Share Event Album' screen of the event's calendar invite. Note: 'Share Album Now' button would be enabled/visible on the screen only once the 'Manual Upload Duration' is complete for an event. An event owner would also be able to manually share the album individually with any people that they want and at any time, regardless if that person is an event invitee or not, by using the options available on the event album's properties/settings screen.

When 'Manual' is selected on the 'Share Album after Event' field, then the next field 'Share Album With' would automatically/immediately get enabled (without requiring save of the event). This new field would allow the event owner to make their appropriate selection for the invitees that must receive the event's album when it's shared either automatically after the event or manually using the 'Share Album Now' button available on the 'Share Event Album' screen. (Note: 'Share Album Now' button is enabled on the screen only when 'Manual' or 'Auto' is selected on the 'Share Album after Event' field, and it provides an easy option for the event owner to share the event album with either 'All guests' or just the 'Event attendees'.)

'Share Album Now' button wouldn't be enabled on the 'Share Event Album' screen before an event ends, including its 'Post-event Duration' and the 'Manual Upload Duration'. However, after the 'Manual Upload Duration' is complete for an event, the 'Share Album Now' button would be automatically enabled/visible at the bottom of the 'Share Event Album' screen.

'Off'—If 'Off' is selected, It means that the event owner doesn't intend to share the event's photo/video album with any of the guests after an event is complete. Therefore, once an event is complete, including its 'post event duration' and the 'Manual Upload Duration', then the event owner would just be informed that all event's photos/videos have been uploaded to the event's album. However, they would not be asked to either review those photos/videos or to share the event album with any of the guests. When 'Off' is selected for the 'Share Album after Event' field, then the next field 'Share Album With' wouldn't be enabled i.e. wouldn't allow the event owner to make any advance selection for the guests with whom the photo/video album must be shared. 'Share Album Now' button at the bottom of the 'Share Event Album' screen also wouldn't be enabled either before or after the event.

Note: If an event owner makes a change on the 'Share Album after Event' field after the 'Manual Upload Duration' for that event has already ended, then those changes would still be saved, however only the future activities would be impacted with such a change i.e. if the event album was already shared automatically after an event had completed, and then if the event owner changes the 'Share Album after Event' field to 'Manual', then anything that's already occurred in past wouldn't be changed. However, in future, an event owner can click on the 'Share Album Now' button on the 'Share Event Album' screen and manually share their album with the selected event guests.

Any changes to 'Share Album after Event' field would not have any impact to the event owner's permissions for the event's photo/video album i.e. an event owner would continue to maintain full access over that event's album to either view, add, edit or delete any photos/videos.

'Go to Event Album' button would continue to be enabled/visible on the 'Share Event Album' screen as long as the associated event album exists i.e. for the 'go to Event Album' button to exist, it wouldn't matter if the event owner either selects 'Auto', 'Manual' or 'Off' on the 'Share Album after Event' field.

An event owner, while setting up the event invite, might have selected an initial value for the 'Share Album With' field, which is available on the 'Share Event Album' screen. However, an event owner might later decide to change that 'Share Album With' field to a different value before the event ends, including its 'Post-event Duration' and the 'Manual Upload Duration'. In this situation, the following would occur—Event owner will be allowed to change the value for 'Share Album With' field as long as the 'Share Album after Event' field on 'Share Event Album' has either 'Auto' or 'Manual' selected on it. However, any changes made by an event owner for the 'Share Album With' field would only take effect when the event owner saves (selects 'Done') the entire calendar event.

Depending upon the new selection made on the 'Share Album With' field (either 'Event Attendees' or 'All Guests'), here is a quick summary of what would happen—

'Event attendees'—If 'Event attendees' is selected, It means that the event owner prefers to share/send the event's album to those invitees that responded with either 'Accept' or 'Maybe' for the event invitation. Depending upon the selection on 'Share Album after Event' field, the following would occur related to the changes made on the 'Share Album With' field—

If 'Auto' was selected on the 'Share Album after Event' field, then once an event ends including its 'Manual Upload Duration', the event's album would be automatically shared/sent to all event attendees that responded with either 'Accept' or 'Maybe' for the event invitation. If 'Manual' was selected on the 'Share Album after Event' field, and thereafter once an event ends, if an event owner tries to manually share the event's album using the 'Share Album Now' button, then the event's album would be shared/sent to all event attendees that responded with either 'Accept' or 'Maybe' for the event invitation.

'All Guests'—If 'All Guests' is selected, it means that the event owner prefers to share/send the event's album to all invitees regardless of their invitation response. Depending upon the selection on 'Share Album after Event' field, the following would occur related to the changes made on the 'Share Album With' field—

If 'Auto' was selected on the 'Share Album after Event' field, then once the event ends including the 'Manual Upload Duration', the event's album would be automatically shared/sent to all guests regardless of their invitation response.

If 'Manual' was selected on the 'Share Album after Event' field, and thereafter once an event ends, if an event owner tries to manually share the event's album using the 'Share Album Now' button, then the event's album would be shared/sent to all guests regardless of their invitation response.

Any changes to 'Share Album With' field would not have any impact to the event owner's permissions for the event's photo/video album i.e. an event owner would continue to maintain full access over that event's album to either view, add, edit or delete any photos/videos.

Note: If an event owner makes a change on the 'Share Album With' field after the 'Manual Upload Duration' for that event has already ended, then those changes would still be saved, however only the future activities would be impacted with such a change i.e. if the event album was already shared automatically with 'Event Attendees' after an event had completed, and then if the event owner changes the 'Share Album With' field to 'All Guests', then anything that's already occurred in past wouldn't be changed. However, in future, if an event owner clicks on the 'Share Album Now' button on the 'Share Event Album' screen to manually share the event album, then in that case the album would be shared with 'All Guests'.

Suppose that an event owner decides to change their selection for 'Share Album With' field after the 'Manual Upload Duration' for the event has already ended, however without saving those changes, they immediately click on the 'Share Album Now' button. In this situation, the event's album would be shared with the guests that were just selected by an event owner on the 'Share Album With' field. To avoid any confusion, when an event owner makes such a change on 'Share Album With' field and without saving that change, if they click on 'Share Album Now' button, then they would be prompted with the following popup message along with 'Yes/No' buttons—"Are you sure you would like to share the event album with [LatestSelectionOnShareAlbumWithField]?" (Note: [LatestSelectionOnShareAlbumWithField] would be replaced with either 'All Guests' or 'Event Attendees' depending upon the latest selection on the 'Share Album With' field.)

If the event owner selects 'Yes' on the pop-up screen, then the event's album would be shared with the guests that were just selected on the 'Share Album With' field.

If the event owner selects 'No' on the pop-up screen, then no other action would be taken i.e. the event's album wouldn't be shared at this time.

Suppose that an event owner, while setting up the event invite, selects the invitees that they wish to be the photographer (share photos/videos) participants for the event. However, the event owner might later decide to go directly to an event album and add some more invitees as regular album participants before the event ends, including its 'Post-event Duration' and the 'Manual Upload Duration'. (Note: In order to add such regular album participants, an event owner would go to an album's settings screen and click on the 'Album Participants' field, which would open a new screen with the same title 'Album Participants'. On this new screen, an event owner would be able to click on the 'Add' button, which is available next to the 'Regular Album Participants' field in order to add the new regular album participants.)

An event owner will be allowed to add new regular album participants directly using the options available on the event album. Newly added regular album participants will receive a notification on their device to either accept or decline the event album's regular participant request.

Note: Both the regular album participant and the photographer album participant would be able to view, add, edit, or delete their photos/videos on an event album. However, note that the regular album participant wouldn't receive any photo/video sharing related reminders on their device, and they also wouldn't get an option to automatically upload their event's photos/videos to the event album i.e. they would need to manually upload any photos/videos that they wish to share on the event album. On the other hand, the photographer album participants would get the photo/video sharing related notifications for the event, and in addition, options would also be available to them in order to do an automatic or manual upload of event's photos/videos, etc.

As long as an event owner has granted permissions to all event album participants to be able to view, add, edit, or delete their photos/videos, then the newly added album participants would also be allowed to view, add, edit or delete photos/videos on the event album. (Note: either regular or photographer album participants can only delete those photos/videos that they might have themselves uploaded previously. In other words, with the exception of an event owner, all other album participants can't delete someone else's photos/videos on an event album.)

Note: Regular album participants, who are added directly via an event album and not assigned via a calendar invite as photographer album participants, wouldn't be highlighted in 'bold' and also wouldn't have (P) next to their name in suffix on the event album's participant list.

Note: Any of the regular album participants that are added directly via the options available on an event album don't necessarily have to be on the event's invitee list. However, any of the photographer album participants that are added via the calendar invite of an event have to be on that event's invitee list. In other words, an event owner can add any regular album participants directly using the options available on the even album as long as those participants have a device with similar operating system as the event owner themselves. On the other hand, an event owner wouldn't be able to add a photographer album participant using the options available on the event album, and would rather need to go to the calendar event to add any photographer invitees/photographer album participants. (Note: As a reminder to the event owner, the following text would be added below the 'Regular Album Participants—Add' field on the 'Album Participants' screen—"Note: If you wish to add 'Photographer Album Participants', then please go to the associated calendar event and assign the photographer invitees there.")

Note: If an event owner tries to add a regular album participant via the album settings/properties screen, however, if that participant already existed on the album's participant list earlier, then the following would occur—

| New album recipient already exists on the event album as - | New album recipient's previous/ last response for event album subscribe | Action to take when the same participant is requested to be added again as regular album participant |
| --- | --- | --- |
| Photographer Album Participant | Yes | Don't add them again and let the event owner know that the participant already has access to event album |
| Photographer Album Participant | No | Add them again on the event album, however, this time as a regular album participant (So, there would be two entries for that individual on the album's participant list, one as a photographer album participant and another as a regular album participant) |
| Photographer Album Participant | No Response | Add them again on the event album, however, this time as a regular album participant (So, there would be two entries for that individual on the album's participant list, one as a photographer album participant and another as a regular album participant) |
| Regular Album Participant | Yes | Don't add them again and let the event owner know that the participant already has access to event album |
| Regular Album Participant | No | Change the album participant's last subscribe response to blank and inform the participant to respond again. |
| Regular Album Participant | No Response | Change the album participant's last subscribe response to blank and inform the participant to respond again. |

Suppose that an event owner, while setting up the event invite, selects the invitees that they wish to be the photographers (share photos/videos) for the event. In addition, the event owner also goes directly to the event album and adds some more regular album participants to the event album. However, later if the event owner decides to delete some album participants/photographers directly from the options available on the event album before the event ends, including its 'Post-event Duration' and the 'Manual Upload Duration', then the following would occur—

An event owner will be allowed to delete any regular album participants or photographers directly from the options available on an event album. In other words, an event owner would go to the event album settings/properties screen and click on the 'Album Participants' field, which would open up a new screen with same title—'Album Participants'. On the new screen, an event owner would click on the photographer or the regular album participant's name that they wish to delete. This would open up the 'Participant Info' screen, which would have a 'Remove Album participant' button at the bottom of that screen, allowing the event owner to delete that participant from the event album. (Note: An exception is that even though an event owner is also one of the photographers, they can't remove themselves from the photographer list of an event or its associated album.)

Depending upon if an individual that was going to be deleted was a photographer album participant or a non-photographer (regular album participant), the following would occur—

If an individual to be deleted is a photographer album participant, who was previously assigned via a calendar event, then the following would occur—

Deleted photographer album participant would no longer remain on the photographer list of the event's calendar invite i.e. the deleted photographer album participant would be removed from the 'Assign Photographers' screen, which is visible to the event owner. In addition, the deleted photographer album participant would also be removed from the 'Assigned Photographers' screen, which is visible to the other active photographer invitees of an event.

Deleted photographer album participant would no longer receive any notifications or reminders related to being a photographer i.e. event's photo/video sharing.

Deleted photographer album participant would also no longer remain on the participant list of the event album. In other words, photographer invitee would lose their access to view, add, edit or delete any photo/videos on the event's album.

Deleted photographer album participant would no longer see the 'Share Event Photos/Videos' option on their event's calendar invite.

A notification would be sent to the deleted photographer album participant that the event owner has removed their photographer as well as the album participant permissions i.e. they would neither have photo/video sharing abilities for the event nor access to the event's album. Note: A deleted photographer album participant would still continue to remain on the event's invitee list.

If an individual to be deleted is a non-photographer (regular album participant), who was previously assigned via the options available on the event album, then the following would occur—Deleted regular album participant would no longer remain on the participant list of the event album. In other words, the regular album participant would lose their access to view, add, edit or delete any photo/videos on the event's album. A notification would be sent to the deleted regular album participant that the event owner has removed their album participant permissions from the event album.

Suppose that an event owner goes directly to an already existing event album before an event ends, including the 'Post-event Duration' and the 'Manual Upload Duration,' and decides to change the 'Photos/Videos Posting Allowed' field from 'Yes' to 'No' i.e. any of the album participants would no longer be able to add or delete photos/videos from an event album. In this situation, the following would occur—

An event owner will be allowed to make this change directly using the settings available on the event album, which would restrict any album participants, both the regular album participants and the photographer album participants, from being able to post any new photos/videos to the event album or even delete any of their previously uploaded photos/videos. Note: An exception is that although an event owner is also one of the album participants, they would still have access to be able to view, add, edit or delete any photos/videos on the event album.

A notification would be sent to all the event album participants i.e. both the regular album participants and the photographer album participants that the event owner has changed the album permissions to read-only, and therefore, they would now only have permission to view the album. In addition to the above notification, the following would occur—

For the photographer album participants, even if they had selected 'Auto' or 'Double-check' for the photo/video upload preference on the 'Share Event Photos/Videos' screen, they would not be able to upload any of their future photos/videos to the event album. Therefore, while an event is going on, starting from the pre-event duration to the post-event duration, the camera application of the photographer invitee's device would display the following message ('Posting not allowed') rather than displaying the photographer invitee's photo/video upload preference ('Auto', 'Double-check' or 'Manual').

Both the photographer album participants and the regular album participants would no longer have the option/buttons available on the event album to be able to manually add or delete photos/videos on the event's album.

The photographer album participants would still continue to see 'Share Event Photos/Videos' option on their calendar invite. However, regardless of their photo/video upload preference selected on the 'Share Event Photos/Videos' screen, they would still not be able to upload any photos/videos on the event album. Note: An event owner would still be allowed to add any new event album participants either via the options available on the event album or by adding a new photographer on the calendar event invite. However, any of the newly added album participants would be informed right away that they would just be able to view the event album similar to the existing album participants, and not be able to add or delete photos/videos on the event's album.

By default, an event album that's associated with a calendar invite is set as a public website (accessible via the browser), so the album can be shared with other people/guests using different operating systems on their devices. Suppose that an event owner goes directly to the settings available on an event album before an event ends, including the Post-event Duration' and the 'Manual Upload Duration,' and decides to change the value for the "Album's Public Website" field from 'Yes' to 'No' (no longer accessible via the browser). In this situation, the following would occur—

An event owner would be able to make this change directly using the settings/properties available on an event album. Once this change is made, an event album would no longer be accessible via the browser website. In other words, an event album's access would be restricted to only those album participants that have a device with the same operating system as the event owner's device, and hence, the event album would be shared directly with those album participants.

Note: Suppose that before the "Album's Public Website" field was changed from 'Yes' to 'No' (album no longer accessible via the browser webpage), if an event's album was already shared previously with some people using different operating system on their devices, then even in that case, those people would no longer be able to access the album webpage via the browser i.e. the browser webpage would display the following error message—"This event album is no longer being shared publicly via the browser. Sorry for any inconvenience!"

Note: Suppose that after the "Album's Public Website" field is changed from 'Yes' to 'No' (album no longer accessible via the browser webpage), if an event owner attempts to share the album, either manually or automatically, then the album would only be shared with those people that use a device with the same operating system as the event owner's device. In other words, people that use different operating systems on their devices wouldn't even be informed about the event album since there is no point of sharing an album when it can't be viewed. In addition, an event owner would receive the following notification—"Since the album's public website is disabled, event album wasn't shared with people that use different operating system on their devices. If you wish to share the album with such people, then please change the value for the "Album's Public Website' field from 'No' to 'Yes', and then manually share the album again.

'Send Album Website Link via Email' button on an album's settings screen would no longer be enabled since the "Album's Public Website" field was changed from 'Yes' to 'No'. In other words, 'Send Album Website Link via Email' button would always remain enabled on an album's settings screen as long as the album is still associated with an existing calendar event and the "Album's Public Website" field on an album's settings screen is set to 'Yes'.

Suppose that an event owner goes directly to an event album that's associated with a calendar event and decides to 'Delete album' before an event ends, including its 'Post-event Duration' and the 'Manual Upload Duration'. In this situation, the following would occur—

An event owner would receive the following popup message along with the 'Yes/No' options—"Are you sure you would like to delete this album as that would also result in the deletion of all the assigned photographers on the event's calendar invite?"

If the event owner selects 'Yes', then the entire album would be deleted, and in addition, any other actions mentioned below would also be taken.

All the photographer album participants that use the same operating system on their device as the event owner would receive a notification that the event owner has deleted the event album, and therefore, they would no longer have access to view, add, update or delete that album.

All photographer album participants would also be removed from the photographer list of the event's calendar invite i.e. from the 'Assign Photographers' screen, which is visible to the event owner, and the 'Assigned Photographers' screen, which is visible to all the photographer invitees of the event.

Any people who had access to the event's album via the browser website would also no longer be able to view the album. The following error would be displayed on the website—"Sorry for any inconvenience, however, this album has been deleted by the owner."

Once the event owner deletes the event album, the 'Request Photos/Videos' option available on the 'Event Photos/Videos' screen would be changed to 'No' on the event owner's calendar event. Also, the 'Go to Event Album' button on the 'Event Photos/Videos' screen would be removed since the album doesn't even exist. In addition, the 'Share Event Album' option would be disabled (grayed out) on the main screen of the event owner's calendar event invite.

Note: If the event owner later decides to again change the 'Request Photos/Videos' option on the 'Event Photos/Videos' screen of the calendar event to 'Yes' and saves the event, then since an event album no longer exists for that event, a new album would be created but it would be assigned the same name as the earlier album as long as the event's subject and start date/time are same as earlier. In addition, 'Go to Event Album' button would also be enabled on the 'Event Photos/Videos screen'. Also, the 'Share Event Album' option/sub-options would again become visible/enabled on the main screen of the event owner's calendar event invite. In this case, it's almost like a new album with all new settings/photographers, etc.

Once an event owner deletes an event album, any of the photographer invitees that use the same operating system as the event owner would no longer see the 'Share Event Photos/Videos' option/sub-options on their calendar event. In addition, those photographer invitees also wouldn't receive any notifications related to taking photos/videos for the event.

If the event owner selects 'No', then the album wouldn't be deleted and no other changes would be made.

As shown in FIG. 5A, suppose that an event owner goes directly to the calendar event and decides to delete the entire event by clicking on 'Delete Event' button 502 before the event ends, including its 'Post-event Duration' and the 'Manual Upload Duration'. (Note: 'Delete Event' button 502 would only be visible to the event owner once the event has been saved/created and the event owner comes back to that event.) In this situation, the following would occur when the 'Delete Event' button 502 is clicked—

If the event that's selected to be deleted doesn't have an associated photo/video album, then the event owner would be displayed a popup screen with the following two options to select—'Delete event', 'Cancel'.

As seen in FIG. 5B, if the event that's selected to be deleted has an associated photo/video album, then the event owner would be displayed a popup screen with the following three options to select—'Delete event' 504, 'Delete event and its album' 506, 'Cancel' 508.

Suppose that an event to be deleted had an associated photo/video album, then in that situation depending upon the event owner's selection of 'Delete event', 'Delete event and its album' or 'Cancel' on the pop-up screen, the following would occur—When 'Delete event' 504 is selected, the following would occur—

Event would be deleted from event owner's calendar.

All event invitees would receive a notification that the event owner has deleted the event—[EventName]. Following the notification, the event would also be removed from all event invitee's calendars.

Event's photographer invitees would no longer remain on the event's photographer list because the event itself was deleted.

Since the event owner only requested to delete the calendar event and not the associated event album, therefore, the event album would not be deleted.

An event owner would continue to have access to view, add, edit, delete photos/videos on the event's album. In other words, an event owner would continue to maintain their permission for the event album even though the associated event was deleted.

Since the event owner only requested to delete the calendar event and not the associated event album, therefore, any of the photographer invitees that previously had access to the event album would continue to be a participant of the album. However, the photographer (P) designation would be removed from the suffix of their names. In other words, any photographer album participants would be converted into regular album participants on the event album. (Note: In this situation, if an individual already existed both as a photographer album participant as well as a regular album participant on an event album, then they would lose their photographer album participant permissions and just have access to event album as regular album participant.) Any other people with whom the album's public website link was shared previously would continue to be able to view the event album via their browsers.

When 'Delete event and its album' 506 is selected, the following would occur—Event would be deleted from the event owner's calendar; Photo/video album, which was associated with the calendar event, would also be deleted; The following notifications would be sent out to the event invitees depending upon their album permissions/role—

Event invitees that had accepted to be either a photographer album participant or a regular album participant on an event album would receive a notification that the event owner has deleted the '[EventName]' event and its associated photo/video album. Following the notification, the calendar event would be removed from those invitees' calendars as well as the associated photo/video album would no longer be visible/accessible to those invitees.

Regular event invitees that weren't a participant on the associated event album would receive a notification that the event owner has deleted the [EventName] event. Following the notification, the calendar event would be removed from those invitees' calendars.

Regular album participants of an event album that don't exist on the event's invitee list would receive a notification that the event owner has deleted the [AlbumName] album. Following the notification, the photo/video album would no longer be visible/accessible by those regular album participants.

Event's photographer invitees would no longer remain on the event's photographer list because the event itself was deleted along with its associated photo/video album. In addition, those photographer invitees also wouldn't receive any notifications related to taking photos/videos for the event. Since the associated photo/video album was itself deleted, an event owner also wouldn't have access to that album.

Any other people with whom the album's public website link was shared previously would no longer be able to view the event album via their browsers. The following error would be displayed on the website—"Sorry for any inconvenience, however, this album has been deleted by the owner."

When 'Cancel' is selected 508, the following would occur—Nothing would be done i.e. no changes would be made, and the event owner would be taken back to their calendar event's main screen.

Suppose that an event owner goes directly to the calendar event and decides to 'Delete' (remove) an event invitee before an event ends, including its 'Post-event Duration' and the 'Manual Upload Duration'. In this situation, the following would occur—

An event owner will be allowed to delete any event invitee. However, keep in mind that any changes will only take effect when the event owner saves (selects 'Done') the entire event. When an event invitee is deleted, the following would occur—

Depending upon the invitee's participation on an associated event album, the following would occur—Deleted event invitee, who previously had access to the event's album as a photographer album participant or a regular album participant, would receive a notification that the event owner has removed them from the [EventName] event, and that they would also no longer be able to view the event's album. Following the notification, the calendar event would be removed from that invitee's calendar as well as the associated event album would no longer be accessible by that invitee.

Deleted event invitee, who previously didn't have access to the event's album, would just receive a notification that the event owner has removed them from the [EventName] event. Following the notification, the calendar event would be removed from such invitee's calendar. Note: Deleted event invitee, who previously had access to the event's album via the album's public website, would continue to have that access until the event owner changes the album's setting to a non-public website.)

Once an invitee is deleted, they would no longer be visible on the calendar event. In case if the deleted event invitee was previously a photographer album participant on an event album, then they would be removed from the event's photographer list i.e. from the 'Assign Photographers' screen, which is visible to the event owner, and the 'Assigned Photographers' screen, which is visible to all the photographer invitees of the event. In addition, the deleted event invitee would also be removed from the event album's participant list. In addition, such photographer invitee also wouldn't receive any notifications related to taking photos/videos for the event.

In case if the deleted event invitee was previously a regular album participant on an event album, then they would just be removed from the event album's participant list. Note: An event owner is never allowed to remove/delete themselves from the calendar event's invitee list.

Suppose that an event owner initially sets up a calendar event along with requesting photos/videos from certain invitees for the event. However, the event owner later decides to change (increase/decrease/reschedule) the date/time for the event before that event actually ends, including its Post-event Duration' and the 'Manual Upload Duration'. In this situation, the following would occur—

Event owner will be allowed to change (increase/decrease/reschedule) the date/time for the event. However, keep in mind that any changes would only take effect when the event owner saves (selects 'Done') the entire event.

After updating the event's date/time, when the event owner tries to save the event, they would be prompted with the following message along with the 'Yes', 'No' buttons—"Since the event's date/time was changed, all invitees would need to re-accept the invitation and also all photographer invitees would need to re-accept the photo/video sharing request. Are you sure you would like to proceed with these changes?" If the event owner selects 'Yes', then the following would occur—

Any values that were changed for either 'Event Start time' or 'Event End time' would be applied/saved to the calendar event. All event invitees would receive the following notification to re-select their event invitation response since the event's date/time was updated—"For the [EventName], event owner has modified the event's date/time. Please re-accept the invitation."

Since the event's date/time was updated, all photographer invitees' previous response for the event's photo/video sharing request would be automatically changed to blank (no response) on both the calendar event as well as the event album. And thereafter, if the photographer invitees go to re-accept their event invitation response, then they would also be prompted to re-select their photo/video sharing response. Note: Until the photographer invitees re-accept their photo/video sharing request, they would not have access to view, add, edit, or delete any photos/videos on the associated event album. In addition, they also won't see the 'Go to Event Album' button on the 'Share Event Photos/Videos' screen until they go ahead and re-accept the photo/video sharing request.

If the 'Event Start Time' was changed, then the event's associated photo/video album name would also be updated since the album name includes the event's start time in the suffix. (Note: All album participants as well as the event owner would thereafter see the updated album name on their devices. However, note that the album's public website link would never change once it has been initially created.) Note: If the event's date/time was updated i.e. the photographer invitees' album access was indirectly revoked, and too at the time when the photographer invitees were in the middle of uploading some photos/videos, then those set of photos/videos wouldn't be uploaded to the event's centralized photo/video album.

An event owner would continue to maintain full access over the event's centralized photo/video album regardless of the date/time updates made on the event invite. In addition, an event owner would also continue to have the 'Go to Event Album' button at the bottom of the 'Event Photos/Videos' screen. (Note: An event owner would also continue to maintain their photographer status for the event and wouldn't be prompted with any messages for re-accepting the photo/video sharing request.)

Any of the previous selections made on 'Share Event Album' screen will remain the same unless and until an event owner manually updates any of their previous selections. Note: Here is a scenario where an event owner might want to consider changing their original selection on the 'Share Event Album' screen—Suppose that an event owner decides to update the event date/time right before that event was about to end, then there is a good possibility that most of the event invitees might already be present at the event and might not get an opportunity to re-accept the updated invitation. In this case, if the event owner had previously selected 'Event Attendees' value for the 'Share Album With' field on the 'Share Event Album' screen, then there might be a problem since the event album might not be shared with most of those invitees even though they might be present at the event. Therefore, in this situation it would be advisable for the event owner to go ahead and also change the 'Share Album With' field on the 'Share Event Album' screen to 'All Guests.' This way even if the invitees don't get a chance to re-accept the updated invitation, they would still be notified if and when the event's album is shared in future. Note: It's possible that an event owner might mistakenly select such a value for 'Event start time' or 'Event end time' that might have already occurred in the past. In this situation, only those field values that are either valid currently or in future would be considered, whereas anything that's occurred in the past would just be ignored.

If the event owner selects 'No', then the following would occur—Event time wouldn't change i.e. both the 'Event start time' and the 'Event end time' would remain the same as earlier. Neither would any new notifications be sent nor would any permission changes be made.

Suppose that an event owner initially sets up a recurring calendar event along with requesting photos/videos from certain invitees for the recurring events. However, the event owner later decides to make some changes to either one of those recurring events or to all the recurring events. In this situation, the following would occur—

An event owner will be allowed to make the changes to either one of the recurring events or apply those changes to all the recurring events. However, keep in mind that any changes will only take effect when the event owner saves (selects 'Done') the entire event.

After making the changes when the event is saved ('Done') by the event owner, they would be prompted to select one of the following three options—'Apply changes to just this event,' 'Apply changes to all future events,' or 'Cancel.'

Therefore, if an event owner decides to make some changes (for example: increase the 'Pre-event Duration' for one of the recurring events i.e. not apply those changes to all recurring events), then they can do so by directly going to that particular event, make the changes and upon save, select to apply those changes just to that particular event. On the contrary, if the event owner wants to apply their changes to all recurring events, then they can also do so by selecting the option to apply to all (future) recurring events.

Most of the scenarios and their outcomes mentioned previously for the regular events would also apply to the recurring events. Therefore, those scenarios aren't repeated here. However, here are some specific recurring event scenarios, especially those without an album, that might need to be handled a little differently—

Suppose that the recurring event was already set up by the event owner, and the photographer invitees for the event had already accepted those recurring events as well as the photo/video sharing requests for those events. Now if the event owner decides to change the 'Request Photos/Videos' field to 'No' on the 'Event Photos/Videos' screen for one of the recurring events (which doesn't have an album created yet), then the following would occur—Since the 'Request Photos/Videos' field is changed to 'No' for just a particular event and not all the recurring events, therefore, the following would occur—

All invitees that were previously assigned as the photographers for the event, excluding the event owner, would receive the following notification—"Event owner is no longer requesting photos/videos for the event—[EventName]. Hence, you would lose your photo/video sharing permissions for this event."

All invitees that were previously assigned as the photographers for the event, excluding the event owner, would no longer remain on the photographer list of the event i.e. they would be removed from the 'Assign Photographers' screen, which is visible to the event owner, as well as they would be removed from the 'Assigned Photographers' screen, which is visible to all the photographer invitees of the event.

Since the event album doesn't even exist yet for this recurring event, therefore, no other changes would be made related to the album settings. Also, since the event owner went ahead and selected 'No' for the 'Request Photos/Videos' field, therefore, the event album anyways won't be created in future for this recurring event. Since the event album doesn't even exist for the event, therefore, the 'Go to event album' button also won't be present on any screen of the event owner's calendar event invite.

All invitees that were previously assigned as the photographers for the event, excluding the event owner, would no longer see the 'Share Event Photos/Videos' option on the main screen of their calendar invite for the event. Note: even though the previously assigned photographer invitees would be deleted from the photographer list of the recurring event, however, such invitees would still continue to remain on that event's invitee list. For an event owner, the 'Share Event Album' option and its sub-options would be disabled (grayed out) on the main screen of the calendar invite.

Suppose that the recurring event was already set up by the event owner. However, if that event owner later decides to add some more invitees as photographers for all future events, then the following would occur—

For recurring events that already have an associated photo/video album, they would work the same as the steps mentioned earlier for adding new photographer invitees on a regular event. For recurring events that initially don't have a photo/video album created, the following would occur—

New photographers would just be added to the photographer lists of the calendar event's invite i.e. the newly assigned photographer invitee would be added to the 'Assign Photographers' screen, which is visible to the event owner. In addition, the newly assigned photographer invitee would also be added to the 'Assigned Photographers' screen, which is visible to the other active photographer invitees of an event.

Newly added photographers will receive a notification to either accept or decline the event's photo/video sharing request. Just like the photographers that were initially added while setting up the event invite, the newly added photographers will also be treated in the same manner.

If the new photographer being added already existed on the event's photographer list, then that person would not be added twice on the list. Also, no new notification would be sent out to such photographer invitees that already existed on the list previously. Added photographer invitees would now have the 'Share Event Photos/Videos' option/sub-options available on their event's calendar invite. Since the photo/video albums don't yet exist for such future events, therefore, those new photographers wouldn't be added initially as photographer album participants until that event's album is actually created.

Suppose that the recurring event was already set up by the event owner. However, if that event owner later decides to delete a photographer invitee either from an individual event or all recurring events, then the following would occur—When the event owner clicks on the 'Remove photographer' button on the 'Photographer Info' screen for a photographer invitee of the calendar invite, the following would occur—

Event owner would be asked to select if they would like to remove the photographer just from that particular event or all the recurring events. Based on event owner's selection, all the below tasks would either be applied for a single event or all recurring events. Note: Even though an event owner might click on the 'Remove Photographer' button as well as confirm the deletion, however, that photographer invitee would only be removed when the event owner saves (selects 'Done') the entire event.

The deleted photographer invitee would no longer remain on the photographer list of the event's calendar invite i.e. the deleted photographer invitee would be removed from the 'Assign Photographers' screen, which is visible to the event owner. In addition, the deleted photographer invitee would also be removed from the 'Assigned Photographers' screen, which is visible to the other active photographer invitees of an event.

For the recurring events that already have a photo/video album created, any of the deleted photographer invitees would no longer remain on the participant list of those event albums. In other words, photographer invitee would lose their access to view, add, edit or delete any photo/videos on those events' albums.

For the recurring events, where an event's album isn't yet created, no action would be required to remove those deleted photographer invitees from the event album. However, if any photo/video album is created in future for the recurring events, then any of the deleted photographer invitees wouldn't be added to the participant list of those newly created album(s).

A notification would be sent to the deleted photographer invitee that the event owner has removed their photographer permissions i.e. they no longer have photo/video sharing abilities for the event.

Deleted photographer invitee would no longer see the 'Share Event Photos/Videos' option or any of its sub-options on their calendar invite. Note: Any deleted photographer invitees would still remain on the event's invitee list as regular event invitees.

By default, an event album that's associated with a calendar invite (recurring or non-recurring) is set as a 'public' website (accessible via the browser), so the album can be shared with other people/guests using different operating systems on their devices. Suppose that an event owner goes directly to an event album, which is associated to one of the recurring events, and decides to change the value for "Album's Public Website" field from 'Yes' to 'No' (album no longer accessible via the browser website). In this situation, the following would occur—

All the actions/steps associated with the change of "Album's Public Website" field from 'Yes' to 'No' for a recurring event/album would remain the same as mentioned earlier for a regular event/album, and therefore, those steps aren't repeated here. Note: The above mentioned change would only apply to a particular event that's associated with the event album and not all the recurring events. Note: If an event owner wants to change all the recurring events' albums to not be publicly accessible via the browser, then the only option for them would be to manually make the change on each recurring event's album and that too once the album gets automatically created on the day of the recurring event.

Suppose that the recurring event was already set up by the event owner along with requesting photos/videos for those events. Thereafter, as seen in FIG. 5A, if the event owner goes to one of the recurring events and clicks on 'Delete Event' 502 (Note: 'Delete Event' button would only be visible to the event owner once the event has been saved/created and the event owner comes back to that event), then an event owner would be displayed a popup with the following options depending upon the recurring event(s) association with the photo/video album(s)—

'Delete event' 510—This option would always be displayed to the event owner. Note: All steps/actions related to this 'Delete event' option on a recurring event would work the same as the steps mentioned earlier for a regular event/album, and therefore, those steps aren't repeated here.

'Delete event and its album' 512—An exception for recurring events is that an album might not even be initially created for future events. Therefore, if the event to be deleted doesn't have an associated album created yet, then the 'Delete event and its album' option wouldn't even be displayed/enabled for the event owner to select. On the contrary, if the recurring event to be deleted does have an associated album already created (regardless of whether the 'Request photos/videos' field on the event invite is currently set to 'yes' or 'no'), then the 'Delete event and its album' option would be displayed/enabled for the event owner to select. Note: Since all the steps/actions that occur for this 'Delete event and its album' option on a recurring event are the same as previously mentioned for a regular event with associated photo/video album, therefore, those steps aren't repeated again here.

'Delete all events' 514—This option would always be displayed to the event owner. If this option is selected by an event owner, all steps/actions that occur for deleting an event (mentioned earlier for a regular event) would then similarly be applied for all recurring events. Note: Although the recurring events themselves might get deleted, however, if any of those events ever had an associated photo/video album (regardless if the 'Request photos/videos' field is currently set to 'yes' or 'no'), then those albums still won't be deleted when this option is selected.

'Delete all events and their albums' 516—If none of the recurring events has/had an associated photo/video album ever created, then this 'Delete all events and their albums' option would not be displayed to the event owner. Therefore, before displaying this option, a quick check would be performed on all of the recurring events to ensure if any of them have an associated photo/video album or not.

This 'Delete all events and their albums' option would be displayed to the event owner as long as at least one of the recurring events has had an associated photo/video album. (note: even if the 'Request photos/videos' field is current set to 'no' for an event, however, as long as the event's associated photo/video album still exists, then this option would be displayed to the event owner.)

If this 'Delete all events and their albums' option is selected by an event owner, all steps/actions that occur for deleting an event and its album (mentioned earlier for a regular event) would then similarly be applied for all recurring events.

'Cancel' 518—This 'Cancel' option would always be displayed to the event owner. When 'Cancel' is selected, nothing would be done i.e. no changes would be made, and the event owner would be taken back to the main screen of the recurring event's calendar invite.

Suppose that the recurring event was already set up by an event owner along with requesting photos/videos for those events. Thereafter, the event owner goes to one of the recurring events and deletes an event invitee (who is also an assigned photographer for the event), and upon save, selects to apply the changes to all the recurring events. In this situation, the following would occur—

For recurring events that already have an associated photo/video album, all the steps involved in deleting an event invitee (who is also an assigned photographer for the event) would remain the same as the steps mentioned earlier for deleting event invitees from a regular event.

For recurring events that don't have a photo/video album created yet, any deleted event invitees (who are also an assigned photographer for the event) would at least be deleted from the calendar event invite. In addition, regardless of a photographer invitee's response for the event's photo/video sharing request, they would also be removed from the photographer list of those events i.e. from both the 'Assign Photographers' screen, which is visible to the event owner, and the 'Assigned Photographers' screen, which is visible to all the photographer invitees of the event. However, since the photo/video album doesn't exist yet for all those future recurring events, therefore, there would be no other changes required. (Note: when the photo/video albums are later created for future recurring events, they would not include those deleted event invitees, who don't exist on the photographer list of the event.)

Suppose that an event owner initially sets up an event invite, including the photo/video sharing request for the event. However, once that event ends, including its 'Manual Upload Duration,' if the event owner thereafter decides to change any values on the event invite, which might directly or indirectly impact the photo/video sharing request for the event, then the following would occur—Event owner would receive the following message prompt along with the 'Yes/No' options—"The event has already ended and its associated event album might have already been shared with the event guests. Would you still like to make these updates and notify the photographer invitees?"

If the event owner selects 'Yes' on the popup screen, Any changes made by the event owner would be saved on the event invite. The rules/actions that were applicable for any changes made by an event owner before the end of an event, all those same rules/actions would still be applicable for any changes made once an event has ended. In other words, any steps/actions, which would have been taken earlier when the event hadn't ended, would still be taken although the event has completed in this case. However, the exception is that since the event has ended, if there were things that had already occurred in the past, then any of the associated time-sensitive steps wouldn't be taken.

Note: By selecting 'Yes' on the popup screen, an event owner verifies that they really want to pursue their changes regardless of the consequences. For example: if the event owner changes 'Request Photos/Videos' field to 'No' after an event has already completed, then the associated photographer invitees would lose their access to the event's album. However, it's possible that all other guests might have access to the event's album as regular album participants since that album could have been shared with them after the event had ended. Therefore, in this situation, the photographer invitees wouldn't have access to the album until an event owner manually shares the album with them again, whereas, all the other guests might have access to the event album since the album was already shared with them as regular album participants. In short, by confirming their update/change request, an event owner takes full responsibility for their actions. If the event owner selects 'No' on the popup screen, no changes would be made/saved i.e. no action would be taken.

Suppose that an event owner initially sets up an event invite using a device/equipment that doesn't have the same operating system as the event owner's photographer requesting device (which allows to request sharing of photo/videos for an event). Hence, the event owner isn't able to request any photos/videos for the event at that time. Thereafter, even if that event gets synced on the event owner's photographer requesting device, then also it wouldn't allow requesting of the photos/videos for the event since the original event was created on an unsupported device. Here are the details of what would occur in this situation—

When an event which was originally created on an unsupported device gets synced on the photographer requesting device (supported device), options for requesting or sharing of photos/videos for an event still wouldn't be available for an event owner. Again, this is because the original event was created using a device that didn't have same operating system as the event owner's photographer requesting device. Note: For an event invite that was originally created on an unsupported operating system device, any of the event invitees would also not see any options related to sharing their photos/videos for that event. Note: Even if an event owner goes ahead and makes any updates to a synced event on their photographer requesting device (supported device), any of those updates would only be communicated to the invitees via an email and not directly to their devices (even though those invitees might be using supported devices with same operating system.) This is because even though a synced event might show up or might be edited on the event owner's supported device, however, its features and functionality would still be handled as if it was on the unsupported device where the event was originally created.

Suppose that an event owner initially sets up a calendar event along with requesting photos/videos from certain invitees for the event. However, before a photographer invitee accepts the request to share their photos/videos, the event owner goes ahead and deletes them from the photographer list of the event. In this situation, the following would occur—

Photographer invitee, who was deleted/removed from the event's photographer list by the event owner, would receive a notification on their device that the event owner has removed them from the photographer list of the event—[EventName].

Deleted photographer invitee would no longer remain on the photographer list of the event's calendar invite i.e. the deleted photographer invitee would be removed from the 'Assign Photographers' screen, which is visible to the event owner. In addition, the deleted photographer invitee would also be removed from the 'Assigned Photographers' screen, which is visible to the other active photographer invitees of an event.

Deleted photographer would also be removed from the participant list of the event's photo/video album. Once an invitee has been removed from the photographer list of an event, if that deleted photographer goes to the event's invite, they would no longer see the 'Share Event Photos/Videos' option to either accept/decline or even set their photo/video sharing preferences for the event. Note: Since the photographer invitee was only removed from the photographer list of the event, they would still continue to remain as an invitee for the overall event.

Suppose that an event owner initially sets up a calendar event along with requesting photos/videos for the event, which indirectly generates an event album. However, if the event owner later decides to change the value of the calendar event's subject/title field, then the following would occur—

Event owner will be allowed to change the event's subject/title. However, keep in mind that any changes would only take effect when the event owner saves (selects 'Done') the entire event.

When the event's subject/title is changed, then the event's associated photo/video album name would also be updated since the album name includes the event's subject/title in the prefix. (Note: All album participants as well as the event owner would thereafter see the updated album name on their devices. However, note that the album's public website link would never change once it has been initially created.)

Suppose that an event owner already has an event on their calendar where they accepted or requested photo/video sharing, regardless if they created that event themselves or someone else sent it to them. Thereafter, if the event owner wants to request or accept photo/video sharing for another calendar event that is either at the exact same time or partially overlapping timeframe with the existing event, then the following would occur—

Once an event owner has an event on their calendar where they accepted or requested photo/video sharing, regardless if they created the event themselves or someone else sent it to them, then for any time period between that event's 'Pre-event Duration' to the end of its 'Post-event Duration', the event owner would no longer be able to send a photo/video sharing request for another event. In addition, an event owner also wouldn't be able to accept photo/video sharing request sent by someone else for that duration. This would essentially restrict the event owner from committing to take photos/videos for two events at the same time or even partially overlapping timeframes.

In this situation, depending upon whether the event owner is trying to create the conflicting second event or if some other person is trying to send the conflicting second event to the event owner, the following would occur—If the event owner tries to create a conflicting second event, then that second event would automatically have the photo/video sharing options disabled i.e. both the 'Request Photos/Videos' option and the 'Share Event Album' option would be grayed out on the second calendar event.

If some other person sends a conflicting second event to the event owner, then that second event would automatically have the photo/video sharing options disabled for the event owner who is actually a photographer invitee in this case i.e. the 'Share Event Photos/Videos' option would be grayed out from the second calendar event received by the event owner.

Here is an example—If an event owner (Person A) has their own calendar event with requesting photos/videos for a particular time, and if another person B sends an event invite requesting Person A to share photos/videos at the exact same time or partially conflicting time, then the Person A wouldn't be able to accept the photo/video sharing for second event since they already have photo/video sharing accepted for one event. In other words, Person A (event owner) would still be able to accept the second conflicting event, but wouldn't be able to accept the photo/video sharing request for that second event.

Miscellaneous Notes

Whether an event has a duration of couple of hours or an entire day or even multiple days, all the processes related to requesting the photos/videos for the event, assigning the photographer(s), reminding the photographers to take photos/videos, automatic or manual upload of photos/videos as well as automatic or manual sharing of event album would all remain the same regardless of the duration of the event.

If a photographer invitee is granted the edit/delete permissions on an event album, such permissions are only for those photos/videos that they previously uploaded themselves. On the other hand, an event owner would have access to edit/delete any of the photos/videos that might exist on the entire event album, regardless of who uploaded them.

For an event album that's associated with a calendar event, other than the event owner, any of the other album participants wouldn't have permission to either edit or delete any album settings i.e. they would just be allowed to view those album settings as read-only. In addition, such album participants also wouldn't be allowed to delete the event album or add/remove any other album participants (buttons associated with these functions wouldn't even be visible to such album participants.) Note: An exception is that an album participant would still have the permission to delete/remove themselves from an event album's participant list. Especially if it's a photographer album participant that removes themselves from an event album's participant list, then they would also lose their photo/video sharing permissions for the associated calendar event.

For an event album that's associated with a calendar event, 'Go to Associated Calendar Event' button would always be enabled/visible on the album's setting screen to either the photographer album participants or an event owner. This button would allow them to easily go back to the associated calendar event as long as that event still exists. (Note: Regular album participants wouldn't be able to view this 'Go to Associated Calendar Event' button, so it's just the photographer album participants, including the event owner, who will be able to view this button on an album's settings screen.)

For one of the recurring events, if some settings are changed on its associated album, then those changes would only be applicable to that particular recurring event. In other words, update to a specific album would not get applied to all recurring events' albums.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A computer implemented method for sharing photos and videos related to an event through a central location comprising:
creating an event, using said computer, wherein said event is to be photographed and/or video recorded;
sending invitations for said event to one or more invitees using said computer, wherein said invitations include a request to take photos and/or videos of said event;
receiving an acceptance from one or more of said invitees to take photos and/or videos during said event;
assigning one or more of said accepting invitees as photographers;
defining a pre-event period and a post-event period;
sending to said assigned photographers, via said computer, a request to take photos and/or videos during said pre-event period;
sending to said assigned photographers a reminder to take photos and/or videos during said event;
sending to said assigned photographers, via said computer, a request to take photos and/or video during said post-event period;

sending at least one reminder to said assigned photographers to share photographs and/or videos taken during said pre-event period, said event, and said post-event period; and sharing said photographs and/or videos taken during said pre-event period, said event, and said post-event period.

2. The computer implemented method of claim 1 further comprising the steps of:

providing said photographers an upload option for identifying an upload preference to upload said photos or videos to said central location, wherein said upload option is selected from the group comprising (a) automatically, (b) manually, or (c) by confirmation;

providing said photographers the option to change said upload preference at a later time.

3. The computer implemented method of claim 2 further comprising the step of displaying a list of said photographers, each of said photographer's upload preference, and each of said photographer's response.

4. The computer implemented method of claim 2 further comprising the step of:

defining a manual upload period during which said photographers may continue to manually upload said photos or videos after said event, but before said digital album is shared.

5. The computer implemented method of claim 4 further comprising the step of:

providing said photographers with the opportunity to choose a new photographer response when said event date or time, said pre-event period, said post-event period, or said manual upload period are changed.

6. The computer implemented method of claim 1 further comprising the step of:

sending a notification to said photographers prior to the beginning of said event reminding said photographers of said photographer response, and informing said photographer that event is about to start.

7. The computer implemented method of claim 1 further comprising the step of:

limiting said photos or videos which are uploaded to only those produced by a camera of said one or more assigned photographers during said event, pre-event period, or post-event period.

8. The computer implemented method of claim 1 further comprising the step of:

uploading from a supported device said photos or videos which were taken using an unsupported photo or video taking device and caused to be moved to said supported device.

9. The computer implemented method of claim 1 further comprising the step of:

providing said event creator with a selectable option to share said digital album with a group of persons selected from the group comprising, (a) all event invitees, (b) event attendees only; or (c) nobody.

10. The computer implemented method of claim 1 further comprising the step of:

sharing said digital album using said computer.

11. The computer implemented method of claim 1 further comprising the step of:

generating recurring event invitations, including requests to share, for recurring events.

12. The computer implemented method of claim 1 wherein at least one of a) creating an event,
b) creating a digital album, or
c) taking photos or videos is accomplished, at least in part, by integrating with a separately installed program on said device.

13. The computer implemented method of claim 1 wherein said event owner may disable sharing of said photos or videos at any time.

14. The computer implemented method of claim 1 further comprising the step of: creating a digital album for collecting said photos and/or videos corresponding to said event.

15. The computer implemented method of claim 14, wherein said request to take photos and/or videos automatically generates said digital album.

16. The computer implemented method of claim 14, wherein said digital album is automatically shared with all event invitees.

17. The computer implemented method of claim 14, wherein said digital album is automatically shared with all event attendees.

18. The computer implemented method of claim 1 further comprising the step of: uploading to said central location said photos or videos taken by said photographers during said event.

19. The computer implemented method of claim 1 further comprising the step of: visually indicating that said photographs and/or videos are designated for upload on the screen of a device used to take said photos and/or videos in response to at least one of said requests to take photos and/or videos.

20. The computer implemented method of claim 1, wherein a calendar application is used to create said event, wherein said invitations include a request to take photos and/or videos of said event, and said request to take photos generates a new digital album associated with said event, and thereafter, during said event, any photos or videos taken are automatically uploaded to said digital album.

21. A computer implemented method for sharing photos and/or videos comprising:

creating a digital album that can store photos and/or videos using said computer;

sending invitations to one or more invitees to view and share photos and/or videos in the digital album;

receiving an acceptance from one or more of said invitees (i.e. accepting invitees) to view and share photos and/or videos in the digital album;

assigning one or more of said accepting invitees as photographers;

defining a pre-event period and a post-event period;

sending to said assigned photographers, via said computer, a request to take photos and/or videos during said pre-event period;

sending to said assigned photographers a reminder to take photos and/or videos during said event;

sending to said assigned photographers, via said computer, a request to take photos and/or video during said post-event period;

providing a selectable option, using said computer, to said accepting invitees to upload their photos and/or videos to said digital album using the following options: (1) automatically without confirmation, (2) automatically with confirmation, and (3) manually within a manual upload period; and sharing said photos and/or videos taken during said pre-event period, said event, and said post-event period.

22. The computer implemented method of claim 21, wherein the digital album is automatically associated with an event.

23. The computer implemented method of claim 21 wherein photos and videos uploaded to the digital album are automatically shared with the event attendees.

24. A computer implemented method for sharing photos and/or videos comprising:
- creating a scheduled event, using said computer, wherein said event is to be photographed and/or video recorded;
- sending invitations for said event to one or more invitees using said computer, wherein said invitations include a request to take photos and/or videos of said event, and said request to take photos generates a new digital album for said event;
- receiving an acceptance from one or more of said invitees to take photos and/or videos during said event;
- assigning one or more of said accepting invitees as photographers;
- defining a pre-event period and a post-event period;
- sending to said assigned photographers, via said computer, a request to take photos and/or videos during said pre-event period;
- sending to said assigned photographers a reminder to take photos and/or videos during said event;
- sending to said assigned photographers, via said computer, a request to take photos and/or video during said post-event period;
- providing said assigned photographers a selectable option to upload photos and/or videos to said digital album; and
- sharing said digital album with said event invitees.

25. The computer implemented method of claim 24, wherein
- said invitation for said scheduled event comprises a selectable option to go from said invitation to said digital album associated with said event, and
- said digital album comprises a selectable option to go from said digital album to said scheduled event.

26. The computer implemented method of claim 24, wherein said assigned photographers are able to view:
- (1) a list of all invitees,
- (2) an indicator of whether each of said invitees accepted or declined the request to take photos and/or videos, and
- (3) every assigned photographer's photo and/or video upload preference.

27. The computer implemented method of claim 26 further comprising the step of: sharing of said digital album with event attendees that were present at the event.

28. A computer implemented method for sharing photos and/or videos comprising:
- integrating a calendar, camera, and photo album applications on a mobile device,
    - wherein said calendar application is used to create an event invite,
    - wherein said event invite includes a request to take photos and/or videos of the event,
    - wherein said request automatically generates a digital album for said event, and thereafter, when photos and/or videos are taken during said event using said camera application said photos and/or videos are automatically uploaded to said digital album;
- providing a selectable option in said calendar application to go to said digital album;
- providing a selectable option in said digital album to go to said event invite;
- sending said event invite to one or more invitees using said mobile device;
- receiving an acceptance from one or more of said invitees to take photos and/or videos during said event;
- assigning one or more of said accepting invitees as photographers;
- defining a pre-event period and a post-event period;
- sending to said assigned photographers, via said mobile device, a request to take photos and/or videos during said pre-event period;
- sending to said assigned photographers, via said mobile device, a reminder to take photos and/or videos during said event;
- sending to said assigned photographers, via said mobile device, a request to take photos and/or video during said post-event period; and
- sharing said photos and/or videos taken during said pre-event period, said event, and said post-event period.

29. The computer implemented method of claim 28 further comprising the step of: sharing of said digital album with event attendees that were present at the event.

* * * * *